US008463442B2

(12) United States Patent
Curry et al.

(10) Patent No.: US 8,463,442 B2
(45) Date of Patent: Jun. 11, 2013

(54) ALARM AND DIAGNOSTICS SYSTEM AND METHOD FOR A DISTRIBUTED ARCHITECTURE HEATING, VENTILATION AND AIR CONDITIONING NETWORK

(75) Inventors: Jimmie Curry, Allen, TX (US); Jacob Jennings, Irving, TX (US); Wojciech Grohman, Little Elm, TX (US)

(73) Assignee: Lennox Industries, Inc., Richardson, TX (US)

( * ) Notice: Subject to any disclaimer, the term of this patent is extended or adjusted under 35 U.S.C. 154(b) by 387 days.

(21) Appl. No.: 12/603,499

(22) Filed: Oct. 21, 2009

(65) Prior Publication Data
US 2010/0106316 A1    Apr. 29, 2010

Related U.S. Application Data

(63) Continuation-in-part of application No. 12/258,659, filed on Oct. 27, 2008.

(60) Provisional application No. 61/167,135, filed on Apr. 6, 2009.

(51) Int. Cl.
*G01M 1/38* (2006.01)

(52) U.S. Cl.
USPC .............................. 700/276; 700/80

(58) Field of Classification Search
USPC .............................. 700/80, 83, 276
See application file for complete search history.

(56) References Cited

U.S. PATENT DOCUMENTS

| 4,048,491 | A | 9/1977 | Wessman |
| 4,262,736 | A | 4/1981 | Gilkeson et al. |
| 4,296,464 | A | 10/1981 | Woods et al. |
| 4,381,549 | A | 4/1983 | Stamp et al. |
| 4,464,543 | A | 8/1984 | Kline et al. |
| 4,482,785 | A | 11/1984 | Finnegan et al. |
| 4,501,125 | A | 2/1985 | Han |
| 4,606,042 | A | 8/1986 | Kahn et al. |
| 4,616,325 | A | 10/1986 | Heckenbach et al. |
| 4,694,394 | A | 9/1987 | Costantini |
| 4,698,628 | A | 10/1987 | Herkert et al. |

(Continued)

FOREIGN PATENT DOCUMENTS

| EP | 0980165 A2 | 2/2000 |
| EP | 1956311 A2 | 8/2008 |

(Continued)

OTHER PUBLICATIONS

Related case U.S. Appl. No. 12/603,508, filed Oct. 21, 2009 to Wojciech Grohman, entitled "Alarm and Diagnostics System and Method for a Distributed-Architecture Heating, Ventilation and Air Conditioning Network".

(Continued)

*Primary Examiner* — Kavita Padmanabhan
*Assistant Examiner* — Chad Rapp

(57) ABSTRACT

The disclosure includes an HVAC data processing and communication network and a method of manufacturing the same. One embodiment of the network includes a subnet controller, a system device and a system status display. The subnet controller is configured to communicate via a data bus. The first system device is configured to communicate via a data bus. The system status display is associated with the first system device and configured to produce a visual signal when the first device detects an error or alarm condition.

20 Claims, 22 Drawing Sheets

U.S. PATENT DOCUMENTS

| | | |
|---|---|---|
| 4,703,325 A | 10/1987 | Chamberlin et al. |
| 4,706,247 A | 11/1987 | Yoshioka |
| 4,723,239 A | 2/1988 | Schwartz |
| 4,829,447 A | 5/1989 | Parker et al. |
| 4,841,450 A | 6/1989 | Fredriksson |
| 4,843,084 A | 6/1989 | Parker et al. |
| 4,873,649 A | 10/1989 | Grald et al. |
| 4,884,214 A | 11/1989 | Parker et al. |
| 4,887,262 A | 12/1989 | van Veldhuizen |
| 4,888,728 A | 12/1989 | Shirakawa et al. |
| 4,889,280 A | 12/1989 | Grald et al. |
| 4,931,948 A | 6/1990 | Parker et al. |
| 4,941,143 A | 7/1990 | Twitty et al. |
| 4,942,613 A | 7/1990 | Lynch |
| 4,947,484 A | 8/1990 | Twitty et al. |
| 4,947,928 A | 8/1990 | Parker et al. |
| 4,953,083 A | 8/1990 | Takata et al. |
| 4,955,018 A | 9/1990 | Twitty et al. |
| 4,967,567 A | 11/1990 | Proctor et al. |
| 4,978,896 A | 12/1990 | Shah |
| 4,991,770 A | 2/1991 | Bird et al. |
| 4,996,513 A | 2/1991 | Mak et al. |
| 5,006,827 A | 4/1991 | Brueton et al. |
| 5,018,138 A | 5/1991 | Twitty et al. |
| 5,039,980 A | 8/1991 | Aggers et al. |
| 5,042,997 A | 8/1991 | Rhodes |
| 5,058,388 A | 10/1991 | Shaw et al. |
| 5,061,916 A | 10/1991 | French et al. |
| 5,065,813 A | 11/1991 | Berkeley et al. |
| 5,086,385 A | 2/1992 | Launey et al. |
| 5,103,896 A | 4/1992 | Saga |
| 5,105,366 A | 4/1992 | Beckey |
| 5,115,967 A | 5/1992 | Wedekind |
| 5,128,855 A | 7/1992 | Hilber et al. |
| 5,165,465 A | 11/1992 | Kenet |
| 5,170,935 A | 12/1992 | Federspiel et al. |
| 5,180,102 A | 1/1993 | Gilbert et al. |
| 5,181,653 A | 1/1993 | Foster et al. |
| 5,184,122 A | 2/1993 | Decious et al. |
| 5,191,643 A | 3/1993 | Alsenz |
| 5,195,327 A | 3/1993 | Kim |
| 5,197,666 A | 3/1993 | Wedekind |
| 5,197,668 A | 3/1993 | Ratz et al. |
| 5,203,497 A | 4/1993 | Ratz et al. |
| 5,220,260 A | 6/1993 | Schuler |
| 5,230,482 A | 7/1993 | Ratz et al. |
| 5,259,553 A | 11/1993 | Shyu |
| 5,274,571 A | 12/1993 | Hesse et al. |
| 5,276,630 A | 1/1994 | Baldwin et al. |
| 5,277,036 A | 1/1994 | Dieckmann et al. |
| 5,278,957 A | 1/1994 | Chan |
| 5,279,458 A | 1/1994 | DeWolf et al. |
| 5,297,143 A | 3/1994 | Fridrich et al. |
| 5,314,004 A | 5/1994 | Strand et al. |
| 5,323,385 A | 6/1994 | Jurewicz et al. |
| 5,323,619 A | 6/1994 | Kim |
| 5,327,426 A | 7/1994 | Dolin, Jr. et al. |
| 5,329,991 A | 7/1994 | Mehta et al. |
| 5,337,952 A | 8/1994 | Thompson |
| 5,341,988 A | 8/1994 | Rein et al. |
| 5,355,323 A | 10/1994 | Bae |
| 5,361,982 A | 11/1994 | Liebl et al. |
| 5,374,200 A | 12/1994 | Giroux |
| 5,383,116 A | 1/1995 | Lennartsson |
| 5,384,697 A | 1/1995 | Pascucci |
| 5,414,337 A | 5/1995 | Schuler |
| 5,417,368 A | 5/1995 | Jeffery et al. |
| 5,420,572 A | 5/1995 | Dolin, Jr. et al. |
| 5,434,965 A | 7/1995 | Matheny et al. |
| 5,440,895 A | 8/1995 | Bahel et al. |
| 5,444,626 A | 8/1995 | Schenk |
| 5,444,851 A | 8/1995 | Woest |
| 5,448,180 A | 9/1995 | Kienzler et al. |
| 5,448,561 A | 9/1995 | Kaiser et al. |
| 5,449,047 A | 9/1995 | Schivley, Jr. |
| 5,450,570 A | 9/1995 | Richek et al. |
| 5,452,201 A | 9/1995 | Pieronek et al. |
| 5,460,327 A | 10/1995 | Hill et al. |
| 5,463,735 A | 10/1995 | Pascucci et al. |
| 5,469,150 A | 11/1995 | Sitte |
| 5,475,364 A | 12/1995 | Kenet |
| 5,481,481 A | 1/1996 | Frey et al. |
| 5,481,661 A | 1/1996 | Kobayashi |
| 5,488,834 A | 2/1996 | Schwarz |
| 5,491,649 A | 2/1996 | Friday, Jr. et al. |
| 5,502,818 A | 3/1996 | Lamberg |
| 5,511,188 A | 4/1996 | Pascucci et al. |
| 5,513,324 A | 4/1996 | Dolin, Jr. et al. |
| 5,515,267 A | 5/1996 | Alsenz |
| 5,520,328 A | 5/1996 | Bujak, Jr. |
| 5,522,044 A | 5/1996 | Pascucci et al. |
| 5,530,643 A | 6/1996 | Hodorowski |
| 5,537,339 A | 7/1996 | Naganuma et al. |
| 5,539,778 A | 7/1996 | Kienzler et al. |
| 5,544,036 A | 8/1996 | Brown, Jr. et al. |
| 5,544,809 A | 8/1996 | Keating et al. |
| 5,550,980 A | 8/1996 | Pascucci et al. |
| 5,551,053 A | 8/1996 | Nadolski et al. |
| 5,555,269 A | 9/1996 | Friday, Jr. et al. |
| 5,555,509 A | 9/1996 | Dolan et al. |
| 5,559,407 A | 9/1996 | Dudley et al. |
| 5,559,412 A | 9/1996 | Schuler |
| 5,566,879 A | 10/1996 | Longtin |
| 5,572,658 A | 11/1996 | Mohr et al. |
| 5,574,848 A | 11/1996 | Thomson |
| 5,579,221 A | 11/1996 | Mun |
| 5,581,478 A | 12/1996 | Cruse et al. |
| 5,592,058 A | 1/1997 | Archer et al. |
| 5,592,059 A | 1/1997 | Archer |
| 5,592,628 A | 1/1997 | Ueno et al. |
| 5,596,437 A | 1/1997 | Heins |
| 5,598,566 A | 1/1997 | Pascucci et al. |
| 5,600,782 A | 2/1997 | Thomson |
| 5,613,157 A | 3/1997 | Davidson et al. |
| 5,613,369 A | 3/1997 | Sato et al. |
| 5,617,282 A | 4/1997 | Rall et al. |
| 5,621,662 A | 4/1997 | Humphries et al. |
| 5,628,201 A | 5/1997 | Bahel et al. |
| 5,630,325 A | 5/1997 | Bahel et al. |
| 5,631,825 A | 5/1997 | van Weele et al. |
| 5,634,590 A | 6/1997 | Gorski et al. |
| 5,675,756 A | 10/1997 | Benton et al. |
| 5,675,830 A | 10/1997 | Satula |
| 5,684,463 A | 11/1997 | Diercks et al. |
| 5,684,717 A | 11/1997 | Beilfuss et al. |
| 5,699,243 A | 12/1997 | Eckel et al. |
| 5,706,190 A | 1/1998 | Russ et al. |
| 5,711,480 A | 1/1998 | Zepke et al. |
| 5,720,604 A | 2/1998 | Kelly et al. |
| 5,722,822 A | 3/1998 | Wilson et al. |
| 5,726,900 A | 3/1998 | Walter et al. |
| 5,729,442 A | 3/1998 | Frantz |
| 5,737,529 A | 4/1998 | Dolin, Jr. et al. |
| 5,748,923 A | 5/1998 | Eitrich |
| 5,751,572 A | 5/1998 | Maciulewicz |
| 5,751,948 A | 5/1998 | Dolan et al. |
| 5,754,779 A | 5/1998 | Dolin, Jr. et al. |
| 5,761,083 A | 6/1998 | Brown, Jr. et al. |
| 5,764,146 A | 6/1998 | Baldwin et al. |
| 5,772,326 A | 6/1998 | Batko et al. |
| 5,772,732 A | 6/1998 | James et al. |
| 5,774,322 A | 6/1998 | Walter et al. |
| 5,774,492 A | 6/1998 | Orlowsik, Jr. et al. |
| 5,774,493 A | 6/1998 | Ross |
| 5,777,837 A | 7/1998 | Eckel et al. |
| 5,782,296 A | 7/1998 | Mehta |
| 5,784,647 A | 7/1998 | Sugimoto |
| 5,786,993 A | 7/1998 | Frutiger et al. |
| 5,787,027 A | 7/1998 | Dolan et al. |
| 5,791,332 A | 8/1998 | Thompson et al. |
| 5,793,646 A | 8/1998 | Hibberd et al. |
| 5,801,942 A | 9/1998 | Nixon et al. |
| 5,802,485 A | 9/1998 | Koelle et al. |
| 5,803,357 A | 9/1998 | Lakin |
| 5,809,063 A | 9/1998 | Ashe et al. |
| 5,809,556 A | 9/1998 | Fujisawa et al. |
| 5,816,492 A | 10/1998 | Charles et al. |

| | | | |
|---|---|---|---|
| 5,818,347 A | 10/1998 | Dolan et al. |
| 5,819,845 A | 10/1998 | Ryu et al. |
| 5,822,512 A | 10/1998 | Goodrum et al. |
| 5,826,038 A | 10/1998 | Nakazumi |
| 5,829,674 A | 11/1998 | Vanostrand et al. |
| 5,841,654 A | 11/1998 | Verissimo et al. |
| 5,848,887 A | 12/1998 | Zabielski et al. |
| 5,854,744 A | 12/1998 | Zeng et al. |
| 5,856,972 A | 1/1999 | Riley et al. |
| 5,860,411 A | 1/1999 | Thompson et al. |
| 5,860,473 A | 1/1999 | Seiden |
| 5,862,052 A | 1/1999 | Nixon et al. |
| 5,862,411 A | 1/1999 | Kay et al. |
| 5,864,581 A | 1/1999 | Alger-Meunier et al. |
| 5,873,519 A | 2/1999 | Beilfuss |
| 5,878,236 A | 3/1999 | Kleineberg et al. |
| 5,883,627 A | 3/1999 | Pleyer |
| 5,884,072 A | 3/1999 | Rasmussen |
| 5,892,690 A | 4/1999 | Boatman et al. |
| 5,896,304 A | 4/1999 | Tiemann et al. |
| 5,900,674 A | 5/1999 | Wojnarowski et al. |
| 5,903,454 A | 5/1999 | Hoffberg et al. |
| 5,912,877 A | 6/1999 | Shirai et al. |
| 5,914,453 A | 6/1999 | James et al. |
| 5,915,101 A | 6/1999 | Kleineberg et al. |
| 5,924,486 A | 7/1999 | Ehlers et al. |
| 5,927,398 A | 7/1999 | Maciulewicz |
| 5,930,249 A | 7/1999 | Stademann et al. |
| 5,933,655 A | 8/1999 | Vrabec et al. |
| 5,934,554 A | 8/1999 | Charles et al. |
| 5,937,942 A | 8/1999 | Bias et al. |
| 5,946,209 A | 8/1999 | Eckel et al. |
| 5,971,597 A | 10/1999 | Baldwin et al. |
| 5,973,594 A | 10/1999 | Baldwin et al. |
| 5,974,554 A | 10/1999 | Oh |
| 5,983,353 A | 11/1999 | McHann, Jr. |
| 5,983,646 A | 11/1999 | Grothe et al. |
| 5,993,195 A | 11/1999 | Thompson |
| 6,006,142 A | 12/1999 | Seem et al. |
| 6,011,821 A | 1/2000 | Sauer et al. |
| 6,021,252 A | 2/2000 | Faris et al. |
| 6,028,864 A | 2/2000 | Marttinen et al. |
| 6,032,178 A | 2/2000 | Bacigalupo et al. |
| 6,035,024 A | 3/2000 | Stumer |
| 6,046,410 A | 4/2000 | Wojnarowski et al. |
| 6,049,817 A | 4/2000 | Schoen et al. |
| 6,052,525 A | 4/2000 | Carlson et al. |
| 6,053,416 A | 4/2000 | Specht et al. |
| 6,061,600 A | 5/2000 | Ying |
| 6,061,603 A | 5/2000 | Papadopoulos et al. |
| 6,078,660 A | 6/2000 | Burgess |
| 6,082,894 A | 7/2000 | Batko et al. |
| 6,092,280 A | 7/2000 | Wojnarowski |
| 6,095,674 A | 8/2000 | Verissimo et al. |
| 6,098,116 A | 8/2000 | Nixon et al. |
| 6,101,824 A | 8/2000 | Meyer et al. |
| 6,110,260 A | 8/2000 | Kubokawa |
| 6,115,713 A | 9/2000 | Pascucci et al. |
| 6,138,227 A | 10/2000 | Thewes et al. |
| 6,141,595 A | 10/2000 | Gloudeman et al. |
| 6,145,501 A | 11/2000 | Manohar et al. |
| 6,145,751 A | 11/2000 | Ahmed |
| 6,147,601 A | 11/2000 | Sandelman et al. |
| 6,151,298 A | 11/2000 | Bernhardsson et al. |
| 6,151,529 A | 11/2000 | Batko |
| 6,151,625 A | 11/2000 | Swales et al. |
| 6,151,650 A | 11/2000 | Birzer |
| 6,155,341 A | 12/2000 | Thompson et al. |
| 6,160,477 A | 12/2000 | Sandelman et al. |
| 6,160,484 A | 12/2000 | Spahl et al. |
| 6,160,795 A | 12/2000 | Hosemann |
| 6,167,338 A | 12/2000 | De Wille et al. |
| 6,169,937 B1 | 1/2001 | Peterson |
| 6,169,964 B1 | 1/2001 | Aisa et al. |
| 6,170,044 B1 | 1/2001 | McLaughlin et al. |
| 6,177,945 B1 | 1/2001 | Pleyer |
| 6,179,213 B1 | 1/2001 | Gibino et al. |
| 6,182,130 B1 | 1/2001 | Dolin, Jr. et al. |
| 6,188,642 B1 | 2/2001 | Schoniger et al. |
| 6,190,442 B1 | 2/2001 | Redner |
| 6,208,905 B1 | 3/2001 | Giddings et al. |
| 6,208,924 B1 | 3/2001 | Bauer |
| 6,211,782 B1 | 4/2001 | Sandelman et al. |
| 6,216,066 B1 | 4/2001 | Goebel et al. |
| 6,227,191 B1 | 5/2001 | Garloch |
| 6,232,604 B1 | 5/2001 | McDaniel et al. |
| 6,237,113 B1 | 5/2001 | Daiber |
| 6,240,326 B1 | 5/2001 | Gloudeman et al. |
| 6,241,156 B1 | 6/2001 | Kline et al. |
| 6,252,890 B1 | 6/2001 | Alger-Meunier et al. |
| 6,254,009 B1 | 7/2001 | Proffitt et al. |
| 6,266,205 B1 | 7/2001 | Schreck et al. |
| 6,269,127 B1 | 7/2001 | Richards |
| 6,271,845 B1 | 8/2001 | Richardson |
| 6,282,454 B1 | 8/2001 | Papadopoulos et al. |
| 6,285,912 B1 | 9/2001 | Ellison et al. |
| 6,292,518 B1 | 9/2001 | Grabb et al. |
| 6,298,376 B1 | 10/2001 | Rosner et al. |
| 6,298,454 B1 | 10/2001 | Schleiss et al. |
| 6,298,551 B1 | 10/2001 | Wojnarowski et al. |
| 6,304,557 B1 | 10/2001 | Nakazumi |
| 6,307,331 B1 | 10/2001 | Bonasia et al. |
| 6,324,008 B1 | 11/2001 | Baldwin et al. |
| 6,324,854 B1 | 12/2001 | Jayanth |
| 6,336,065 B1 | 1/2002 | Gibson et al. |
| 6,343,236 B1 | 1/2002 | Gibson et al. |
| 6,349,306 B1 | 2/2002 | Malik et al. |
| 6,349,883 B1 | 2/2002 | Simmons et al. |
| 6,353,775 B1 | 3/2002 | Nichols |
| 6,359,220 B2 | 3/2002 | Schiedegger et al. |
| 6,370,037 B1 | 4/2002 | Schoenfish |
| 6,374,373 B1 | 4/2002 | Heim et al. |
| 6,377,283 B1 | 4/2002 | Thomas |
| 6,385,510 B1 | 5/2002 | Hoog et al. |
| 6,390,806 B1 | 5/2002 | Dempsey et al. |
| 6,393,023 B1 | 5/2002 | Shimizu et al. |
| 6,400,996 B1 | 6/2002 | Hoffberg et al. |
| 6,405,104 B1 | 6/2002 | Dougherty |
| 6,408,228 B1 | 6/2002 | Seem et al. |
| 6,411,701 B1 | 6/2002 | Stademann |
| 6,411,857 B1 | 6/2002 | Flood |
| 6,412,435 B1 | 7/2002 | Timmons, Jr. |
| 6,415,395 B1 | 7/2002 | Varma et al. |
| 6,418,507 B1 | 7/2002 | Fackler |
| 6,423,118 B1 | 7/2002 | Becerra et al. |
| 6,424,872 B1 | 7/2002 | Glanzer et al. |
| 6,424,874 B1 | 7/2002 | Cofer |
| 6,427,454 B1 | 8/2002 | West |
| 6,429,845 B1 | 8/2002 | Unseld et al. |
| 6,430,953 B2 | 8/2002 | Roh |
| 6,434,715 B1 | 8/2002 | Andersen |
| 6,435,418 B1 | 8/2002 | Toth et al. |
| 6,437,691 B1 | 8/2002 | Sandelman et al. |
| 6,437,805 B1 | 8/2002 | Sojoodi et al. |
| 6,441,723 B1 | 8/2002 | Mansfield et al. |
| 6,442,952 B2 | 9/2002 | Roh et al. |
| 6,448,896 B1 | 9/2002 | Bankus et al. |
| 6,449,315 B2 | 9/2002 | Richards |
| 6,450,409 B1 | 9/2002 | Rowlette et al. |
| 6,453,374 B1 | 9/2002 | Kovalan et al. |
| 6,454,177 B1 | 9/2002 | Sasao et al. |
| 6,462,654 B1 | 10/2002 | Sandelman et al. |
| 6,478,084 B1 | 11/2002 | Kumar et al. |
| 6,493,661 B1 | 12/2002 | White et al. |
| 6,497,570 B1 | 12/2002 | Sears et al. |
| 6,498,844 B1 | 12/2002 | Stademann |
| 6,501,995 B1 | 12/2002 | Kinney et al. |
| 6,504,338 B1 | 1/2003 | Eichorn |
| 6,505,087 B1 | 1/2003 | Lucas et al. |
| 6,508,407 B1 | 1/2003 | Lefkowitz et al. |
| 6,526,122 B2 | 2/2003 | Matsushita et al. |
| 6,535,123 B2 | 3/2003 | Sandelman et al. |
| 6,535,138 B1 | 3/2003 | Dolan et al. |
| 6,539,489 B1 | 3/2003 | Reinert |
| 6,540,148 B1 | 4/2003 | Salsbury et al. |
| 6,542,462 B1 | 4/2003 | Sohraby et al. |
| 6,543,007 B1 | 4/2003 | Bliley et al. |
| 6,545,660 B1 | 4/2003 | Shen et al. |

| | | |
|---|---|---|
| 6,546,008 B1 | 4/2003 | Wehrend |
| 6,552,647 B1 | 4/2003 | Thiessen et al. |
| 6,554,198 B1 | 4/2003 | Hull et al. |
| 6,560,976 B2 | 5/2003 | Jayanth |
| 6,564,348 B1 | 5/2003 | Barenys et al. |
| 6,567,476 B2 | 5/2003 | Kohl et al. |
| 6,572,363 B1 | 6/2003 | Virgil, Jr. et al. |
| 6,574,215 B2 | 6/2003 | Hummel |
| 6,574,234 B1 | 6/2003 | Myer et al. |
| 6,574,581 B1 | 6/2003 | Bohrer et al. |
| 6,575,233 B1 | 6/2003 | Krumnow |
| 6,580,950 B1 | 6/2003 | Johnson et al. |
| 6,587,039 B1 | 7/2003 | Woestemeyer et al. |
| 6,587,739 B1 | 7/2003 | Abrams et al. |
| 6,587,884 B1 | 7/2003 | Papadopoulos et al. |
| 6,594,272 B1 | 7/2003 | Ketcham et al. |
| 6,595,430 B1 | 7/2003 | Shah |
| 6,600,923 B1 | 7/2003 | Dzuban |
| 6,608,560 B2 | 8/2003 | Abrams |
| 6,609,127 B1 | 8/2003 | Lee et al. |
| 6,615,088 B1 | 9/2003 | Myer et al. |
| 6,615,594 B2 | 9/2003 | Jayanth et al. |
| 6,618,394 B1 | 9/2003 | Hilleary |
| 6,619,555 B2 | 9/2003 | Rosen |
| 6,621,507 B1 | 9/2003 | Shah |
| 6,622,926 B1 | 9/2003 | Sartain et al. |
| 6,628,993 B1 | 9/2003 | Bauer |
| 6,633,781 B1 | 10/2003 | Lee et al. |
| 6,636,771 B1 | 10/2003 | Varma et al. |
| 6,639,939 B1 | 10/2003 | Naden et al. |
| 6,640,145 B2 | 10/2003 | Hoffberg et al. |
| 6,640,890 B1 | 11/2003 | Dage et al. |
| 6,643,689 B2 | 11/2003 | Rode et al. |
| 6,644,557 B1 | 11/2003 | Jacobs |
| 6,647,317 B2 | 11/2003 | Takai et al. |
| 6,650,949 B1 | 11/2003 | Fera et al. |
| 6,651,034 B1 | 11/2003 | Hedlund et al. |
| 6,658,373 B2 | 12/2003 | Rossi et al. |
| RE38,406 E | 1/2004 | Faris et al. |
| 6,681,215 B2 | 1/2004 | Jammu |
| 6,688,387 B1 | 2/2004 | Wellington et al. |
| 6,704,688 B2 | 3/2004 | Aslam et al. |
| 6,708,239 B1 | 3/2004 | Ellerbrock et al. |
| 6,715,120 B1 | 3/2004 | Hladik et al. |
| 6,715,302 B2 | 4/2004 | Ferragut, II |
| 6,715,690 B2 | 4/2004 | Hull et al. |
| 6,717,513 B1 | 4/2004 | Sandelman et al. |
| 6,717,919 B1 | 4/2004 | Ketcham et al. |
| 6,718,384 B2 | 4/2004 | Linzy |
| 6,722,143 B2 | 4/2004 | Moon et al. |
| 6,725,180 B2 | 4/2004 | Mayer et al. |
| 6,725,398 B1 | 4/2004 | Varma et al. |
| 6,728,369 B2 | 4/2004 | Burgess |
| 6,732,191 B1 | 5/2004 | Baker et al. |
| 6,735,196 B1 | 5/2004 | Manzardo |
| 6,735,282 B2 | 5/2004 | Matsushita et al. |
| 6,735,965 B2 | 5/2004 | Moon et al. |
| 6,738,676 B2 | 5/2004 | Hirayama |
| 6,741,915 B2 | 5/2004 | Poth |
| 6,744,771 B1 | 6/2004 | Barber et al. |
| 6,745,106 B2 | 6/2004 | Howard et al. |
| 6,747,888 B2 | 6/2004 | Klein |
| 6,758,050 B2 | 7/2004 | Jayanth et al. |
| 6,758,051 B2 | 7/2004 | Jayanth et al. |
| 6,763,040 B1 | 7/2004 | Hite et al. |
| 6,763,272 B2 | 7/2004 | Knepper |
| 6,765,993 B2 | 7/2004 | Cueman |
| 6,768,732 B1 | 7/2004 | Neuhaus |
| 6,774,786 B1 | 8/2004 | Havekost et al. |
| 6,779,176 B1 | 8/2004 | Chambers, II et al. |
| 6,783,079 B2 | 8/2004 | Carey et al. |
| 6,789,739 B2 | 9/2004 | Rosen |
| 6,791,530 B2 | 9/2004 | Vernier et al. |
| 6,795,935 B1 | 9/2004 | Unkle et al. |
| 6,798,341 B1 | 9/2004 | Eckel et al. |
| 6,801,524 B2 | 10/2004 | Eteminan |
| 6,804,564 B2 | 10/2004 | Crispin et al. |
| 6,810,333 B2 | 10/2004 | Adedeji et al. |
| 6,814,299 B1 | 11/2004 | Carey |
| 6,814,660 B1 | 11/2004 | Cavett |
| 6,816,071 B2 | 11/2004 | Conti |
| 6,817,757 B1 | 11/2004 | Wallace |
| 6,819,802 B2 | 11/2004 | Higgs et al. |
| 6,822,202 B2 | 11/2004 | Atlas |
| 6,823,680 B2 | 11/2004 | Jayanth |
| 6,824,069 B2 | 11/2004 | Rosen |
| 6,826,454 B2 | 11/2004 | Sulfstede |
| 6,826,590 B1 | 11/2004 | Glanzer et al. |
| 6,832,118 B1 | 12/2004 | Heberlein et al. |
| 6,833,787 B1 | 12/2004 | Levi |
| 6,833,844 B1 | 12/2004 | Shiota et al. |
| 6,840,052 B2 | 1/2005 | Smith et al. |
| 6,842,117 B2 | 1/2005 | Keown |
| 6,842,808 B2 | 1/2005 | Weigl et al. |
| 6,845,918 B2 | 1/2005 | Rotondo |
| 6,850,992 B2 | 2/2005 | Heinrich et al. |
| 6,851,948 B2 | 2/2005 | Dempsey et al. |
| 6,853,291 B1 | 2/2005 | Aisa |
| 6,854,444 B2 | 2/2005 | Plagge et al. |
| 6,865,449 B2 | 3/2005 | Dudley |
| 6,865,596 B1 | 3/2005 | Barber et al. |
| 6,865,898 B2 | 3/2005 | Yamanashi et al. |
| 6,866,375 B2 | 3/2005 | Leighton et al. |
| 6,868,292 B2 | 3/2005 | Ficco et al. |
| 6,868,900 B2 | 3/2005 | Dage et al. |
| 6,874,693 B2 | 4/2005 | Readio et al. |
| 6,876,891 B1 | 4/2005 | Schuler et al. |
| 6,879,881 B1 | 4/2005 | Attridge, Jr. |
| 6,888,441 B2 | 5/2005 | Carey |
| 6,892,121 B2 | 5/2005 | Schmidt |
| 6,894,703 B2 | 5/2005 | Vernier et al. |
| 6,900,808 B2 | 5/2005 | Lassiter et al. |
| 6,901,316 B1 | 5/2005 | Jensen et al. |
| 6,901,439 B1 | 5/2005 | Bonasia et al. |
| 6,907,329 B2 | 6/2005 | Junger et al. |
| 6,909,948 B2 | 6/2005 | Mollmann et al. |
| 6,914,893 B2 | 7/2005 | Petite |
| 6,918,064 B2 | 7/2005 | Mueller et al. |
| 6,920,318 B2 | 7/2005 | Brooking et al. |
| 6,925,360 B2 | 8/2005 | Yoon et al. |
| 6,931,645 B2 | 8/2005 | Murching et al. |
| 6,938,106 B2 | 8/2005 | Ellerbrock et al. |
| 6,941,193 B2 | 9/2005 | Frecska et al. |
| 6,944,785 B2 | 9/2005 | Gadir et al. |
| 6,954,680 B2 | 10/2005 | Kreidler et al. |
| 6,955,060 B2 | 10/2005 | Homan et al. |
| 6,955,302 B2 | 10/2005 | Erdman, Jr. |
| 6,956,424 B2 | 10/2005 | Hohnel |
| 6,957,696 B1 | 10/2005 | Krumnow |
| 6,963,288 B1 | 11/2005 | Sokol et al. |
| 6,963,922 B2 | 11/2005 | Papadopoulos et al. |
| 6,965,802 B2 | 11/2005 | Sexton |
| 6,967,565 B2 | 11/2005 | Lingemann |
| 6,968,295 B1 | 11/2005 | Carr |
| 6,973,366 B2 | 12/2005 | Komai |
| 6,975,219 B2 | 12/2005 | Eryurek et al. |
| 6,975,913 B2 | 12/2005 | Kreidler et al. |
| 6,975,958 B2 | 12/2005 | Bohrer et al. |
| 6,980,796 B1 | 12/2005 | Cuellar et al. |
| 6,981,266 B1 | 12/2005 | An et al. |
| 6,983,271 B2 | 1/2006 | Morrow et al. |
| 6,983,889 B2 | 1/2006 | Alles |
| 6,988,011 B2 | 1/2006 | Varma et al. |
| 6,988,671 B2 | 1/2006 | DeLuca |
| 6,990,381 B2 | 1/2006 | Nomura et al. |
| 6,990,540 B2 | 1/2006 | Dalakuras et al. |
| 6,993,414 B2 | 1/2006 | Shah |
| RE38,985 E | 2/2006 | Boatman et al. |
| 6,994,620 B2 | 2/2006 | Mills |
| 6,999,473 B2 | 2/2006 | Windecker |
| 6,999,824 B2 | 2/2006 | Glanzer et al. |
| 7,000,849 B2 | 2/2006 | Ashworth et al. |
| 7,002,462 B2 | 2/2006 | Welch |
| 7,003,378 B2 | 2/2006 | Poth |
| 7,006,460 B1 | 2/2006 | Vollmer et al. |
| 7,006,881 B1 | 2/2006 | Hoffberg et al. |
| 7,013,239 B2 | 3/2006 | Hedlund et al. |
| 7,017,827 B2 | 3/2006 | Shah et al. |

| | | | | | | |
|---|---|---|---|---|---|---|
| 7,020,798 | B2 | 3/2006 | Meng et al. | 7,174,728 B2 | 2/2007 | Jayanth |
| 7,022,008 | B1 | 4/2006 | Crocker | 7,175,086 B2 | 2/2007 | Gascoyne et al. |
| 7,024,282 | B2 | 4/2006 | Coogan et al. | 7,175,098 B2 | 2/2007 | DeLuca |
| 7,024,283 | B2 | 4/2006 | Bicknell | 7,177,926 B2 | 2/2007 | Kramer |
| 7,025,281 | B2 | 4/2006 | DeLuca | 7,181,317 B2 | 2/2007 | Amundson et al. |
| 7,027,808 | B2 | 4/2006 | Wesby | 7,185,262 B2 | 2/2007 | Barthel et al. |
| 7,029,391 | B2 | 4/2006 | Nagaya et al. | 7,186,290 B2 | 3/2007 | Sheehan et al. |
| 7,031,880 | B1 | 4/2006 | Seem et al. | 7,187,354 B2 | 3/2007 | Min et al. |
| 7,032,018 | B2 | 4/2006 | Lee et al. | 7,187,986 B2 | 3/2007 | Johnson et al. |
| 7,035,719 | B2 | 4/2006 | Howard et al. | 7,188,002 B2 | 3/2007 | Chapman, Jr. et al. |
| 7,035,898 | B1 | 4/2006 | Baker | 7,188,207 B2 | 3/2007 | Mitter |
| 7,036,743 | B2 | 5/2006 | Shah | 7,188,482 B2 | 3/2007 | Sadegh et al. |
| 7,043,339 | B2 | 5/2006 | Maeda et al. | 7,188,779 B2 | 3/2007 | Alles |
| 7,044,397 | B2 | 5/2006 | Bartlett et al. | 7,191,028 B2 | 3/2007 | Nomura et al. |
| 7,047,092 | B2 | 5/2006 | Wimsatt | 7,194,663 B2 | 3/2007 | Fletcher et al. |
| 7,051,282 | B2 | 5/2006 | Marcjan | 7,195,211 B2 | 3/2007 | Kande et al. |
| 7,055,759 | B2 | 6/2006 | Wacker et al. | 7,197,717 B2 | 3/2007 | Anderson et al. |
| 7,058,459 | B2 | 6/2006 | Weiberle et al. | 7,200,450 B2 | 4/2007 | Boyer et al. |
| 7,058,477 | B1 | 6/2006 | Rosen | 7,203,165 B1 | 4/2007 | Kowalewski |
| 7,058,693 | B1 | 6/2006 | Baker, Jr. | 7,203,575 B2 | 4/2007 | Maturana et al. |
| 7,058,737 | B2 | 6/2006 | Ellerbrock et al. | 7,203,776 B2 | 4/2007 | Junger et al. |
| 7,062,927 | B2 | 6/2006 | Kwon et al. | 7,206,646 B2 | 4/2007 | Nixon et al. |
| 7,068,612 | B2 | 6/2006 | Berkcan et al. | 7,206,647 B2 | 4/2007 | Kumar |
| 7,076,962 | B2 | 7/2006 | He et al. | 7,209,485 B2 | 4/2007 | Guse |
| 7,082,339 | B2 | 7/2006 | Murray et al. | 7,209,748 B2 | 4/2007 | Wong et al. |
| 7,082,352 | B2 | 7/2006 | Lim | 7,212,825 B2 | 5/2007 | Wong et al |
| 7,083,109 | B2 | 8/2006 | Pouchak | 7,213,044 B2 | 5/2007 | Tjong et a |
| 7,085,626 | B2 | 8/2006 | Harrod et al. | 7,216,016 B2 | 5/2007 | Van Ostrand et al. |
| 7,085,814 | B1 | 8/2006 | Gandhi et al. | 7,216,017 B2 | 5/2007 | Kwon et al. |
| 7,089,087 | B2 | 8/2006 | Dudley | 7,216,497 B2 | 5/2007 | Hull et al. |
| 7,089,088 | B2 | 8/2006 | Terry et al. | 7,218,589 B2 | 5/2007 | Wisnudel et al. |
| 7,089,530 | B1 | 8/2006 | Dardinski et al. | 7,218,996 B1 | 5/2007 | Beitelmal et al. |
| 7,092,768 | B1 | 8/2006 | Labuda | 7,219,141 B2 | 5/2007 | Bonasia et al. |
| 7,092,772 | B2 | 8/2006 | Murray et al. | 7,222,111 B1 | 5/2007 | Budike, Jr. |
| 7,092,794 | B1 | 8/2006 | Hill et al. | 7,222,152 B1 | 5/2007 | Thompson et al. |
| 7,096,078 | B2 | 8/2006 | Burr et al. | 7,222,493 B2 | 5/2007 | Jayanth et al. |
| 7,096,285 | B2 | 8/2006 | Ellerbrock et al. | 7,222,494 B2 | 5/2007 | Peterson et al. |
| 7,096,465 | B1 | 8/2006 | Dardinski et al. | 7,224,366 B2 | 5/2007 | Kessler et al. |
| 7,099,965 | B2 | 8/2006 | Ellerbrock et al. | 7,225,054 B2 | 5/2007 | Amundson et al. |
| 7,100,382 | B2 | 9/2006 | Butler et al. | 7,225,356 B2 | 5/2007 | Monitzer |
| 7,103,000 | B1 | 9/2006 | Rode et al. | 7,228,187 B2 | 6/2007 | Ticky et al. |
| 7,103,016 | B1 | 9/2006 | Duffy et al. | 7,232,058 B2 | 6/2007 | Lee |
| 7,103,420 | B2 | 9/2006 | Brown et al. | 7,233,229 B2 | 6/2007 | Stroupe et al. |
| 7,110,835 | B2 | 9/2006 | Blevins et al. | 7,239,623 B2 | 7/2007 | Burghardt et al. |
| 7,114,088 | B2 | 9/2006 | Horbelt | 7,242,988 B1 | 7/2007 | Hoffberg et al. |
| 7,114,554 | B2 | 10/2006 | Bergman et al. | 7,243,004 B2 | 7/2007 | Shah et al. |
| 7,117,050 | B2 | 10/2006 | Sasaki et al. | 7,244,294 B2 | 7/2007 | Kates |
| 7,117,051 | B2 | 10/2006 | Landry et al. | 7,246,753 B2 | 7/2007 | Hull et al. |
| 7,117,395 | B2 | 10/2006 | Opaterny | 7,248,576 B2 | 7/2007 | Hoffmann |
| 7,120,036 | B2 | 10/2006 | Kyono | 7,251,534 B2 | 7/2007 | Walls et al. |
| 7,123,428 | B2 | 10/2006 | Yeo et al. | 7,257,813 B1 | 8/2007 | Mayer et al. |
| 7,123,774 | B2 | 10/2006 | Dhavala et al. | 7,259,666 B1 | 8/2007 | Hermsmeyer et al. |
| 7,127,305 | B1 | 10/2006 | Palmon | 7,260,084 B2 | 8/2007 | Saller |
| 7,127,327 | B1 | 10/2006 | O'Donnell et al. | 7,260,451 B2 | 8/2007 | Takai et al. |
| 7,130,409 | B2 | 10/2006 | Beyda | 7,260,609 B2 | 8/2007 | Fuehrer et al. |
| 7,130,719 | B2 | 10/2006 | Ehlers et al. | 7,260,948 B2 | 8/2007 | Jayanth et al. |
| 7,133,407 | B2 | 11/2006 | Jinzaki et al. | 7,261,241 B2 | 8/2007 | Eoga |
| 7,133,748 | B2 | 11/2006 | Robinson | 7,261,243 B2 | 8/2007 | Butler et al. |
| 7,133,749 | B2 | 11/2006 | Goldberg et al. | 7,261,762 B2 | 8/2007 | Kang et al. |
| 7,135,982 | B2 | 11/2006 | Lee | 7,266,775 B2 | 9/2007 | Patitucci |
| 7,139,550 | B2 | 11/2006 | Cuellar et al. | 7,266,960 B2 | 9/2007 | Shah |
| 7,142,948 | B2 | 11/2006 | Metz | 7,269,962 B2 | 9/2007 | Bachmann |
| 7,146,230 | B2 | 12/2006 | Glanzer et al. | 7,272,154 B2 | 9/2007 | Loebig |
| 7,146,231 | B2 | 12/2006 | Schleiss et al. | 7,272,452 B2 | 9/2007 | Coogan et al. |
| 7,146,253 | B2 | 12/2006 | Hoog et al. | 7,272,457 B2 | 9/2007 | Glanzer et al. |
| 7,150,408 | B2 | 12/2006 | DeLuca | 7,274,972 B2 | 9/2007 | Amundson et al. |
| 7,155,318 | B2 | 12/2006 | Sharma et al. | 7,274,973 B2 | 9/2007 | Nichols et al. |
| 7,155,499 | B2 | 12/2006 | Soemo et al. | 7,277,280 B2 | 10/2007 | Peng |
| 7,156,316 | B2 | 1/2007 | Kates | 7,277,970 B2 | 10/2007 | Ellerbrock et al. |
| 7,162,512 | B1 | 1/2007 | Amit et al. | 7,278,103 B1 | 10/2007 | Clark et al. |
| 7,162,883 | B2 | 1/2007 | Jayanth et al. | 7,281,697 B2 | 10/2007 | Reggiani |
| 7,163,156 | B2 | 1/2007 | Kates | 7,287,062 B2 | 10/2007 | Im et al. |
| 7,163,158 | B2 | 1/2007 | Rossi et al. | 7,287,708 B2 | 10/2007 | Lucas et al. |
| 7,167,762 | B2 | 1/2007 | Glanzer et al. | 7,287,709 B2 | 10/2007 | Proffitt et al. |
| 7,168,627 | B2 | 1/2007 | Kates | 7,289,458 B2 | 10/2007 | Gila et al. |
| 7,171,579 | B2 | 1/2007 | Weigl et al. | 7,292,900 B2 | 11/2007 | Kreidler et al. |
| 7,172,132 | B2 | 2/2007 | Proffitt et al. | 7,293,422 B2 | 11/2007 | Parachini et al. |
| 7,172,160 | B2 | 2/2007 | Piel et al. | 7,295,099 B2 | 11/2007 | Lee et al. |
| 7,174,239 | B2 | 2/2007 | Butler et al. | 7,296,426 B2 | 11/2007 | Butler et al. |

| | | | |
|---|---|---|---|
| 7,299,279 B2 | 11/2007 | Sadaghiany | |
| 7,299,996 B2 | 11/2007 | Garrett et al. | |
| 7,301,699 B2 | 11/2007 | Kanamori et al. | |
| 7,302,642 B2 | 11/2007 | Smith et al. | |
| 7,305,495 B2 | 12/2007 | Carter | |
| 7,306,165 B2 | 12/2007 | Shah | |
| 7,310,559 B2 | 12/2007 | Walko, Jr. | |
| 7,313,465 B1 | 12/2007 | O'Donnell | |
| 7,313,716 B2 | 12/2007 | Weigl et al. | |
| 7,313,923 B2 | 1/2008 | Jayanth et al. | |
| 7,315,768 B2 | 1/2008 | Dang et al. | |
| 7,317,970 B2 | 1/2008 | Pienta et al. | |
| 7,318,089 B1 | 1/2008 | Stachura et al. | |
| 7,320,110 B2 | 1/2008 | Shah | |
| 7,324,874 B2 | 1/2008 | Jung | |
| 7,327,376 B2 | 2/2008 | Shen et al. | |
| 7,327,815 B1 | 2/2008 | Jurisch | |
| 7,330,512 B2 | 2/2008 | Frank et al. | |
| 7,331,191 B2 | 2/2008 | He et al. | |
| 7,334,161 B2 | 2/2008 | Williams et al. | |
| 7,336,650 B2 | 2/2008 | Franz et al. | |
| 7,337,191 B2 | 2/2008 | Haeberle et al. | |
| 7,337,369 B2 | 2/2008 | Barthel et al. | |
| 7,337,619 B2 | 3/2008 | Hsieh et al. | |
| 7,343,226 B2 | 3/2008 | Ehlers et al. | |
| 7,346,404 B2 | 3/2008 | Eryurek et al. | |
| 7,346,433 B2 | 3/2008 | Budike, Jr. | |
| 7,346,835 B1 | 3/2008 | Lobinger et al. | |
| 7,349,761 B1 | 3/2008 | Cruse | |
| 7,354,005 B2 | 4/2008 | Carey et al. | |
| 7,356,050 B2 | 4/2008 | Reindl et al. | |
| 7,359,335 B2 | 4/2008 | Knop et al. | |
| 7,359,345 B2 | 4/2008 | Chang et al. | |
| 7,360,002 B2 | 4/2008 | Brueckner et al. | |
| 7,360,370 B2 | 4/2008 | Shah et al. | |
| 7,360,717 B2 | 4/2008 | Shah | |
| 7,364,093 B2 | 4/2008 | Garozzo | |
| 7,365,812 B2 | 4/2008 | Lee | |
| 7,366,498 B2 | 4/2008 | Ko et al. | |
| 7,366,944 B2 | 4/2008 | Oshins et al. | |
| 7,370,074 B2 | 5/2008 | Alexander et al. | |
| 7,377,450 B2 | 5/2008 | Van Ostrand et al. | |
| 7,379,791 B2 | 5/2008 | Tamarkin et al. | |
| 7,379,997 B2 | 5/2008 | Ehlers et al. | |
| 7,383,158 B2 | 6/2008 | Krocker et al. | |
| 7,389,150 B2 | 6/2008 | Inoue et al. | |
| 7,389,204 B2 | 6/2008 | Eryurek et al. | |
| RE40,437 E | 7/2008 | Rosen et al. | |
| 7,392,661 B2 | 7/2008 | Alles | |
| 7,395,122 B2 | 7/2008 | Kreidler et al. | |
| 7,395,137 B2 | 7/2008 | Robinson | |
| 7,403,128 B2 | 7/2008 | Scuka et al. | |
| 7,412,839 B2 | 8/2008 | Jayanth | |
| 7,412,842 B2 | 8/2008 | Pham | |
| 7,418,428 B2 | 8/2008 | Ehlers et al. | |
| 7,424,345 B2 | 9/2008 | Norbeck | |
| D578,026 S | 10/2008 | Roher et al. | |
| 7,433,740 B2 | 10/2008 | Hesse et al. | |
| 7,434,744 B2 | 10/2008 | Garozzo et al. | |
| 7,436,292 B2 | 10/2008 | Rourke et al. | |
| 7,436,293 B2 | 10/2008 | Rourke et al. | |
| 7,436,296 B2 | 10/2008 | Rourke et al. | |
| 7,436,400 B2 | 10/2008 | Cheng | |
| 7,437,198 B2 | 10/2008 | Iwaki | |
| 7,439,862 B2 | 10/2008 | Quan | |
| 7,441,094 B2 | 10/2008 | Stephens | |
| 7,446,660 B2 | 11/2008 | Posamentier | |
| 7,448,435 B2 | 11/2008 | Garozzo | |
| 7,451,937 B2 | 11/2008 | Flood et al. | |
| 7,454,269 B1 | 11/2008 | Dushane et al. | |
| 7,455,240 B2 | 11/2008 | Chapman, Jr. et al. | |
| 7,457,853 B1 | 11/2008 | Chari et al. | |
| 7,460,933 B2 | 12/2008 | Chapman, Jr. et al. | |
| 7,476,988 B2 | 1/2009 | Mulhouse et al. | |
| 7,516,106 B2 | 4/2009 | Ehlers et al. | |
| 7,526,364 B2 | 4/2009 | Rule et al. | |
| 7,567,844 B2 | 7/2009 | Thomas et al. | |
| 7,571,195 B2 | 8/2009 | Billingsley et al. | |
| 7,571,355 B2 | 8/2009 | Shabalin | |
| 7,574,871 B2 | 8/2009 | Bloemer et al. |
| 7,584,897 B2 | 9/2009 | Schultz et al. |
| 7,587,459 B2 | 9/2009 | Wewalaarachchi et al. |
| 7,593,124 B1 | 9/2009 | Sheng et al. |
| 7,593,787 B2 | 9/2009 | Feingold et al. |
| 7,604,046 B2 | 10/2009 | Bergman et al. |
| 7,624,931 B2 | 12/2009 | Chapman et al. |
| 7,641,126 B2 | 1/2010 | Schultz et al. |
| 7,650,323 B2 | 1/2010 | Hesse et al. |
| D610,475 S | 2/2010 | Beers et al. |
| 7,693,583 B2 | 4/2010 | Wolff et al. |
| 7,693,591 B2 | 4/2010 | Hoglund et al. |
| 7,706,923 B2 | 4/2010 | Amundson et al. |
| 7,730,223 B1 | 6/2010 | Bavor et al. |
| 7,734,572 B2 | 6/2010 | Wiemeyer et al. |
| 7,743,124 B2 | 6/2010 | Holdaway et al. |
| 7,747,757 B2 | 6/2010 | Gargiulo et al. |
| 7,752,289 B2 | 7/2010 | Kikkawa et al. |
| 7,761,563 B2 | 7/2010 | Shike et al. |
| 7,774,102 B2 | 8/2010 | Butler et al. |
| 7,797,349 B2 | 9/2010 | Kosaka |
| 7,809,472 B1 | 10/2010 | Silva et al. |
| 7,827,963 B2 | 11/2010 | Li et al. |
| 7,847,790 B2 | 12/2010 | Bewley et al. |
| 7,861,941 B2 | 1/2011 | Schultz et al. |
| 7,870,080 B2 | 1/2011 | Budike, Jr. |
| 7,886,166 B2 | 2/2011 | Shnekendorf et al. |
| 7,904,209 B2 | 3/2011 | Podgorny et al. |
| 7,934,504 B2 | 5/2011 | Lowe et al. |
| 7,949,615 B2 | 5/2011 | Ehlers et al. |
| 7,963,454 B2 | 6/2011 | Sullivan et al. |
| D642,081 S | 7/2011 | Kashimoto |
| 7,979,164 B2 | 7/2011 | Garozzo et al. |
| 8,005,576 B2 | 8/2011 | Rodgers |
| 8,024,054 B2 | 9/2011 | Mairs et al. |
| 8,032,254 B2 | 10/2011 | Amundson et al. |
| 8,042,049 B2 | 10/2011 | Killian et al. |
| D648,641 S | 11/2011 | Wallaert et al. |
| D648,642 S | 11/2011 | Wallaert et al. |
| 8,050,801 B2 | 11/2011 | Richards et al. |
| 8,082,068 B2 | 12/2011 | Rodgers |
| 8,083,154 B2 | 12/2011 | Schultz et al. |
| 8,087,593 B2 | 1/2012 | Leen |
| 8,091,796 B2 | 1/2012 | Amundson et al. |
| 8,099,178 B2 | 1/2012 | Mairs et al. |
| 8,103,390 B2 | 1/2012 | Rodgers |
| 8,112,181 B2 | 2/2012 | Remsburg |
| 8,116,917 B2 | 2/2012 | Rodgers |
| 8,122,110 B1 | 2/2012 | Wilbur et al. |
| 8,127,060 B2 | 2/2012 | Doll et al. |
| 8,167,216 B2 | 5/2012 | Schultz et al. |
| 8,183,995 B2 | 5/2012 | Wang et al. |
| 8,219,249 B2 | 7/2012 | Harrod et al. |
| 8,224,491 B2 | 7/2012 | Koster et al. |
| 8,239,066 B2 | 8/2012 | Jennings et al. |
| 8,239,073 B2 | 8/2012 | Fausak et al. |
| 8,244,383 B2 | 8/2012 | Bergman et al. |
| 8,255,090 B2 | 8/2012 | Frader-Thompson |
| 2001/0025349 A1 | 9/2001 | Sharood et al. |
| 2001/0034586 A1 | 10/2001 | Ewert et al. |
| 2001/0048376 A1 | 12/2001 | Maeda et al. |
| 2001/0055311 A1 | 12/2001 | Trachewsky et al. |
| 2002/0002425 A1 | 1/2002 | Dossey et al. |
| 2002/0013897 A1 | 1/2002 | McTernan et al. |
| 2002/0016639 A1 | 2/2002 | Smith et al. |
| 2002/0022894 A1 | 2/2002 | Eryurek et al. |
| 2002/0026476 A1 | 2/2002 | Miyazaki et al. |
| 2002/0033252 A1 | 3/2002 | Sasao et al. |
| 2002/0048194 A1 | 4/2002 | Klein |
| 2002/0072814 A1 | 6/2002 | Schuler et al. |
| 2002/0091784 A1 | 7/2002 | Baker et al. |
| 2002/0104323 A1 | 8/2002 | Rash et al. |
| 2002/0116550 A1 | 8/2002 | Hansen |
| 2002/0123896 A1 | 9/2002 | Diez et al. |
| 2002/0124211 A1 | 9/2002 | Gray et al. |
| 2002/0143523 A1 | 10/2002 | Balaji et al. |
| 2002/0152298 A1 | 10/2002 | Kikta et al. |
| 2002/0157054 A1 | 10/2002 | Shin et al. |
| 2002/0163427 A1 | 11/2002 | Eryurek et al. |

| | | | | | | |
|---|---|---|---|---|---|---|
| 2002/0178288 A1 | 11/2002 | McLeod | | 2005/0119766 A1 | 6/2005 | Amundson et al. |
| 2002/0190242 A1 | 12/2002 | Iillie et al. | | 2005/0119771 A1 | 6/2005 | Amundson et al. |
| 2002/0191026 A1 | 12/2002 | Rodden et al. | | 2005/0119793 A1 | 6/2005 | Amundson et al. |
| 2002/0191603 A1 | 12/2002 | Shin et al. | | 2005/0119794 A1 | 6/2005 | Amundson et al. |
| 2003/0058863 A1 | 3/2003 | Oost | | 2005/0120012 A1 | 6/2005 | Poth et al. |
| 2003/0061340 A1 | 3/2003 | Sun et al. | | 2005/0125495 A1 | 6/2005 | Tjong et al. |
| 2003/0078677 A1 | 4/2003 | Hull et al. | | 2005/0143138 A1 | 6/2005 | Lee et al. |
| 2003/0088338 A1 | 5/2003 | Phillips et al. | | 2005/0145705 A1 | 7/2005 | Shah et al. |
| 2003/0097482 A1 | 5/2003 | DeHart et al. | | 2005/0150967 A1 | 7/2005 | Chapman, Jr. et al. |
| 2003/0108064 A1 | 6/2003 | Bilke et al. | | 2005/0154494 A1 | 7/2005 | Ahmed |
| 2003/0115177 A1 | 6/2003 | Takanabe et al. | | 2005/0159848 A1 | 7/2005 | Shah et al. |
| 2003/0116637 A1 | 6/2003 | Ellingham | | 2005/0159924 A1 | 7/2005 | Shah et al. |
| 2003/0154355 A1 | 8/2003 | Fernandez | | 2005/0161517 A1 | 7/2005 | Helt et al. |
| 2003/0206100 A1 | 11/2003 | Richman et al. | | 2005/0166610 A1 | 8/2005 | Jayanth |
| 2003/0229784 A1 | 12/2003 | Cuellar et al. | | 2005/0176410 A1 | 8/2005 | Brooking et al. |
| 2004/0001478 A1 | 1/2004 | Wong | | 2005/0182498 A1 | 8/2005 | Landou et al. |
| 2004/0003051 A1 | 1/2004 | Krzyzanowski et al. | | 2005/0192727 A1 | 9/2005 | Shostak et al. |
| 2004/0003415 A1 | 1/2004 | Ng | | 2005/0193155 A1 | 9/2005 | Fujita |
| 2004/0025089 A1 | 2/2004 | Haswarey et al. | | 2005/0198040 A1 | 9/2005 | Cohen et al. |
| 2004/0039478 A1 | 2/2004 | Kiesel et al. | | 2005/0223339 A1 | 10/2005 | Lee |
| 2004/0059815 A1 | 3/2004 | Buckingham et al. | | 2005/0229610 A1 | 10/2005 | Park et al. |
| 2004/0066788 A1 | 4/2004 | Lin et al. | | 2005/0235661 A1 | 10/2005 | Pham |
| 2004/0088069 A1 | 5/2004 | Singh | | 2005/0235662 A1 | 10/2005 | Pham |
| 2004/0095237 A1 | 5/2004 | Chen et al. | | 2005/0235663 A1 | 10/2005 | Pham |
| 2004/0104942 A1 | 6/2004 | Weigel | | 2005/0240312 A1 | 10/2005 | Terry et al. |
| 2004/0107717 A1 | 6/2004 | Yoon et al. | | 2005/0252673 A1 | 11/2005 | Kregle et al. |
| 2004/0111186 A1 | 6/2004 | Rossi et al. | | 2005/0256591 A1 | 11/2005 | Rule et al. |
| 2004/0111254 A1 | 6/2004 | Gogel et al. | | 2005/0256935 A1 | 11/2005 | Overstreet et al. |
| 2004/0117330 A1 | 6/2004 | Ehlers et al. | | 2005/0258257 A1 | 11/2005 | Thurman et al. |
| 2004/0133314 A1 | 7/2004 | Ehlers et al. | | 2005/0270151 A1 | 12/2005 | Winick |
| 2004/0133704 A1 | 7/2004 | Krzyzanowski et al. | | 2005/0278071 A1 | 12/2005 | Durham, III |
| 2004/0138981 A1 | 7/2004 | Ehlers et al. | | 2005/0280364 A1 | 12/2005 | Omura et al. |
| 2004/0139038 A1 | 7/2004 | Ehlers et al. | | 2005/0281368 A1 | 12/2005 | Droba et al. |
| 2004/0143360 A1 | 7/2004 | Kiesel et al. | | 2005/0288823 A1 | 12/2005 | Hesse et al. |
| 2004/0146008 A1 | 7/2004 | Conradt et al. | | 2006/0006244 A1 | 1/2006 | Morrow et al. |
| 2004/0148482 A1 | 7/2004 | Grundy et al. | | 2006/0009861 A1 | 1/2006 | Bonasia et al. |
| 2004/0156360 A1 | 8/2004 | Sexton et al. | | 2006/0009863 A1 | 1/2006 | Lingemann |
| 2004/0159112 A1 | 8/2004 | Jayanth et al. | | 2006/0021358 A1 | 2/2006 | Nallapa |
| 2004/0189590 A1 | 9/2004 | Mehaffey et al. | | 2006/0021359 A1 | 2/2006 | Hur et al. |
| 2004/0204775 A1 | 10/2004 | Keyes et al. | | 2006/0030954 A1 | 2/2006 | Bergman et al. |
| 2004/0205781 A1 | 10/2004 | Hill et al. | | 2006/0036350 A1 | 2/2006 | Bohrer et al. |
| 2004/0206096 A1 | 10/2004 | Jayanth | | 2006/0036952 A1 | 2/2006 | Yang |
| 2004/0210348 A1 | 10/2004 | Imhof et al. | | 2006/0041898 A1 | 2/2006 | Potyrailo et al. |
| 2004/0218591 A1 | 11/2004 | Ogawa et al. | | 2006/0045107 A1 | 3/2006 | Kucenas et al. |
| 2004/0222307 A1 | 11/2004 | DeLuca | | 2006/0048064 A1 | 3/2006 | Vronay |
| 2004/0236471 A1 | 11/2004 | Poth | | 2006/0058924 A1 | 3/2006 | Shah |
| 2004/0245352 A1 | 12/2004 | Smith | | 2006/0063523 A1 | 3/2006 | McFarland |
| 2004/0260427 A1 | 12/2004 | Wimsatt | | 2006/0090142 A1 | 4/2006 | Glasgow et al. |
| 2004/0266491 A1 | 12/2004 | Howard et al. | | 2006/0090483 A1 | 5/2006 | Kim et al. |
| 2004/0267385 A1 | 12/2004 | Lingemann | | 2006/0091227 A1 | 5/2006 | Attridge |
| 2004/0267395 A1 | 12/2004 | Discenzo et al. | | 2006/0092977 A1 | 5/2006 | Bai et al. |
| 2004/0267790 A1 | 12/2004 | Pak et al. | | 2006/0106791 A1 | 5/2006 | Morrow et al. |
| 2005/0005249 A1 | 1/2005 | Hill et al. | | 2006/0108432 A1 | 5/2006 | Mattheis |
| 2005/0007249 A1 | 1/2005 | Eryurek et al. | | 2006/0111816 A1 | 5/2006 | Spalink et al. |
| 2005/0010759 A1 | 1/2005 | Wakiyama | | 2006/0130497 A1 | 6/2006 | Kang et al. |
| 2005/0033707 A1 | 2/2005 | Ehlers et al. | | 2006/0144055 A1 | 7/2006 | Ahn |
| 2005/0034023 A1 | 2/2005 | Maturana et al. | | 2006/0144232 A1 | 7/2006 | Kang et al. |
| 2005/0040247 A1 | 2/2005 | Pouchak | | 2006/0149414 A1 | 7/2006 | Archacki, Jr. et al. |
| 2005/0040250 A1 | 2/2005 | Wruck | | 2006/0150027 A1 | 7/2006 | Paden |
| 2005/0041033 A1 | 2/2005 | Hilts et al. | | 2006/0153247 A1 | 7/2006 | Stumer |
| 2005/0041633 A1 | 2/2005 | Roeser et al. | | 2006/0155398 A1 | 7/2006 | Hoffberg et al. |
| 2005/0046584 A1 | 3/2005 | Breed | | 2006/0158051 A1 | 7/2006 | Bartlett et al. |
| 2005/0051168 A1 | 3/2005 | DeVries et al. | | 2006/0159007 A1 | 7/2006 | Frutiger et al. |
| 2005/0054381 A1 | 3/2005 | Lee et al. | | 2006/0168522 A1 | 7/2006 | Bala |
| 2005/0055427 A1 | 3/2005 | Frutiger et al. | | 2006/0185818 A1 | 8/2006 | Garozzo |
| 2005/0068978 A1 | 3/2005 | Sexton et al. | | 2006/0186214 A1 | 8/2006 | Simon et al. |
| 2005/0073789 A1 | 4/2005 | Tanis | | 2006/0190138 A1 | 8/2006 | Stone et al. |
| 2005/0076150 A1 | 4/2005 | Lee et al. | | 2006/0192021 A1 | 8/2006 | Schultz et al. |
| 2005/0080879 A1 | 4/2005 | Kim et al. | | 2006/0192022 A1 | 8/2006 | Barton et al. |
| 2005/0081156 A1 | 4/2005 | Clark et al. | | 2006/0196953 A1* | 9/2006 | Simon et al. ............ 236/46 R |
| 2005/0081157 A1 | 4/2005 | Clark et al. | | 2006/0200253 A1 | 9/2006 | Hoffberg et al. |
| 2005/0090915 A1 | 4/2005 | Geiwitz | | 2006/0200258 A1 | 9/2006 | Hoffberg et al. |
| 2005/0096872 A1 | 5/2005 | Blevins et al. | | 2006/0200259 A1 | 9/2006 | Hoffberg et al. |
| 2005/0097478 A1 | 5/2005 | Killian et al. | | 2006/0200260 A1 | 9/2006 | Hoffberg et al. |
| 2005/0103874 A1 | 5/2005 | Erdman | | 2006/0202978 A1 | 9/2006 | Lee et al. |
| 2005/0109048 A1 | 5/2005 | Lee | | 2006/0206220 A1 | 9/2006 | Amundson |
| 2005/0116023 A1 | 6/2005 | Amundson et al. | | 2006/0209208 A1 | 9/2006 | Kim et al. |
| 2005/0118996 A1 | 6/2005 | Lee et al. | | 2006/0212194 A1 | 9/2006 | Breed |
| 2005/0119765 A1 | 6/2005 | Bergman et al. | | 2006/0219799 A1 | 10/2006 | Schultz et al. |

| Publication No. | Date | Inventor(s) | Publication No. | Date | Inventor(s) |
|---|---|---|---|---|---|
| 2006/0229090 A1 | 10/2006 | LaDue | 2007/0223500 A1 | 9/2007 | Lee et al. |
| 2006/0235548 A1 | 10/2006 | Gaudette | 2007/0225868 A1 | 9/2007 | Terlson et al. |
| 2006/0236351 A1 | 10/2006 | Ellerbrock et al. | 2007/0225869 A1 | 9/2007 | Amundson et al. |
| 2006/0239296 A1 | 10/2006 | Jinzaki et al. | 2007/0233323 A1 | 10/2007 | Wiemeyer et al. |
| 2006/0248233 A1 | 11/2006 | Park et al. | 2007/0236156 A1 | 10/2007 | Lys et al. |
| 2006/0250578 A1 | 11/2006 | Pohl et al. | 2007/0237032 A1 | 10/2007 | Rhee et al. |
| 2006/0250979 A1 | 11/2006 | Gauweiler et al. | 2007/0238413 A1 | 10/2007 | Coutts |
| 2006/0267756 A1 | 11/2006 | Kates | 2007/0239658 A1 | 10/2007 | Cunningham et al. |
| 2006/0276917 A1 | 12/2006 | Li et al. | 2007/0240226 A1 | 10/2007 | Song et al. |
| 2007/0005191 A1 | 1/2007 | Sloup et al. | 2007/0241203 A1 | 10/2007 | Wagner et al. |
| 2007/0008116 A1 | 1/2007 | Bergman et al. | 2007/0242058 A1 | 10/2007 | Yamada |
| 2007/0012052 A1 | 1/2007 | Butler et al. | 2007/0245306 A1 | 10/2007 | Dameshek et al. |
| 2007/0013534 A1 | 1/2007 | DiMaggio | 2007/0257120 A1 | 11/2007 | Chapman, Jr. et al. |
| 2007/0014233 A1 | 1/2007 | Oguro et al. | 2007/0260782 A1 | 11/2007 | Shaikli |
| 2007/0016311 A1 | 1/2007 | Bergman et al. | 2007/0260978 A1 | 11/2007 | Oh et al. |
| 2007/0016476 A1 | 1/2007 | Hoffberg et al. | 2007/0266329 A1 | 11/2007 | Gaudette |
| 2007/0019683 A1 | 1/2007 | Kryzyanowski | 2007/0271521 A1 | 11/2007 | Harriger et al. |
| 2007/0025368 A1 | 2/2007 | Ha et al. | 2007/0274093 A1 | 11/2007 | Haim et al. |
| 2007/0032909 A1 | 2/2007 | Tolbert, Jr. et al. | 2007/0277013 A1 | 11/2007 | Rexha et al. |
| 2007/0033310 A1 | 2/2007 | Kweon | 2007/0278320 A1 | 12/2007 | Lunacek et al. |
| 2007/0035255 A1* | 2/2007 | Shuster et al. ............ 315/200 R | 2007/0284452 A1 | 12/2007 | Butler et al. |
| 2007/0040040 A1 | 2/2007 | Mueller | 2007/0299857 A1 | 12/2007 | Gwozdz et al. |
| 2007/0043477 A1 | 2/2007 | Ehlers et al. | 2007/0300064 A1 | 12/2007 | Isaacs et al. |
| 2007/0043478 A1 | 2/2007 | Ehlers et al. | 2008/0003845 A1 | 1/2008 | Hong et al. |
| 2007/0045429 A1 | 3/2007 | Chapman, Jr. et al. | 2008/0004727 A1 | 1/2008 | Glanzer et al. |
| 2007/0045431 A1 | 3/2007 | Chapman, Jr. et al. | 2008/0005428 A1 | 1/2008 | Maul et al. |
| 2007/0045442 A1 | 3/2007 | Chapman, Jr. et al. | 2008/0006709 A1 | 1/2008 | Ashworth et al. |
| 2007/0051818 A1 | 3/2007 | Atlas | 2008/0013259 A1 | 1/2008 | Barton et al. |
| 2007/0053513 A1 | 3/2007 | Hoffberg | 2008/0029610 A1 | 2/2008 | Nichols |
| 2007/0055407 A1 | 3/2007 | Goldberg et al. | 2008/0031147 A1 | 2/2008 | Fieremans et al. |
| 2007/0055757 A1 | 3/2007 | Mairs et al. | 2008/0040351 A1 | 2/2008 | Jin et al. |
| 2007/0067062 A1 | 3/2007 | Mairs et al. | 2008/0048045 A1 | 2/2008 | Butler et al. |
| 2007/0067496 A1 | 3/2007 | Deiretsbacher et al. | 2008/0048046 A1 | 2/2008 | Wagner et al. |
| 2007/0073973 A1 | 3/2007 | Hazay | 2008/0054082 A1 | 3/2008 | Evans et al. |
| 2007/0080235 A1 | 4/2007 | Fulton, Jr. | 2008/0055190 A1 | 3/2008 | Lee |
| 2007/0083721 A1 | 4/2007 | Grinspan | 2008/0056722 A1 | 3/2008 | Hendrix et al. |
| 2007/0084937 A1 | 4/2007 | Ahmed | 2008/0057872 A1 | 3/2008 | McFarland et al. |
| 2007/0088883 A1 | 4/2007 | Wakabayashi | 2008/0057931 A1 | 3/2008 | Nass et al. |
| 2007/0089090 A1 | 4/2007 | Riedl et al. | 2008/0058996 A1 | 3/2008 | Sachdev et al. |
| 2007/0090199 A1 | 4/2007 | Hull et al. | 2008/0059682 A1 | 3/2008 | Cooley et al. |
| 2007/0093226 A1 | 4/2007 | Foltyn et al. | 2008/0062892 A1 | 3/2008 | Dodgen et al. |
| 2007/0097993 A1 | 5/2007 | Bojahra et al. | 2008/0063006 A1 | 3/2008 | Nichols |
| 2007/0102149 A1 | 5/2007 | Kates | 2008/0065926 A1 | 3/2008 | Poth et al. |
| 2007/0109114 A1 | 5/2007 | Farley et al. | 2008/0072704 A1 | 3/2008 | Clark et al. |
| 2007/0109975 A1 | 5/2007 | Reckamp et al. | 2008/0073440 A1 | 3/2008 | Butler et al. |
| 2007/0113247 A1 | 5/2007 | Kwak | 2008/0077884 A1 | 3/2008 | Patitucci |
| 2007/0114291 A1 | 5/2007 | Pouchak | 2008/0077886 A1 | 3/2008 | Eichner |
| 2007/0119957 A1 | 5/2007 | Kates | 2008/0082767 A1 | 4/2008 | Nulkar et al. |
| 2007/0119958 A1 | 5/2007 | Kates | 2008/0083009 A1 | 4/2008 | Kaler et al. |
| 2007/0129820 A1 | 6/2007 | Glanzer et al. | 2008/0083834 A1 | 4/2008 | Krebs et al. |
| 2007/0129825 A1 | 6/2007 | Kargenian | 2008/0097651 A1 | 4/2008 | Shah et al. |
| 2007/0129826 A1 | 6/2007 | Kreidler et al. | 2008/0104189 A1 | 5/2008 | Baker et al. |
| 2007/0129917 A1 | 6/2007 | Blevins et al. | 2008/0114500 A1 | 5/2008 | Hull et al. |
| 2007/0130834 A1 | 6/2007 | Kande et al. | 2008/0120335 A1 | 5/2008 | Dolgoff |
| 2007/0130969 A1 | 6/2007 | Peterson et al. | 2008/0121729 A1 | 5/2008 | Gray |
| 2007/0131784 A1 | 6/2007 | Garozzo et al. | 2008/0128523 A1 | 6/2008 | Hoglund et al. |
| 2007/0135692 A1 | 6/2007 | Hwang et al. | 2008/0129475 A1 | 6/2008 | Breed et al. |
| 2007/0135946 A1 | 6/2007 | Sugiyama et al. | 2008/0133033 A1 | 6/2008 | Wolff et al. |
| 2007/0136669 A1 | 6/2007 | Kwon et al. | 2008/0133060 A1 | 6/2008 | Hoglund et al. |
| 2007/0136687 A1 | 6/2007 | Pak | 2008/0133061 A1 | 6/2008 | Hoglund et al. |
| 2007/0138307 A1 | 6/2007 | Khoo | 2008/0134087 A1 | 6/2008 | Hoglund et al. |
| 2007/0138308 A1 | 6/2007 | Schultz et al. | 2008/0134098 A1 | 6/2008 | Hoglund et al. |
| 2007/0143704 A1 | 6/2007 | Laird-McConnell | 2008/0144302 A1 | 6/2008 | Rosenblatt |
| 2007/0143707 A1 | 6/2007 | Yun et al. | 2008/0148098 A1 | 6/2008 | Chen |
| 2007/0157016 A1 | 7/2007 | Dayan et al. | 2008/0161977 A1 | 7/2008 | Takach et al. |
| 2007/0158442 A1 | 7/2007 | Chapman et al. | 2008/0161978 A1 | 7/2008 | Shah |
| 2007/0168887 A1 | 7/2007 | Lee | 2008/0168255 A1 | 7/2008 | Abou-Emara et al. |
| 2007/0177505 A1 | 8/2007 | Charrua et al. | 2008/0168356 A1 | 7/2008 | Eryurek et al. |
| 2007/0191024 A1 | 8/2007 | Kim et al. | 2008/0183335 A1 | 7/2008 | Poth et al. |
| 2007/0192731 A1 | 8/2007 | Townsend et al. | 2008/0184059 A1 | 7/2008 | Chen |
| 2007/0204637 A1 | 9/2007 | Fujii et al. | 2008/0185976 A1 | 8/2008 | Dickey et al. |
| 2007/0205297 A1 | 9/2007 | Finkam et al. | 2008/0186160 A1 | 8/2008 | Kim et al. |
| 2007/0205916 A1 | 9/2007 | Blom et al. | 2008/0192649 A1 | 8/2008 | Pyeon et al. |
| 2007/0208461 A1 | 9/2007 | Chase | 2008/0195254 A1 | 8/2008 | Jung et al. |
| 2007/0208549 A1 | 9/2007 | Blevins et al. | 2008/0195581 A1 | 8/2008 | Ashmore et al. |
| 2007/0213853 A1 | 9/2007 | Glanzer et al. | 2008/0195687 A1 | 8/2008 | Jung et al. |
| 2007/0219645 A1 | 9/2007 | Thomas et al. | 2008/0198036 A1 | 8/2008 | Songkakul et al. |
| 2007/0220301 A1 | 9/2007 | Brundridge et al. | 2008/0215987 A1 | 9/2008 | Alexander et al. |
| 2007/0220907 A1 | 9/2007 | Ehlers | 2008/0217418 A1 | 9/2008 | Helt et al. |

| | | |
|---|---|---|
| 2008/0217419 A1 | 9/2008 | Ehlers et al. |
| 2008/0223944 A1 | 9/2008 | Helt et al. |
| 2008/0235611 A1 | 9/2008 | Fraley et al. |
| 2008/0256475 A1 | 10/2008 | Amundson et al. |
| 2008/0264085 A1 | 10/2008 | Perry et al. |
| 2008/0272934 A1 | 11/2008 | Wang et al. |
| 2008/0281472 A1 | 11/2008 | Podgorny et al. |
| 2008/0294274 A1 | 11/2008 | Laberge et al. |
| 2008/0294932 A1 | 11/2008 | Oshins et al. |
| 2009/0001180 A1 | 1/2009 | Siddaramanna et al. |
| 2009/0001182 A1 | 1/2009 | Siddaramanna et al. |
| 2009/0049847 A1 | 2/2009 | Butler et al. |
| 2009/0052105 A1 | 2/2009 | Soleimani et al. |
| 2009/0057424 A1 | 3/2009 | Sullivan et al. |
| 2009/0057425 A1 | 3/2009 | Sullivan et al. |
| 2009/0065597 A1 | 3/2009 | Garozzo et al. |
| 2009/0094506 A1 | 4/2009 | Lakkis |
| 2009/0105846 A1 | 4/2009 | Hesse et al. |
| 2009/0113037 A1 | 4/2009 | Pouchak |
| 2009/0119092 A1 | 5/2009 | Balasubramanyan et al. |
| 2009/0132091 A1 | 5/2009 | Chambers et al. |
| 2009/0140056 A1 | 6/2009 | Leen |
| 2009/0140057 A1 | 6/2009 | Leen |
| 2009/0140058 A1 | 6/2009 | Koster et al. |
| 2009/0140061 A1 | 6/2009 | Schultz et al. |
| 2009/0140062 A1 | 6/2009 | Amundson et al. |
| 2009/0140063 A1 | 6/2009 | Koster et al. |
| 2009/0140064 A1 | 6/2009 | Schultz et al. |
| 2009/0143879 A1 | 6/2009 | Amundson et al. |
| 2009/0143880 A1 | 6/2009 | Amundson et al. |
| 2009/0143916 A1 | 6/2009 | Boll et al. |
| 2009/0143918 A1 | 6/2009 | Amundson et al. |
| 2009/0157529 A1 | 6/2009 | Ehlers et al. |
| 2009/0195349 A1 | 8/2009 | Frader-Thompson |
| 2009/0198810 A1 | 8/2009 | Bayer et al. |
| 2009/0245278 A1 | 10/2009 | Kee |
| 2009/0257431 A1 | 10/2009 | Ramanathan et al. |
| 2009/0259785 A1 | 10/2009 | Perry et al. |
| 2009/0261174 A1 | 10/2009 | Butler et al. |
| 2009/0261767 A1 | 10/2009 | Butler et al. |
| 2009/0266904 A1 | 10/2009 | Cohen |
| 2009/0267540 A1 | 10/2009 | Chemel et al. |
| 2009/0271336 A1 | 10/2009 | Franks |
| 2009/0287736 A1* | 11/2009 | Shike et al. ............... 707/103 R |
| 2010/0011437 A1 | 1/2010 | Courtney |
| 2010/0023865 A1 | 1/2010 | Fulker et al. |
| 2010/0050075 A1 | 2/2010 | Thorson et al. |
| 2010/0050108 A1 | 2/2010 | Mirza |
| 2010/0070086 A1 | 3/2010 | Harrod et al. |
| 2010/0070089 A1 | 3/2010 | Harrod et al. |
| 2010/0070093 A1 | 3/2010 | Harrod et al. |
| 2010/0070907 A1* | 3/2010 | Harrod et al. ............... 715/772 |
| 2010/0073159 A1 | 3/2010 | Schmickley et al. |
| 2010/0076605 A1 | 3/2010 | Harrod et al. |
| 2010/0100253 A1 | 4/2010 | Fausak et al. |
| 2010/0101854 A1 | 4/2010 | Wallaert et al. |
| 2010/0102136 A1 | 4/2010 | Hadzidedic et al. |
| 2010/0102948 A1 | 4/2010 | Grohman et al. |
| 2010/0102973 A1 | 4/2010 | Grohman et al. |
| 2010/0106305 A1 | 4/2010 | Pavlak et al. |
| 2010/0106307 A1 | 4/2010 | Grohman et al. |
| 2010/0106308 A1 | 4/2010 | Filbeck et al. |
| 2010/0106309 A1 | 4/2010 | Grohman et al. |
| 2010/0106310 A1 | 4/2010 | Grohman |
| 2010/0106311 A1 | 4/2010 | Wallaert |
| 2010/0106312 A1 | 4/2010 | Grohman et al. |
| 2010/0106313 A1 | 4/2010 | Grohman et al. |
| 2010/0106314 A1 | 4/2010 | Grohman |
| 2010/0106315 A1 | 4/2010 | Grohman |
| 2010/0106316 A1 | 4/2010 | Curry et al. |
| 2010/0106317 A1 | 4/2010 | Grohman |
| 2010/0106318 A1 | 4/2010 | Grohman et al. |
| 2010/0106319 A1 | 4/2010 | Grohman et al. |
| 2010/0106320 A1 | 4/2010 | Grohman et al. |
| 2010/0106321 A1 | 4/2010 | Hadzidedic |
| 2010/0106322 A1 | 4/2010 | Grohman |
| 2010/0106323 A1 | 4/2010 | Wallaert et al. |
| 2010/0106324 A1 | 4/2010 | Grohman |
| 2010/0106325 A1 | 4/2010 | Grohman |
| 2010/0106326 A1 | 4/2010 | Grohman |
| 2010/0106327 A1 | 4/2010 | Grohman et al. |
| 2010/0106329 A1 | 4/2010 | Grohman |
| 2010/0106330 A1 | 4/2010 | Grohman |
| 2010/0106333 A1 | 4/2010 | Grohman et al. |
| 2010/0106334 A1 | 4/2010 | Grohman et al. |
| 2010/0106787 A1 | 4/2010 | Grohman |
| 2010/0106809 A1 | 4/2010 | Grohman |
| 2010/0106810 A1 | 4/2010 | Grohman |
| 2010/0106814 A1 | 4/2010 | Hadzidedic et al. |
| 2010/0106815 A1 | 4/2010 | Grohman et al. |
| 2010/0106925 A1 | 4/2010 | Grohman et al. |
| 2010/0106957 A1 | 4/2010 | Grohman et al. |
| 2010/0107007 A1 | 4/2010 | Grohman et al. |
| 2010/0107070 A1 | 4/2010 | Devineni et al. |
| 2010/0107071 A1 | 4/2010 | Pavlak et al. |
| 2010/0107072 A1 | 4/2010 | Mirza et al. |
| 2010/0107073 A1 | 4/2010 | Wallaert et al. |
| 2010/0107074 A1 | 4/2010 | Pavlak et al. |
| 2010/0107076 A1 | 4/2010 | Grohman et al. |
| 2010/0107083 A1 | 4/2010 | Grohman |
| 2010/0107103 A1 | 4/2010 | Wallaert et al. |
| 2010/0107109 A1 | 4/2010 | Filbeck et al. |
| 2010/0107110 A1 | 4/2010 | Mirza et al. |
| 2010/0107111 A1 | 4/2010 | Mirza et al. |
| 2010/0107112 A1 | 4/2010 | Jennings et al. |
| 2010/0107232 A1 | 4/2010 | Grohman et al. |
| 2010/0115364 A1 | 5/2010 | Grohman |
| 2010/0142526 A1 | 6/2010 | Wong |
| 2010/0145629 A1 | 6/2010 | Botich et al. |
| 2010/0168924 A1 | 7/2010 | Tessier et al. |
| 2010/0169419 A1 | 7/2010 | Devilbiss et al. |
| 2010/0179696 A1 | 7/2010 | Grohman et al. |
| 2010/0211546 A1 | 8/2010 | Grohman et al. |
| 2010/0241245 A1 | 9/2010 | Wiemeyer et al. |
| 2010/0259931 A1 | 10/2010 | Chemel et al. |
| 2010/0264846 A1 | 10/2010 | Chemel et al. |
| 2010/0270933 A1 | 10/2010 | Chemel et al. |
| 2010/0272102 A1 | 10/2010 | Kobayashi |
| 2010/0295474 A1 | 11/2010 | Chemel et al. |
| 2010/0295475 A1 | 11/2010 | Chemel et al. |
| 2010/0295482 A1 | 11/2010 | Chemel et al. |
| 2010/0301768 A1 | 12/2010 | Chemel et al. |
| 2010/0301769 A1 | 12/2010 | Chemel et al. |
| 2010/0301770 A1 | 12/2010 | Chemel et al. |
| 2010/0301771 A1 | 12/2010 | Chemel et al. |
| 2010/0301772 A1 | 12/2010 | Hahnlen et al. |
| 2010/0301773 A1 | 12/2010 | Chemel et al. |
| 2010/0301774 A1 | 12/2010 | Chemel et al. |
| 2010/0305761 A1 | 12/2010 | Remsburg |
| 2010/0314458 A1 | 12/2010 | Votaw et al. |
| 2010/0319362 A1 | 12/2010 | Hisaoka |
| 2011/0001436 A1 | 1/2011 | Chemel et al. |
| 2011/0001438 A1 | 1/2011 | Chemel et al. |
| 2011/0004823 A1 | 1/2011 | Wallaert |
| 2011/0004824 A1 | 1/2011 | Thorson et al. |
| 2011/0007016 A1 | 1/2011 | Mirza et al. |
| 2011/0007017 A1 | 1/2011 | Wallaert |
| 2011/0010620 A1 | 1/2011 | Mirza et al. |
| 2011/0010621 A1 | 1/2011 | Wallaert et al. |
| 2011/0010652 A1 | 1/2011 | Wallaert |
| 2011/0010653 A1 | 1/2011 | Wallaert et al. |
| 2011/0010660 A1 | 1/2011 | Thorson et al. |
| 2011/0032932 A2 | 2/2011 | Pyeon et al. |
| 2011/0040785 A1 | 2/2011 | Steenberg et al. |
| 2011/0061014 A1 | 3/2011 | Frader-Thompson et al. |
| 2011/0063126 A1* | 3/2011 | Kennedy et al. ......... 340/870.02 |
| 2012/0012662 A1 | 1/2012 | Leen et al. |
| 2012/0046792 A1 | 2/2012 | Secor |
| 2012/0065805 A1 | 3/2012 | Montalvo |
| 2012/0116593 A1 | 5/2012 | Amundson et al. |
| 2012/0181010 A1 | 7/2012 | Schultz et al. |

FOREIGN PATENT DOCUMENTS

| | | | |
|---|---|---|---|
| EP | 2241836 A1 | 10/2010 | |
| EP | 2241837 A1 | 10/2010 | |
| GB | 2117573 A | 10/1983 | |
| WO | 02056540 A2 | 7/2002 | |
| WO | 2008100641 A1 | 8/2008 | |

OTHER PUBLICATIONS

Related case U.S. Appl. No. 12/603,450, filed Oct. 21, 2009 to Wojciech Grohman, entitled "Alarm and Diagnostics System and Method for a Distributed-Architecture Heating, Ventilation and Air Conditioning Network".
Related case U.S. Appl. No. 12/603,382, filed Oct. 21, 2009 to Wojciech Grohman, entitled "Device Abstraction System and Method for a Distributed-Architecture Heating, Ventilation and Air Conditioning System".
Related case U.S. Appl. No. 12/603,504, filed Oct. 21, 2009 to Amanda Filbeck et al., entitled "System and Method of Use for a User Interface Dashboard of a Heating, Ventilation and Air Conditioning Network".
Related case U.S. Appl. No. 12/603,449, filed Oct. 21, 2009 to Wojciech Grohman et al., entitled "System and Method of Use for a User Interface Dashboard of a Heating, Ventilation and Air Conditioning Network".
Related case U.S. Appl. No. 12/603,460, filed Oct. 21, 2009 to Wojciech Grohman et al., entitled "System and Method of Use for a User Interface Dashboard of a Heating, Ventilation and Air Conditioning Network".
Related case U.S. Appl. No. 12/603,526, filed Oct. 21, 2009 to Wojciech Grohman et al., entitled "Communication Protocol System and Methof for a Distributed-Architecture Heating, Ventilation and Air Conditioning Network K".
Related case U.S. Appl. No. 12/603,532, filed Oct. 21, 2009 to Wojciech Grohman, entitled "Communication Protocol System and Method for a Distributed-Architecture Heating, Ventilation and Air Conditioning Network".
Related case U.S. Appl. No. 12/603,475, filed Oct. 21, 2009 to Suresh Kumar Devineni et al., entitled "System and Method of Use for a User Interface Dashboard of a Heating, Ventilation and Air Conditioning Network".
Related case U.S. Appl. No. 12/603,362, filed Oct. 21, 2009 to Wojciech Grohman et al., entitled "Architecture Heating, Ventilation and Air Conditioning System".
Related case U.S. Appl. No. 12/603,473, filed Oct. 21, 2009 to Wojciech Grohman et al., entitled "System and Method for Zoning a Distributed-Architecture Heating, Ventilation and Air Conditioning Network".
Related case U.S. Appl. No. 12/603,407, filed Oct. 21, 2009 to Amanda Filbeck et al., entitled "System and Method for Zoning a Distributed-Architecture Heating, Ventilation and Air Conditioning Network".
Related case U.S. Appl. No. 12/603,496, filed Oct. 21, 2009 to Wojciech Grohman et al., entitled "Device Abstraction System and Method for a Distributed-Architecture Heating, Ventilation and Air Conditioning System".
Related case U.S. Appl. No. 12/603,482, filed Oct. 21, 2009 to Muhammad Mirza et al., entitled "System and Method of Use for a User Interface Dashboard of a Heating, Ventilation and Air Conditioning Network".
Related case U.S. Appl. No. 12/603,488, filed Oct. 21, 2009 to Muhammad Mirza et al., entitled "System and Method of Use for a User Interface Dashboard of a Heating, Ventilation and Air Conditioning Network".
Related case U.S. Appl. No. 12/603,495, filed Oct. 21, 2009 to Thomas Pavlak et al., entitled "System and Method of Use for a User Interface Dashboard of a Heating, Ventilation and Air Conditioning Network".
Related case U.S. Appl. No. 12/603,497, filed Oct. 21, 2009 to Muhammad Mirza et al., entitled "System and Method of Use for a User Interface Dashboard of a Heating, Ventilation and Air Conditioning Network".
Related case U.S. Appl. No. 12/603,431, filed Oct. 21, 2009 to Wojciech Grohman et al., entitled "General Control Technique in a Heating, Ventilation and Air Conditioning Network".
Related case U.S. Appl. No. 12/603,502, filed Oct. 21, 2009 to Wojciech Grohman et al., entitled "System and Method of Use for a User Interface Dashboard of a Heating, Ventilation and Air Conditioning Network".
Related case U.S. Appl. No. 12/603,489, filed Oct. 21, 2009 to Wojciech Grohman, entitled "System and Method for Zoning a Distributed-Architecture Heating, Ventilation and Air Conditioning Network".
Related case U.S. Appl. No. 12/603,527, filed Oct. 21, 2009 to Darko Hadzidedic et al., entitled "Memory Recovery Scheme and Data Structure in a Heating, Ventilation and Air Conditioning Network".
Related case U.S. Appl. No. 12/603,479, filed Oct. 21, 2009 to Wojciech Grohman et al., entitled "Device Abstraction System and Method for a Distributed-Architecture Heating, Ventilation and Air Conditioning System".
Related case U.S. Appl. No. 12/603,536, filed Oct. 21, 2009 to Timothy Wallaert et al., entitled. "Communication Protocol System and Method for a Distributed-Architecture Heating, Ventilation and Air Conditioning Network".
Related case U.S. Appl. No. 12/603,509, filed Oct. 21, 2009 to Timothy Wallaert et al., entitled "System and Method of Use for a User Interface Dashboard of a Heating, Ventilation and Air Conditioning Network".
Related case U.S. Appl. No. 12/603,512, filed Oct. 21, 2009 to Wojciech Grohman et al., entitled "Programming and Configuration in a Heating, Ventilation and Air Conditioning Network".
Related case U.S. Appl. No. 12/603,464, filed Oct. 21, 2009 to Wojciech Grohman et al., entitled "Alarm and Diagnostics System and Method for a Distributed-Architecture Heating, Ventilation and Air Conditioning Network".
Related case U.S. Appl. No. 12/603,528, filed Oct. 21, 2009 to Wojciech Grohman et al., entitled "Memory Recovery Scheme and Data Structure in a Heating, Ventilation and Air Conditioning Network".
Related case U.S. Appl. No. 12/603,525, filed Oct. 21, 2009 to Wojciech Grohman et al., entitled "Method of Controlling Equipment in a Heating, Ventilation and Air Conditioning Network".
Related case U.S. Appl. No. 12/603,520, filed Oct. 21, 2009 to Darko Hadzidedic et al., entitled "Alarm and Diagnostics System and Method for a Distributed-Architecture Heating, Ventilation and Air Conditioning Network".
Related case U.S. Appl. No. 12/603,539, filed Oct. 21, 2009 to Darko Hadzidedic et al., entitled "Communication Protocol System and Method for a Distributed-Architecture Heating, Ventilation and Air Conditioning Networkk".
Related case U.S. Appl. No. 12/603,420, filed Oct. 21, 2009 to Darko Hadzidedic et al., entitled "Alarm and Diagnostics System and Method for a Distributed-Architecture Heating, Ventilation and Air Conditioning Network".
Related case U.S. Appl. No. 12/603,483, filed Oct. 21, 2009 to Darko Hadzidedic et al., entitled "Device Abstraction System and Method for a Distributed-Architecture Heating, Ventilation and Air Conditioning System".
Related case U.S. Appl. No. 12/603,514, filed Oct. 21, 2009 to Thomas Pavlak et al., entitled "System and Method of Use for a User Interface Dashboard of a Heating, Ventilation and Air Conditioning Network".
Related case U.S. Appl. No. 12/603,515, filed Oct. 21, 2009 to Wojciech Grohman et al., entitled "Alarm and Diagnostics System and Method for a Distributed-Architecture Heating, Ventilation and Air Conditioning Network".
Related case U.S. Appl. No. 12/603,490, filed Oct. 21, 2009 to Wojciech Grohman, entitled "System Recovery in a Heating, Ventilation and Air Conditioning Network".
Related case U.S. Appl. No. 12/603,523, filed Oct. 21, 2009 to Wojciech Grohman et al., entitled "Alarm and Diagnostics System and Method for a Distributed-Architecture Heating, Ventilation and Air Conditioning".
Related case U.S. Appl. No. 12/603,493, filed Oct. 21, 2009 to Wojciech Grohman et al., entitled "System Recovery in a Heating, Ventilation and Air Conditioning Network".
Related case U.S. Appl. No. 12/603,547, filed Oct. 21, 2009 to Wojciech Grohman, entitled "Communication Protocol System and Method for a Distributed-Architecture Heating, Ventilation and Air Conditioning Network".
Related case U.S. Appl. No. 12/603,531, filed Oct. 21, 2009 to Wojciech Grohman, entitled "Memory Recovery Scheme and Data Structure in a Heating, Ventilation and Air Conditioning Network".

Related case U.S. Appl. No. 12/603,555, filed Oct. 21, 2009 to Wojciech Grohman, entitled "Communication Protocol System and Method for a Distributed-Architecture Heating, Ventilation and Air Conditioning Network".

Related case U.S. Appl. No. 12/603,562, filed Oct. 21, 2009 to Wojciech Grohman et al., entitled. "Communication Protocol System and Method for a Distributed-Architecture Heating, Ventilation and Air Conditioning Network".

Related case U.S. Appl. No. 12/603,566, filed Oct. 21, 2009 to Wojciech Grohman, entitled "Communication Protocol System and Method for a Distributed-Architecture Heating, Ventilation and Air Conditioning Network".

Related case U.S. Appl. No. 12/603,451, filed Oct. 21, 2009 to Timothy Wallaert et al., entitled "Alarm and Diagnostics System and Method for a Distributed-Architecture Heating, Ventilation and Air Conditioning Network ".

Related case U.S. Appl. No. 12/603,553, filed Oct. 21, 2009 to Wojciech Grohman, entitled "Communication Protocol System and Method for a Distributed-Architecture Heating, Ventilation and Air Conditioning Network".

Related case U.S. Appl. No. 12/603,487, filed Oct. 21, 2009 to Wojciech Grohman, entitled "System Recovery in a Heating, Ventilation and Air Conditioning Network".

Related case U.S. Appl. No. 12/603,558, filed Oct. 21, 2009 to Wojciech Grohman et al., entitled "Communication Protocol System and Method for a Distributed-Architecture Heating, Ventilation and Air Conditioning Network".

Related case U.S. Appl. No. 12/603,468, filed Oct. 21, 2009 to Wojciech Grohman et al., entitled "Programming and Configuration in a Heating, Ventilation and Air Conditioning Network".

Related case U.S. Appl. No. 12/603,560, filed Oct. 21, 2009 to Wojciech Grohman, entitled "Communication Protocol System and Method for a Distributed-Architecture Heating, Ventilation and Air Conditioning Network".

Related case U.S. Appl. No. 12/603,519, filed Oct. 21, 2009 to Thomas Pavlak, entitled "System and Method of Use for a User Interface Dashboard of a Heating, Ventilation and Air Conditioning Network".

Related case U.S. Appl. No. 12/603,534, filed Oct. 21, 2009 to Timothy Wallaert et al., entitled "Flush Wall Mount Thermostat and In-Set Mounting Plate for a Heating, Ventilation and Air Conditioning System".

Related case U.S. Appl. No. 29/345,748, filed Oct. 21, 2009 to Timothy Wallaert et al., entitled "Thin Cover Plate for an Electronic System Controller".

Related case U.S. Appl. No. 29/345,747, filed Oct. 21, 2009 to Timothy Wallaert et al., entitled "Thin Cover Plate for an Electronic System Controller".

"Define Track at Dictionary.com ," http://dictionary.reference.com/browse/track, Mar. 12, 2013, 3 pages.

"Definition of Track by Macmillan Dictionary," http://www.macmillandictionary.com/dictionary/british/track, Mar. 12, 2013, 4 pages.

"Definition of track by the Free Online Dictionary, Thesaurus, and Encyclopedia," http://www.thefreedictionary.com/ track, Mar. 12, 2013, 6 pp.

Gallas, B., et al., " Embedded Pentium ®Processor System Design for Windows CE," WESCON 1998, pp. 114-123.

"iView-100 Series (iView/iView-100-40) Handheld Controller User's Manual," ICP DAS, Mar. 2006, Version 2.0.

"Spectra™Commercial Zoning System, Engineering Data," Lennox, Bulletin No. 210366E, Oct. 2002, 33 pages.

Sharma, A., "Design of Wireless Sensors Network for Building Management Systems," University of California-Berkley, 57 pages, 2003.

"Linux Programmer's Manual," Unix Man pp. Login (1), http://unixhelp.ed.ac.uk/CGI/man-cgi?login, Util-linux 1.6, Nov. 4, 1996, 4 pages.

Checket-Hanks, B., "Zoning Controls for Convenience's Sakes, High-End Residential Controls Move Into New Areas," Air Conditioning, Heating & Refrigeration News, Abi /Inform Global, Jun. 28, 2004, 3 pp.

Leeb, G., "A User Interface for Home-Net," IEEE Transactions on Consumer Electronics, vol. 40, Issue 4, Nov. 1994, pp. 897-902.

"Ipmi- Intelligent Platform Management Interface Specification v1.5," Document Revision 1.1, Intel Hewlett-Packard NEC Dell, Feb. 20, 2002, 460 pp.

Nash, H., "Fire Alarm Systems for Health Care Facilities," IEEE Transactions on Industry Applications, vol. 1A-19, No. 5, Sep./Oct. 1983, pp. 848-852.

Bruggeman, E., et al., "A Multifunction Home Control System," IEEE Transactions on Consumer Electronics, Ce-29, Issue 1, 10 pages. Feb. 1983.

Fischer, H., et al., "Remote Building Management and DDc-Technology to Operate Distributed HVAC-Installations," The first International Telecommunications Energy Special Conference, TELESCON '94, Apr. 11-15, 1994, pp. 127-132.

"Field Display for Tridium JACE Controllers Product Data," HVAC Concepts, Inc. 2005, 22 pages.

"HVAC Concepts," Jace Network-Installation, 2004, 2 pages.

* cited by examiner

ALARM AND DIAGNOSTICS SYSTEM AND METHOD FOR A DISTRIBUTED ARCHITECTURE HEATING, VENTILATION AND AIR CONDITIONING NETWORK

CROSS-REFERENCE TO RELATED APPLICATIONS

This application claims the benefit of U.S. Provisional Application Ser. No. 61/167,135, filed by Grohman, et al., on Apr. 6, 2009, entitled "Comprehensive HVAC Control System", and is a continuation-in-part application of application Ser. No. 12/258,659, filed by Grohman on Oct. 27, 2008, entitled "Apparatus and Method for Controlling an Environmental Conditioning Unit," both of which are commonly assigned with this application and incorporated herein by reference. This application is also related to the following U.S. patent applications, which are filed on even date herewith, commonly assigned with this application and incorporated herein by reference:

| Ser. No. | Inventors | Title |
|---|---|---|
| 12/603,464 | Grohman, et al. | "Alarm and Diagnostics System and Method for a Distributed-Architecture Heating, Ventilation and Air Conditioning Network" |
| 12/603,534 | Wallaert, et al. | "Flush Wall Mount Control Unit and In-Set Mounting Plate for a Heating, Ventilation and Air Conditioning System" |
| 12/603,449 | Thorson, et al. | "System and Method of Use for a User Interface Dashboard of a Heating, Ventilation and Air Conditioning Network" |
| 12/603,382 | Grohman | "Device Abstraction System and Method for a Distributed-Architecture Heating, Ventilation and Air Conditioning Network" |
| 12/603,526 | Grohman, et al. | "Communication Protocol System and Method for a Distributed-Architecture Heating, Ventilation and Air Conditioning Network" |
| 12/603,527 | Hadzidedic | "Memory Recovery Scheme and Data Structure in a Heating, Ventilation and Air Conditioning Network" |
| 12/603,473 | Grohman, et al. | "System and Method for Zoning a Distributed-Architecture Heating, Ventilation and Air Conditioning Network" |
| 12/603,525 | Grohman, et al. | "Method of Controlling Equipment in a Heating, Ventilation and Air Conditioning Network" |
| 12/603,512 | Grohman, et al. | "Programming and Configuration in a Heating, Ventilation and Air Conditioning Network" |
| 12/603,431 | Mirza, et al. | "General Control Techniques in a Heating, Ventilation and Air Conditioning Network" |

TECHNICAL FIELD

This application is directed, in general, to HVAC systems and, more specifically, to alarm and diagnostics system and method for a distributed-architecture heating, ventilation and air conditioning (HVAC) network.

BACKGROUND

Climate control systems, also referred to as HVAC systems (the two terms will be used herein interchangeably), are employed to regulate the temperature, humidity and air quality of premises, such as a residence, office, store, warehouse, vehicle, trailer, or commercial or entertainment venue. The most basic climate control systems either move air (typically by means of an air handler having a fan or blower), heat air (typically by means of a furnace) or cool air (typically by means of a compressor-driven refrigerant loop). A thermostat is typically included in a conventional climate control system to provide some level of automatic temperature and humidity control. In its simplest form, a thermostat turns the climate control system on or off as a function of a detected temperature. In a more complex form, the thermostat may take other factors, such as humidity or time, into consideration. Still, however, the operation of a thermostat remains turning the climate control system on or off in an attempt to maintain the temperature of the premises as close as possible to a desired set point temperature. Climate control systems as described above have been in wide use since the middle of the twentieth century and have, to date, generally provided adequate temperature management.

SUMMARY

In one aspect the disclosure provides an HVAC data processing and communication network. One embodiment of the network includes a subnet controller, a system device and a system status display. The subnet controller is configured to communicate via a data bus. The first system device is configured to communicate via a data bus. The system status display is associated with the first system device and configured to produce a visual signal when the first device detects an error or alarm condition.

In another aspect the disclosure provides a method of manufacturing an HVAC data processing and communication network. In one embodiment the method includes configuring a subnet controller, a system device and a system status display. The subnet controller is configured to communicate via a data bus. The first system device is configured to communicate via a data bus. The system status display is associated with the first system device and configured to produce a visual signal when the first device detects an error or alarm condition.

BRIEF DESCRIPTION

Reference is now made to the following descriptions taken in conjunction with the accompanying drawings, in which.

DETAILED DESCRIPTION

As stated above, conventional climate control systems have been in wide use since the middle of the twentieth century and have, to date, generally provided adequate temperature management. However, it has been realized that more sophisticated control and data acquisition and processing techniques may be developed and employed to improve the installation, operation and maintenance of climate control systems.

Described herein are various embodiments of an improved climate control, or HVAC, system in which at least multiple components thereof communicate with one another via a data bus. The communication allows identity, capability, status and operational data to be shared among the components. In some embodiments, the communication also allows commands to be given. As a result, the climate control system may be more flexible in terms of the number of different premises in which it may be installed, may be easier for an installer to install and configure, may be easier for a user to operate, may provide superior temperature and/or relative humidity (RH) control, may be more energy efficient, may be easier to diagnose, may require fewer, simpler repairs and may have a longer service life.

Figure 1:
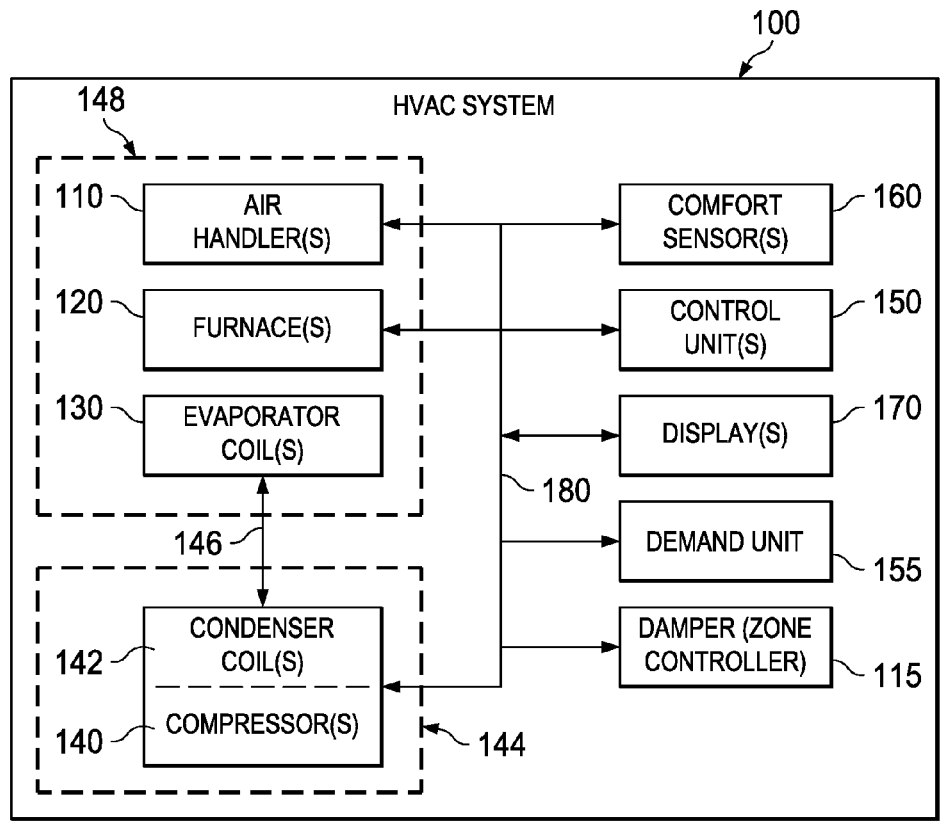
FIG. 1 is a high-level block diagram of an HVAC system according to various embodiments of the disclosure.

FIG. 1 is a high-level block diagram of a networked HVAC system, generally designated 100. The HVAC system 100 may be referred to herein simply as "system 100" for brevity. In one embodiment, the system 100 is configured to provide ventilation and therefore includes one or more air handlers 110. In an alternative embodiment, the ventilation includes one or more dampers 115 to control air flow through air ducts (not shown.) Such control may be used in various embodiments in which the system 100 is a zoned system. In an alternative embodiment, the system 100 is configured to provide heating and therefore includes one or more furnaces 120, typically associated with the one or more air handlers 110. In an alternative embodiment, the system 100 is configured to provide cooling and therefore includes one or more refrigerant evaporator coils 130, typically associated with the one or more air handlers 110. Such embodiment of the system 100 also includes one or more compressors 140 and associated condenser coils 142, which are typically associated with one or more so-called "outdoor units" 144. The one or more compressors 140 and associated condenser coils 142 are typically connected to an associated evaporator coil 130 by a refrigerant line 146. In an alternative embodiment, the system 100 is configured to provide ventilation, heating and cooling, in which case the one or more air handlers 110, furnaces 120 and evaporator coils 130 are associated with one or more "indoor units" 148, e.g., basement or attic units that may also include an air handler.

For convenience in the following discussion, a demand unit 155 is representative of the various units exemplified by the air handler 110, furnace 120, and compressor 140, and more generally includes an HVAC component that provides a service in response to control by the control unit 150. The service may be, e.g., heating, cooling, humidification, dehumidification, or air circulation. A demand unit 155 may provide more than one service, and if so, one service may be a primary service, and another service may be an ancillary service. For example, for a heating unit that also circulates air, the primary service may be heating, and the ancillary service may be air circulation (e.g. by a blower).

The demand unit 155 may have a maximum service capacity associated therewith. For example, the furnace 120 may have a maximum heat output (often expressed in terms of British Thermal Units (BTU) or Joules), or a blower may have a maximum airflow capacity (often expressed in terms of cubic feet per minute (CFM) or cubic meters per minute (CMM)). In some cases, the demand unit 155 may be configured to provide a primary or ancillary service in staged portions. For example, blower may have two or more motor speeds, with a CFM value associated with each motor speed.

One or more control units 150 control one or more of the one or more air handlers 110, the one or more furnaces 120 and/or the one or more compressors 140 to regulate the temperature of the premises, at least approximately. In various embodiments to be described, the one or more displays 170 provide additional functions such as operational, diagnostic and status message display and an attractive, visual interface that allows an installer, user or repairman to perform actions with respect to the system 100 more intuitively. Herein, the term "operator" will be used to refer collectively to any of the installer, the user and the repairman unless clarity is served by greater specificity.

One or more separate comfort sensors 160 may be associated with the one or more control units 150 and may also optionally be associated with one or more displays 170. The one or more comfort sensors 160 provide environmental data, e.g. temperature and/or humidity, to the one or more control units 150. An individual comfort sensor 160 may be physically located within a same enclosure or housing as the control unit 150, in a manner analogous with a conventional HVAC thermostat. In such cases, the commonly housed comfort sensor 160 may be addressed independently. However, the one or more comfort sensors 160 may be located separately and physically remote from the one or more control units 150. Also, an individual control unit 150 may be physically located within a same enclosure or housing as a display 170, again analogously with a conventional HVAC thermostat. In such embodiments, the commonly housed control unit 150 and display 170 may each be addressed independently. However, one or more of the displays 170 may be located within the system 100 separately from and/or physically remote to the control units 150. The one or more displays 170 may include a screen such as a liquid crystal or OLED display (not shown).

Although not shown in FIG. 1, the HVAC system 100 may include one or more heat pumps in lieu of or in addition to the one or more furnaces 120, and one or more compressors 140. One or more humidifiers or dehumidifiers may be employed to increase or decrease humidity. One or more dampers may be used to modulate air flow through ducts (not shown). Air cleaners and lights may be used to reduce air pollution. Air quality sensors may be used to determine overall air quality.

Finally, a data bus 180, which in the illustrated embodiment is a serial bus, couples the one or more air handlers 110, the one or more furnaces 120, the one or more evaporator condenser coils 142 and compressors 140, the one or more control units 150, the one or more remote comfort sensors 160 and the one or more displays 170 such that data may be communicated therebetween or thereamong. As will be understood, the data bus 180 may be advantageously employed to convey one or more alarm messages or one or more diagnostic messages. All or some parts of the data bus 180 may be implemented as a wired or wireless network.

The data bus 180 in some embodiments is implemented using the Bosch CAN (Controller Area Network) specification, revision 2, and may be synonymously referred to herein as a residential serial bus (RSBus) 180. The data bus 180 provides communication between or among the aforementioned elements of the network 200. It should be understood that the use of the term "residential" is nonlimiting; the network 200 may be employed in any premises whatsoever, fixed or mobile. Other embodiments of the data bus 180 are also contemplated, including e.g., a wireless bus, as mentioned previously, and 2-, 3- or 4-wire networks, including IEEE-1394 (Firewire™, i.LINK™, Lynx™), Ethernet, Universal Serial Bus (e.g., USB 1.x, 2.x, 3.x), or similar standards. In wireless embodiments, the data bus 180 may be implemented, e.g., using Bluetooth™, Zibgee or a similar wireless standard.

Figure 2:
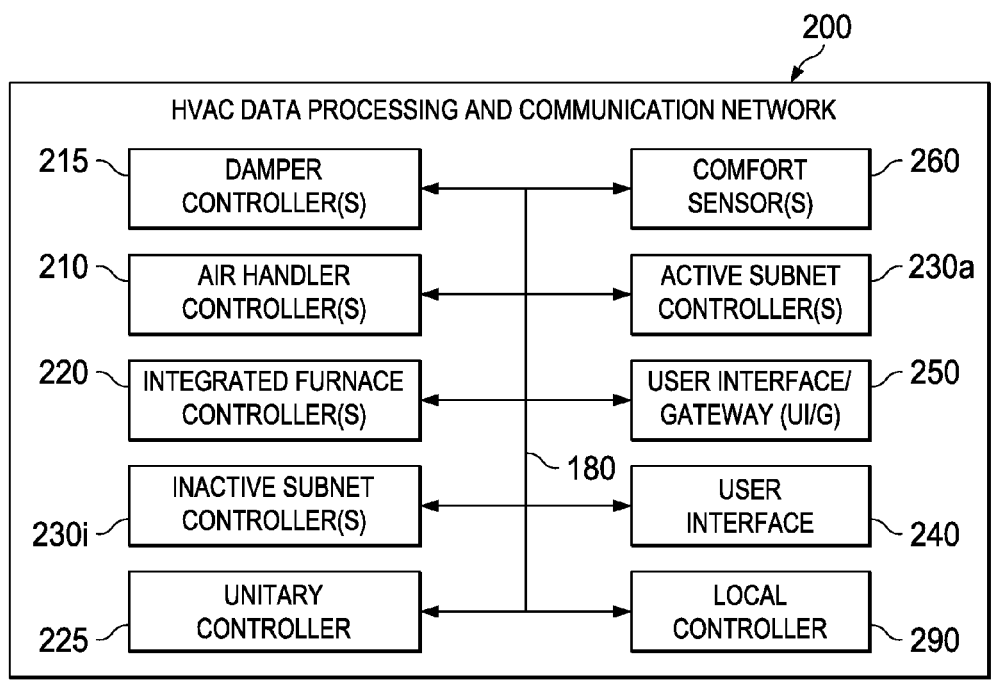
FIG. 2 is a high-level block diagram of one embodiment of an HVAC data processing and communication network.

FIG. 2 is a high-level block diagram of one embodiment of an HVAC data processing and communication network 200 that may be employed in the HVAC system 100 of FIG. 1. One or more air handler controllers (AHCs) 210 may be associated with the one or more air handlers 110 of FIG. 1. One or more integrated furnace controllers (IFCs) 220 may be associated with the one or more furnaces 120. One or more damper controller modules 215, also referred to herein as a zone controller module 215, may be associated with the one or more dampers 115. One or more unitary controllers 225 may be associated with one or more evaporator coils 130 and one or more condenser coils 142 and compressors 140 of FIG. 1. The network 200 includes an active subnet controller (aSC) 230a and an inactive subnet controller (iSC) 230i. The aSC 230a may act as a network controller of the system 100. The aSC 230a is responsible for configuring and monitoring the system 100 and for implementation of heating, cooling, humidification, dehumidification, air quality, ventilation or any other functional algorithms therein. Two or more aSCs 230a may also be employed to divide the network 200 into subnetworks, or subnets, simplifying network configuration, communication and control. Each subnet typically contains one indoor unit, one outdoor unit, a number of different accessories including humidifier, dehumidifier, electronic air cleaner, filter, etc., and a number of comfort sensors, subnet controllers and user interfaces. The iSC 230i is a subnet controller that does not actively control the network 200. In some embodiments, the iSC 230i listens to all messages broadcast over the data bus 180, and updates its internal memory to match that of the aSC 230a. In this manner, the iSC 230i may backup parameters stored by the aSC 230a, and may be used as an active subnet controller if the aSC 230a malfunctions. Typically there is only one aSC 230a in a subnet, but there may be multiple iSCs therein, or no iSC at all. Herein, where the distinction between an active or a passive SC is not germane the subnet controller is referred to generally as an SC 230.

A user interface (UI) 240 provides a means by which an operator may communicate with the remainder of the network 200. In an alternative embodiment, a user interface/gateway (UI/G) 250 provides a means by which a remote operator or remote equipment may communicate with the remainder of the network 200. Such a remote operator or equipment is referred to generally as a remote entity. A comfort sensor interface 260, referred to herein interchangeably as a comfort sensor (CS) 260, may provide an interface between the data bus 180 and each of the one or more comfort sensors 160. The comfort sensor 260 may provide the aSC 230a with current information about environmental conditions inside of the conditioned space, such as temperature, humidity and air quality.

For ease of description, any of the networked components of the HVAC system 100, e.g., the air handler 110, the damper 115, the furnace 120, the outdoor unit 144, the control unit 150, the comfort sensor 160, the display 170, may be described in the following discussion as having a local controller 290. The local controller 290 may be configured to provide a physical interface to the data bus 180 and to provide various functionality related to network communication. The SC 230 may be regarded as a special case of the local controller 290, in which the SC 230 has additional functionality enabling it to control operation of the various networked components, to manage aspects of communication among the networked components, or to arbitrate conflicting requests for network services among these components. While the local controller 290 is illustrated as a stand-alone networked entity in FIG. 2, it is typically physically associated with one of the networked components illustrated in FIG. 1.

Figure 3:
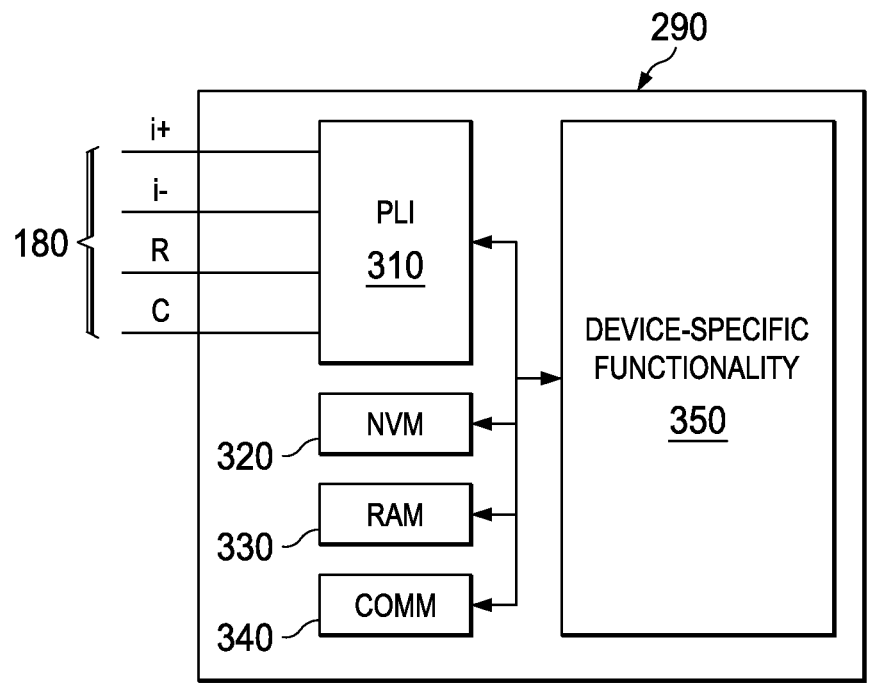
FIG. 3 is a block diagram of a local controller of the disclosure.

FIG. 3 illustrates a high-level block diagram of the local controller 290. The local controller 290 includes a physical layer interface (PLI) 310, a non-volatile memory (NVM) 320, a RAM 330, a communication module 340 and a functional block 350 that may be specific to the demand unit 155, e.g., with which the local controller 290 is associated. The PLI 310 provides an interface between a data network, e.g., the data bus 180, and the remaining components of the local controller 290. The communication module 340 is configured to broadcast and receive messages over the data network via the PLI 310. The functional block 350 may include one or more of various components, including without limitation a microprocessor, a state machine, volatile and nonvolatile memory, a power transistor, a monochrome or color display, a touch panel, a button, a keypad and a backup battery. The local controller 290 may be associated with a demand unit 155, and may provide control thereof via the functional block 350, e.g. The NVM 320 provides local persistent storage of certain data, such as various configuration parameters, as described further below. The RAM 330 may provide local storage of values that do not need to be retained when the local controller 290 is disconnected from power, such as results from calculations performed by control algorithms. Use of the RAM 330 advantageously reduces use of the NVM cells that may degrade with write cycles.

In some embodiments, the data bus 180 is implemented over a 4-wire cable, in which the individual conductors are assigned as follows:

R—the "hot"—a voltage source, 24 VAC, e.g.
C—the "common"—a return to the voltage source.
i+—RSBus High connection.
i−—RSBus Low connection.

The disclosure recognizes that various innovative system management solutions are needed to implement a flexible, distributed-architecture HVAC system, such as the system 100. More specifically, cooperative operation of devices in the system 100, such as the air handler 110, outdoor unit 144, or UI 240 is improved by various embodiments presented herein. More specifically still, embodiments are presented of obtaining diagnostic information from components of the HVAC system 100, and of generating and managing alarms when exceptions to normal operation are detected.

Figure 4:
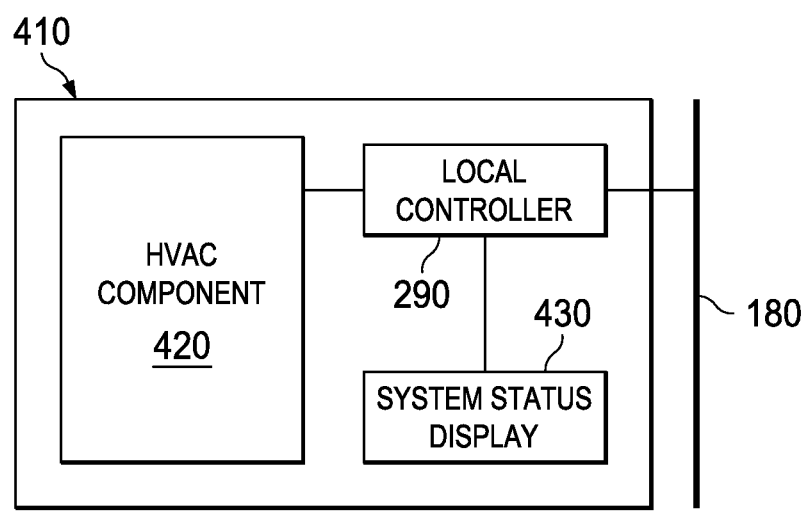
FIG. 4 is a block diagram of a networked HVAC component of the disclosure.

FIG. 4 illustrates a device 410 according to the disclosure. The following description pertains to the HVAC data processing and communication network 200 that is made up of a number of system devices 410 operating cooperatively to provide HVAC functions. Hereinafter the system device 410 is referred to more briefly as the device 410 without any loss of generality. The term "device" applies to any component of the system 100 that is configured to communicate with other components of the system 100 over a wired or wireless network. Thus, the device 410 may be, e.g., the air handler 110 in combination with its AHC 210, or the furnace 120 in combination with its IFC 220. This discussion may refer to a generic device 410 or to a device 410 with a specific recited function as appropriate. An appropriate signaling protocol may be used to govern communication of one device with another device. While the function of various devices 410 in the network 200 may differ, each device 410 shares a common architecture for interfacing with other devices, e.g. the local controller 290 appropriately configured for the HVAC component 420 with which the local controller 290 is associated. The microprocessor or state machine in the functional block 350 may operate to perform any task for which the device 410 is responsible, including, without limitation, sending and responding to messages via the data bus 180, controlling a motor or actuator, or performing calculations. A system status display 430 is described below.

In various embodiments, signaling between devices 410 relies on messages. Messages are data strings that convey information from one device 410 to another device 410. The purpose of various substrings or bits in the messages may vary depending on the context of the message. Generally, specifics regarding message protocols are beyond the scope of the present description. However, aspects of messages and messaging are described when needed to provide context for the various embodiments described herein.

Diagnostics

Often during operation of the system 100, information regarding the operation of the system 100 may be needed by a device 410 for continued proper operation. In a bus-oriented system such as the system 100, unconstrained inquiries conveyed via the data bus 180 may disrupt normal operation and/or consume bus bandwidth needlessly. Embodiments of methods and systems of managing information requests in the system are presented herein. Such methods and systems advantageously provide efficient and timely management of information requests by the various devices 410 to provide the operator with needed information.

As mentioned above, diagnostics can be performed in one or more ways that may depend on the information contained in a particular device's status message. In some cases, diagnostics may be performed based on a class of diagnostic messages. Examples of classes, described further below, include a user interface/gateway class, a broadcast class or a dedicated diagnostic message class.

In various embodiments, a diagnostic inquiry message is sent by a diagnostic device, which could be a dedicated hardware diagnostic tool, the UI 240 or the UI/G 250. The UI 240 may be, e.g., a part of a wall-mounted device superficially resembling a conventional thermostat that provides information to and accepts input from a user. The UI/G 250 may also provide an interface from the RSBus 180 to an external network, such as the internet. The role of the UI 240 and the UI/G 250 may overlap in some respects. Herein, various embodiments are sometimes described in the context of the UI/G 250 reflecting this overlap.

Each device 410 on the data bus 180 may be configured to respond to the inquiry message. The system 100 may be configured such that some diagnostic messages do not disrupt normal device operation of the various devices 410 therein. For example, the diagnostic messages may have a priority lower than a priority assigned to messages related to normal operation of the system 100. In some embodiments, however, a privileged class of diagnostic messages may be defined, for which the system 100 is configured to provide a greater priority than routine message traffic.

In various embodiments, devices 410 are configured to recognize and respond to a privileged message that is a member of a privileged class of messages. For convenience herein, the privileged class is referred to without limitation as Class 6 diagnostic messages. The device 410 may be configured to respond to a Class 6 message in any operating state of the device 410. In some embodiments, the device 410 is configured to respond to the Class 6 message as soon as possible after power-up. For example, a startup state machine sequence may enable the device 410 to respond to a Class 6 message before the state machine enables any other functionality of the device 410.

Each device 410 may be configured to send and receive Class 6 messages. Class 6 messages include bits that may be used to address a particular device. These bits are referred to herein as Device Designator (DD) bits. Devices 410 that are disabled or have not been fully configured may still send and receive Class 6 messages. In some cases a message may also include an Equipment Type (ET) designator to identify a specific logical device when more than one logical device is embodied by a single physical device.

A device 410 may have a dedicated diagnostic mode, referred to herein without limitation as Level 1 Diagnostic Mode. The device 410 may enter the Level 1 Diagnostic Mode upon receipt of a message from another device 410, e.g. the UI 240 or UI/G 250. The device 410 may exit the Level 1 Diagnostic Mode upon receipt of an exit message from another device 410, e.g. UI 240 or UI/G 250, or upon timeout. The receiving device 410 may remain in the Level 1 Diagnostic Mode indefinitely, or for a limited time, depending on the message sent.

During the Level 1 Diagnostic Mode the device 410 may receive a Class 6 diagnostic message. The diagnostic message may be sent by the aSC 230a. In one embodiment the diagnostic message includes a parameter value to be saved in a memory location associated with that parameter. In another embodiment the message includes a request that the device 410 publish a message containing the value of a parameter of interest. The request may be for a single Class 6 message including the parameter of interest, or for a series of Class 6 messages sent periodically including a current value of the parameter of interest. A Class 6 message may be spontaneously sent by the device 410 when a parameter value changes.

The system 100 may be configured such that the device 410 must operate in the Level 1 diagnostic mode when the device 410 is in a predetermined state. For example, without limitation, such a predetermined state may be an Installer Test state reserved for use by a system installer or service provider. In some embodiments each device 410 associated with the data bus 180 is configured to support the Level 1 diagnostic mode. A device 410 supporting Level 1 diagnostics may enter this mode upon receipt of a suitable directive from the UI 240, e.g. a message sent over the data bus 180. Such a message may include one or more dedicated bits, the state of which conveys information to the device 410. In one embodiment, the message may include an Enter bit that when set instructs the device to enter the diagnostic mode. In another embodiment, a bit signals a device 410 to remain in a diagnostic mode indefinitely when set, but to automatically exit the diagnostic mode after a predetermined period when the bit is reset.

The device 410 may be further configured to exit the Level 1 diagnostic mode upon receipt of another suitable directive via a message from the UI 240. The message may again include a dedicated signal bit, such as the Enter bit. In this case, the Enter bit may, when reset, instruct the device 410 to exit the diagnostic mode. Alternatively, the device 410 may automatically exit the Level 1 diagnostic mode after the expiration of the predetermined period described above.

In some embodiments, devices 410 may be configured to send a periodic diagnostic message at regular intervals, e.g., once per minute, or in the event of a parameter change. A parameter is a datum associated with an operational aspect of the system 100, such as a fan speed setting. Level 1 diagnostic messages may include such periodic diagnostic messages. Periodic messages may be used together with messages sent in the course of normal operation, e.g., device status messages, that continue to be sent at regular intervals during Level 1 diagnostics. In some embodiments device 410 may be configured to receive a message from the data bus 180 while in Level 1 diagnostic mode and in response thereto store a parameter value included in the message.

In various embodiments, the system 100 is configured to include various diagnostic capabilities. Each device 410 associated with the data bus 180 may be configured to periodically broadcast a Class 6 diagnostic status message, reflecting its operational status. Each device 410 may have a unique status message defined for that device 410. Due to system bandwidth limitations and message latency issues, it may be disadvantageous for the device 410 to provide all of its diagnostic information on the bus at all times. For instance, the network 200 may be unable to accommodate the amount of diagnostic data that would result if each device 410 coupled to the network 180 were to continuously provide all its diagnostic data simultaneously with the other devices 410. In such a case, limits on bandwidth of the data bus 180 would likely result in delays in reporting Class 3 Device_status messages that would temporally decouple presentation of the status to the operator, e.g. on the display 170, from the real-time state of the reporting device 410. The probability of a decoupling delay will generally increase as the number of devices 410 and the amount of data to be reported increase.

To preserve the real-time nature of the data reported to the operator, in an advantageous embodiment such a diagnostic mode is enabled only for a limited time, and on a proper subset of the devices 410. A proper subset is a subset of the devices 410 that lacks at least one of the devices 410. In some embodiments the proper subset is a single device 410. In some embodiments, the subset is enabled automatically in a certain operating state, such as an installer test state. In some embodiments, the subset is enabled by an explicit command via a message from the aSC 230a.

Once placed in the level 1 diagnostic mode, the device 410 may periodically send a Class 6 diagnostic status message upon the expiration of a first predetermined time interval, determined, e.g. by an internal timer, without further intervention by the aSC 230a. In some embodiments, the device 410 may automatically send a class 6 diagnostic status message when an internal parameter value changes. In some embodiments, the device 410 sends a class 6 diagnostic status message in response to a single query by the aSC 230a, referred to herein as a query-response type message. In some embodiments, the message priority of a class 6 diagnostic status message sent automatically by the device 410 is higher than that of a query-response type message, so that the query-response type message, if executed, does not interfere with the real-time nature of the automatically sent class 6 diagnostic status messages. In various embodiments the device 410 exits the diagnostic mode upon receipt of a terminating message from the aSC 230a, or upon the expiration of a second predetermined timer interval determined, e.g., by the internal timer.

In some embodiments, the system 100 and associated devices 410 are configured to provide for setting and retrieving operational variables in the devices 410. These variables may represent an internal state of equipment, operating statistics, etc. For example, the UI 240 may issue a specific message to which the device 410 is configured to respond with operational data. A successful read may be indicated by a suitable response message, while an unsuccessful read may be indicated by an error message. Device variables may also be written to a device 410 via a suitable message. The device 410 may respond to such a message with a suitable acknowledgment with appropriate acknowledge bits set.

The diagnostic read and write inquiries may be governed according to suitable rules, such as the following, presented by way of example without limitation:

Diagnostic read inquiries may be requested at any time, without limitation by operational mode of the subject device 410.

Diagnostic write inquiries may be executed only while the device 410 is in an idle mode, e.g., when there is no other demand on and no service provided by the device 410.

One or more bits of a query number associated with the inquiry may be reserved to signal that a diagnostic write inquiry associated with the query number may only be executed by the device 410 while the device 410 is disabled.

One or more bits of the query number may be reserved to signal that a diagnostic write inquiry associated with it may be executed by the device 410 at any time.

Illustrative Embodiments

In an embodiment, a UI 240 is configured to display diagnostic information related to a device 410 on the data bus 180. In conventional HVAC systems, to the extent that diagnostic information regarding a system component is displayed, the information is displayed at the component. For example, diagnostic information regarding a conventional furnace must typically be viewed at the furnace in a conventional system.

In contrast to conventional HVAC systems, embodiments within the scope of the disclosure provide the ability to view diagnostic information via the UI 240 or the UI/G 250, either of which may be physically located remote from the device 410 associated with the displayed information. In this context, "located remote from" means the UI 240 or UI/G 250 is not located in a same enclosure, or similarly physically associated. However, the UI 240 and the device 410 may be located near one another or even mounted on a common surface, such as a wall, and remain "located remote from" each other. Thus, e.g., where the device 410 includes the furnace 120, the information may be viewed at a location of the UI 240, e.g. a wall-mounted enclosure or a service diagnostic tool. In some embodiments, the UI/G 250 is configured to make the diagnostic information available over the internet. For example, the UI/G may be configured to send an email message to one or more preselected addresses, or may connect to a server or diagnostic terminal at the site of an installer or manufacturer. Thus, a user, service provider or OEM may be apprised of diagnostic information related to the operation of the system 100 at a remote location using any conventional means to retrieve information over the internet. In an embodiment, the system 100 is configured to send an alert via email to a property owner or operator to convey an alert thereto.

In another embodiment, the UI/G 250 includes a gateway, such as an internet port, that allows a dealer to remotely log in to the system 100 to perform diagnostics. In the broadest sense, any diagnostics and tests that can be performed from the UI 240, which may in some cases be embodied in a wall-mounted enclosure, could be performed remotely by the dealer or manufacturer (hereinafter referred to as a "remote operator"). In some cases the remote operator may then determine the source of a problem with the system 100 more quickly than making a house call. In cases where the problem can be solved by a configuration change or alarm reset, e.g., the remote operator may then resolve the problem remotely. For example, the remote operator may remotely instruct the UI/G 250 to issue a message over the data bus 180 to change a parameter value, e.g., to change a fan speed setting. If a problem cannot be solved remotely, such as a failed motor, the remote operator can determine what replacement/repair parts and/or tools will be required to correct the problem, and place any orders necessary for replacement parts. Advantageously, the remote operator is thus able to operate with greater efficiency and provide a higher level of service to the homeowner than is possible with a conventional HVAC system.

Figure 5:
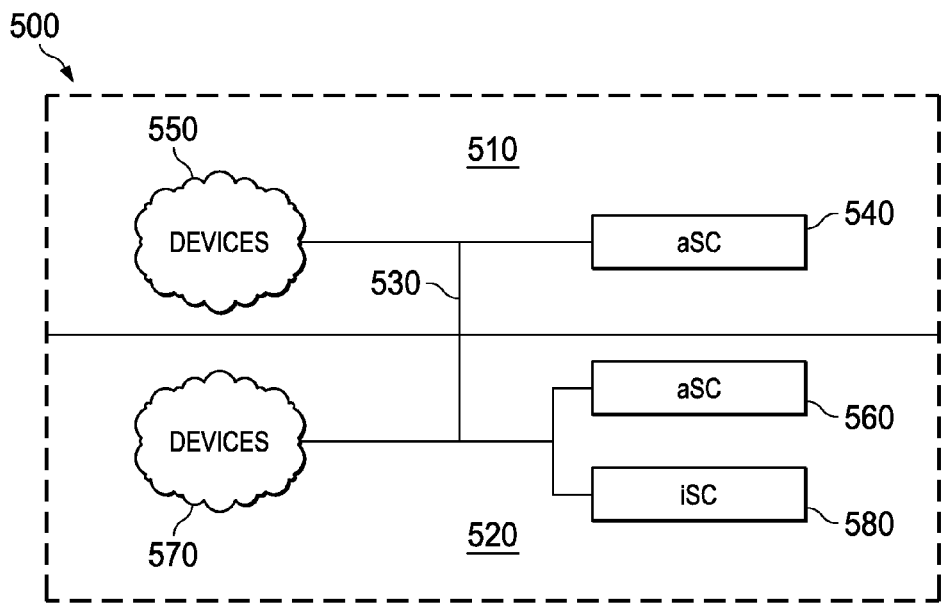
FIG. 5 is an embodiment of an HVAC data processing and communication network having two subnets.

FIG. 5 illustrates an embodiment of a HVAC data processing and communication network generally designated 500. The network 500 includes two subnets 510, 520 configured to communicate therebetween over a serial bus 530. The subnet 510 has an aSC 540 and devices 550 associated therewith. Similarly, the subnet 520 has an aSC 560 and devices 570 associated therewith. The subnet 520 is also illustrated having an optional iSC 580 associated therewith. The aSCs 540, 560 are active subnet controllers, while the iSC 580 is an inactive subnet controller. Each subnet 510, 520 may operate autonomously of the other, or in some cases one of the aSC 540 or the aSC 560 may assert control over the subnet 510, 520 associated with the other of the aSC 540 or the aSC 560. Thus, for example, the aSC 560 may control devices located in the subnet 510. Such cross-subnet control may be advantageous, e.g., when whole-house control is desired of an otherwise zoned HVAC system.

Figure 6:
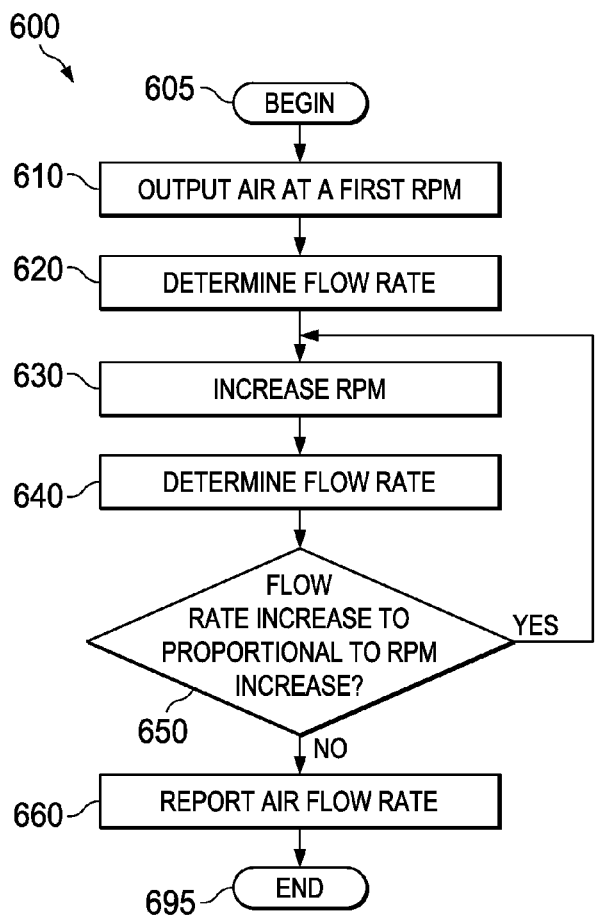
FIG. 6 is a flow diagram of a method of the disclosure of testing air duct performance in an HVAC data processing and communication network.

FIG. 6 illustrates a method generally designated 600 of remotely servicing an HVAC data processing and communication network. A method of manufacturing may include configuring the relevant elements of the system 100 to operate as described by the method 600. Without limitation, the method 600 is described in the context of field testing and verifying the status of an air duct in the system 100 in which the indoor unit 148 is equipped with a variable speed blower. The method 600 may be used, e.g., to determine a flow limitation of the air path of the system 100. The method 600 begins with a state 605 which may be entered from any appropriate operating state of the system 100. The method 600 may be implemented using the aSC 230a, or a controller located with the indoor unit 148. In some embodiments, the method 600 is implemented by the AHC 210.

HVAC systems may suffer from a limit on airflow through the air duct system due to high static pressure at a given operating condition. The indoor blower may be unable to maintain a set rate of air delivery, a situation sometimes referred to by those skilled in the pertinent art as a "cutback" mode. Operation in this mode may increase operating costs of the system 100 and/or risk unsafe operating conditions. An operator often is unable to test operation of an HVAC system in the cutback mode, or to determine the marginality of the system airflow setting. This inability is especially acute in a zoned system employing dampers 115 (FIG. 1) that may additionally increase the static pressure in the ducts (not shown).

In a step 610, the indoor unit 148 operates a blower to output air at a first power level or revolutions per minute (RPM). The indoor unit 148 may receive a suitable instruction from a controller, e.g., the aSC 230a or a stand-alone diagnostic tool coupled to the data bus 180 via a diagnostic port, via a message delivered over the data bus 180. The first air flow may be, e.g., 50% of a rated maximum air flow. In a step 620, the flow rate resulting from the first power level is determined. Such determination may be made by way of a flow meter installed at an outlet of the blower, e.g., or down stream in an air duct. The flow meter may be, e.g., a hot-wire or propeller type, and may be configured to communicate over the data bus 180 to receive command messages and provide flow data. The first power level may be reported to the aSC 230a via a message, or may be retained locally for future computation by a controller located at the indoor unit 148. In a step 630, the indoor unit 148 operates at a second power level greater than the first power level. The increment from the first to the second power level may be, e.g., about 5% of a maximum power level of the blower. Without limitation, an increment of about 5% advantageously provides a sufficiently small quantum of flow resulting from the power level increase without resulting in an unduly long test procedure. In a step 640, the flow rate resulting from the increased power level is determined.

In a decisional step 650 a difference between the second determined flow rate, from the step 640, and the first determined flow rate, from the step 620, is determined. If the determined difference of flow rate is about proportional to the difference of power level corresponding to the difference of flow rate, then the method 600 branches to the step 630 to again increase the power level of the blower. By proportional, it is meant that the increase of air flow rate resulting from the increase of power level is about the same proportion of the flow rate before the increase as is the increase of power over the power before the increase. In other words, when the increase of flow rate is about proportional to the increase of power, a 5% increase of power will result in about a 5% increase of air flow. The loop including the steps 630, 640, 650 may be timed to limit the increase of power to the blower to a specified value, e.g., 5% per minute.

If in the step 650 the increase of air flow is determined to be not proportional to the increase of power, then the method 600 advances to a step 660. This transition represents the onset of cutback mode in the flow of air from the air handler 110. The air handler 110 reports the power level associated with the onset of the cutback mode and/or an air flow value, e.g., via a message. This information may be reported locally or to a remote manufacturer or dealer site for appropriate action. The method 600 ends with a state 695, from which operation of a calling routine may resume operation.

Figure 25:
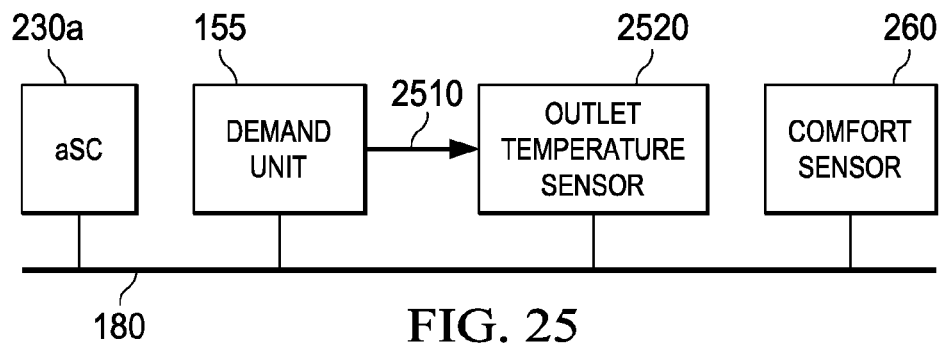
FIG. 25 illustrates an embodiment of sensing an outlet air temperature.

FIG. 25 illustrates a configuration of the system 100 for determining a fault condition of the system 100 when a demand unit 155 fails to provide its primary service as expected. In some cases, a failure of the system 100 to perform as expected is detectable by comparing the temperature of discharge air 2510 of the demand unit 155, as measured by a discharge temperature sensor 2520, to an expected trend. For example, if a service demand by the aSC 230a calls for heat from the indoor unit 148 or the furnace 120, then the discharge temperature may be expected to increase relative to an ambient temperature. On the other hand, the discharge temperature may be expected to decrease relative to the ambient temperature. If the discharge temperature fails to follow the expected trend in either of these cases, a system fault may be generated.

Figure 26:
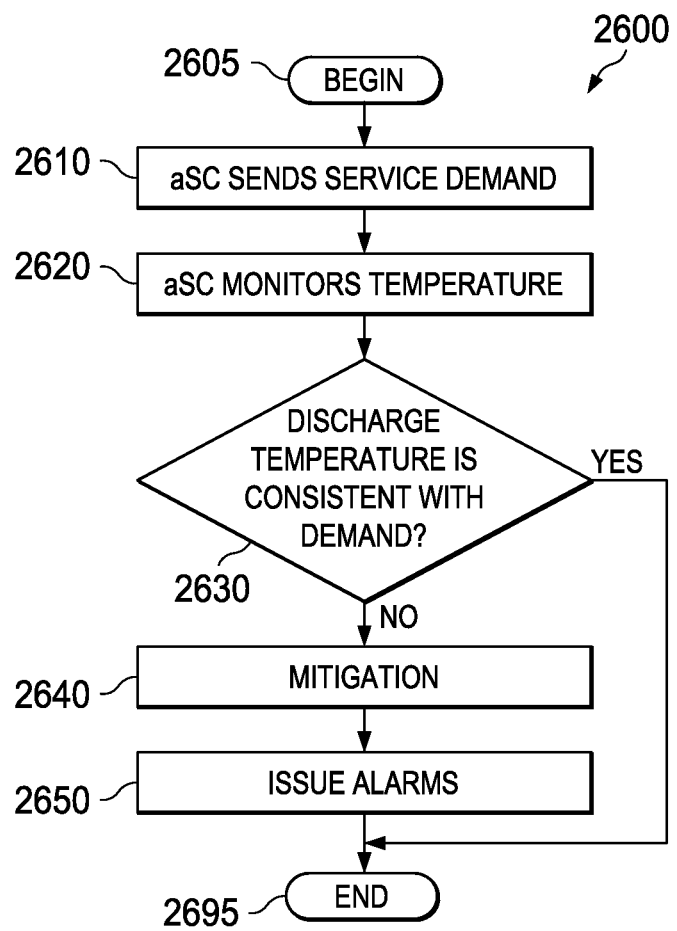

FIG. 26 illustrates a method generally designated 2600 of operating the network 200 to determine and report a failure of the discharge air of a demand unit 155 to follow an expected temperature profile. A method of manufacturing the network 200 may include configuring various components of the system 100 to implement the method 2600. The method 2600 begins with a state 2605, which may be entered from any suitable operating state of the system 100. In a step 2610, the aSC 230a sends a message to the demand unit 155 requesting a service, e.g., outputting heated air. In a step 2620, the aSC 230a monitors messages published by the sensor 2520 reporting a measured temperature of the discharge air 2510, and monitors messages published by the comfort sensor 260 reporting an ambient temperature. In a decisional step 2630, the aSC 230a compares the discharge air temperature to the ambient temperature. In the event that discharge temperature is consistent with the active service demand, e.g. heating, then the method 2600 advances to a state 2695, from which the system 100 may resume operation from a calling routine, e.g. In the event that the discharge temperature is inconsistent with the active service demand, the method 2600 branches from the step 2630 to a step 2640. Determining whether the discharge temperature is consistent with the active service demand may include, e.g., determining a profile of temperature vs. time and comparing the temperature-time profile to an expected profile or family of profiles; determining a temperature change, resulting from the service demand, of the discharge air 2510 relative to the ambient; taking into account a delay time associated with the discharge temperature; or and providing a temperature range around the ambient temperature, outside of which the discharge temperature is considered to be consistent with the active service demand.

The step 2640 may be an optional step in which one or more mitigating steps may be taken, including waiting an additional time for the discharge temperature to change, reasserting the service demand, or checking for any alarm conditions related to the operation of the demand unit 155. The method 2600 advances from the step 2640 to a step 2650, or directly from the step 2630 to the step 2650 if the optional step 2640 is omitted. In the step 2650, the aSC 230a determines that the demand unit 155 is malfunctioning and issues one or more alarms. The alarms may be generated to notify the user, the installer, or both (as described further below) of the failure. The method 2600 the ends with the terminal state 2695.

Alarms

As set forth in detail below, various devices in the HVAC data processing and communication network may be configured to provide an alarm under certain predetermined conditions. Various embodiments make use of a hierarchy of alarm states. Broadly, three levels of alarms are defined in one embodiment: minor alarms, moderate and critical alarms. These priorities may be encoded in bits of an alarm message to signal a device receiving the alarm of the alarm level.

In an embodiment, minor alarms are generated in response to a momentary event that has no significant bearing on the overall operation of the system 100. These events are usually transient in nature and typically are resolved without intervention by the operator. In various embodiments, alarms have a User Notification flag, Notify_User, and a Dealer Notification flag, Notify_Dealer, which may be set to indicate that a user (e.g., homeowner) or dealer should be contacted regarding the alarm. The User Notification Flags provide the ability to customize alerts that a remote entity receives and those that a homeowner receives. In some embodiments, all minor alarms have a their Notify_User and Notify_Dealer flags set to FALSE, meaning a user or dealer need not be altered to the alarm condition.

Moderate alarms may indicate a problem of a potentially more serious nature than problems that generate a minor alarm. These alarms may serve as indicators of possible product performance deterioration, or as advanced warnings of an impending malfunction. Devices may be configured to require intervention by the operator to clear the moderate alarm from memory. In some embodiments, all moderate alarms have their Notify_User and Notify_Dealer flags set to FALSE.

In various embodiments critical alarms are reserved for critical situations. Critical situations are non-recoverable problems that normally require service by a technician to repair. These alarms can also serve as general critical warnings. User or technician intervention is typically needed to clear these alarms from system memory. Unless stated otherwise, critical alarms have their Notify_User and Notify_Dealer flags set to TRUE.

In other embodiments, the setting of the User Notification Flags depends on alarm attributes other than the alarm level. In one embodiment, the Notify_Dealer flag is set for alarm messages of all levels originated by a new model of a system device 410, allowing a dealer to track alarms in a more detailed manner than alarms from more established devices 410.

Any of the minor, moderate and critical alarms may be a continuous alarm or an event alarm. Continuous alarms may be persistent, meaning the alarm condition may be removed only by correcting the root cause of the alarm, e.g. a hardware failure. These alarms generally are associated with a sensor associated with a failing device. For example, a blower may have a sensor that reports a failure of communication with an associated motor. In another aspect, a continuous alarm may be associated with a failure that prevents the device 410 from performing a basic service for which it is intended.

Event alarms may be triggered by an event that is in progress. These alarms can be cleared by a device that is the source of the alarm upon a request message from the UI 240 or the UI/G 250. For example, upon request from the UI/G 250 or the aSC 230a, a device 410 may retry an operation, the previous failure of which resulted in an alarm state. If the device 410 is successful in performing the requested operation, then the event alarm is cleared. The number of consecutive event alarm events may be tracked, and an action taken in response to the number of events. An event-type alarm may have an associated specific timeout condition specified. This may be a simple time period (e.g., an alarm condition may time out after the time has passed and the service bits are restored), certain condition criteria (e.g., such as clearing of another alarm), or any combination of both. When an alarm is posted on the data bus 180, it may remain active until an alarm clearing message is sent out by the device 410 associated with that specific alarm. That device 410 sends out the alarm clearing message on the data bus 180 to notify other devices 410 in the system 100 of the alarm being cleared. The device may also update a status message thereof whose contents may be displayed by the UI 240 to reflect the highest level of currently active alarms, if there are any. The alarms may be noted by the aSC 230a and locally stored in the RAM 330 or the NVM 320 of the device 410 and on one or more subnet controllers 230 in the network 200. For example, minor alarms may be stored in the RAM 330, while moderate and critical alarms may be stored in NVM 320.

Alarms may be cleared by a method that depends on the class of the alarm. Minor alarms may be cleared when the device 410 is reset. Reset may be in response to power-up or a reset instruction received from the aSC 230a, e.g. In some embodiments, consistent with the potentially more serious nature of moderate and critical alarms, such alarms are only cleared by a more deliberate action. In one embodiment, moderate and critical alarms are cleared only in one of three ways. In a first clearing procedure, a moderate or critical alarm is cleared by some physical action required by a device 410 associated with the alarm. A physical action may include, e.g., pressing a button or momentarily connecting electrical terminals provided for this purpose. In another procedure, the device 410 detects that the condition triggering the alarm no longer exists and clears the alarm independent of intervention external to the device 410. In a third procedure, the alarm may be cleared by a clearing message generated by the UI 240 upon request by the operator. A minor alarm may also be cleared by any of the procedures used to clear a moderate or critical alarm. In some embodiments, minor alarms are always cleared when the device is reset. In such a case the alarm clearing messages are not sent out by devices for those affected minor alarms.

In an embodiment, the UI 240 includes a display screen and is configured to display a status of an alarm timeout condition. The display screen may be touch-sensitive, allowing a user to enter an alarm-related command by contacting the display screen. For example, a virtual slide switch may be displayed that reflects the current status of the alarm. As used herein, a virtual switch is a graphic displayed on a touch-sensitive screen that is configured to alter the graphic in response to touch to mimic the operation of a physical switch. The operator may disable the timeout condition by sliding the virtual switch to a disabled position. An alarm condition that is normally associated with a timeout may be cleared. Thus the alarm may be converted from one that clears upon the expiration of a timeout period to one that is cleared upon command by other means as described previously.

In various embodiments, the device 410 includes the system status display 430. The system status display 430 is a display local to the device 410 that may provide limited information to an installer to aid assessing system 100 function. The system status display 430 may include, e.g., one or more LEDs configured to flash in manner that conveys information to an observer. In some embodiments, the system status display 430 includes more than one color of LED, and information is conveyed to the observer using more than one color.

In some embodiments, the system status display 430 is configured to convey information regarding an alarm status of the system 100. In one embodiment, the system status display 430 flashes an LED at a characteristic rate, e.g., 2 Hz, when the device 410 detects Comfort_Sensor_Status message on the data bus 180. The comfort sensor 260 may periodically send the Comfort_Sensor_Status message indicating current ambient temperature and humidity readings detected by the comfort sensor 260. In some cases, e.g. for a comfort sensor 260 remote from the aSC 230*a*, a device ID of the comfort sensor 260 may be set via a DIP switch on the comfort sensor 260. In some embodiments, it is an error condition when more than one system device 410 has the same device ID associated therewith. For example, two or more comfort sensors 260 or two or more displays 170 may inadvertently be assigned a same device ID. To assist the installer quickly identify such an error condition, in one embodiment a system status display 430 associated with a first comfort sensor 260 having a device ID is configured to flash at a characteristic rate when the first comfort sensor 260 detects a Comfort_Sensor_Status message on the data bus 180 that originates from a second comfort sensor 260 having the same device ID. In another embodiment, the system status display 430 of a device 410 is configured to provide a visual signal when the device 410 detects a message on the data bus 180 indicating a critical alarm is active.

In various embodiments, the system 100 is configured to allow a system alarm to be bypassed before a timeout period associated with that alarm has expired. In one embodiment, operation of a device 410 is inhibited while a system alarm associated with that device 410 is active. For example, the device 410 may include the furnace 120. A failure of a component of the furnace 120 may render the furnace 120 incapable of operating normally in some aspect. The local controller 290 associated with the furnace 120 may generate a disabling system alarm indicating the existence of the failure, with the active status of the alarm inhibiting further operation of the furnace 120. As used herein, a disabling system alarm is an alarm for which the device 410 issuing the alarm and/or the aSC 230*a* is/are configured to disable a primary service provided by the device 410. The alarm may have a timeout associated with it, the expiration of which re-enables operation of the furnace 120.

In some cases, however, it may be desirable to operate the furnace 120 prior to the timeout of the alarm in spite of the component failure, e.g., for diagnostic purposes. The UI 240 may provide a system mode switch, e.g., in a setup utility screen, that allows the operator to enable bypassing the system alarm. The UI 240 may present a single bypass switch that allows all disabling system alarms to be bypassed, or a switch for each alarm for which bypass capability is desired.

Figure 11:
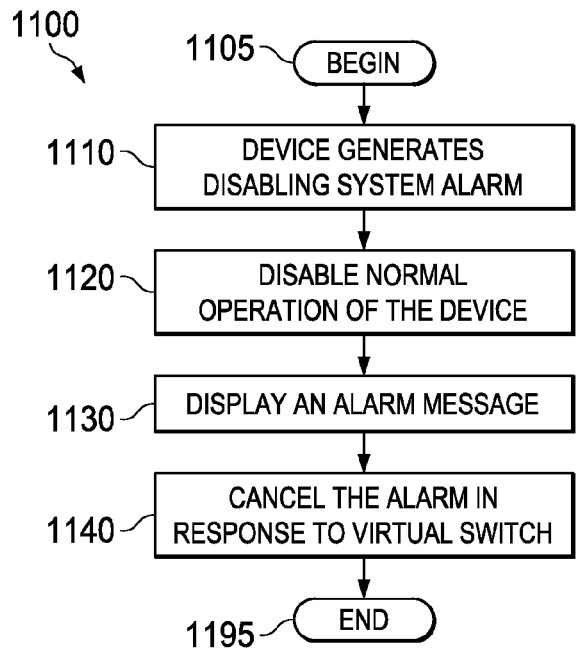
FIGS. 11-24 and 26 illustrate various methods of the disclosure.

Accordingly, FIG. 11 presents a method generally designated 1100 of operating an HVAC data processing and communication network, e.g., the system 100. A method of manufacturing the HVAC data processing and communication network may include configuring various components of the system 100 to implement the method 1100. The method 1100 begins with a state 1105, which may be entered from any suitable operating state of the system 100.

In a step 1110, an HVAC device, e.g. the device 410, generates a disabling system alarm. The alarm may be in response to a condition of the device 410 that precludes normal operation thereof. The alarm may have a timeout period associated therewith, the expiration of which cancels the alarm state and any effects associated with the existence of the alarm state. In a step 1120, normal operation of the device 410 is disabled. The disabling may be a result, e.g., of action by the local controller 290 associated with the device 410 that generates the alarm, or may be a result of an instruction issued by the aSC 230*a* in response to the disabling system alarm that directs the device 410 to cease providing its primary service. In a step 1130, an alarm message is displayed on a screen of the UI 240. The alarm message includes a virtual switch configured to cancel the disabling system alarm. Display of the virtual switch may be enabled by a system 100 configuration setting, as described above. In some cases, the virtual switch is configured to allow disabling of the alarm before the expiration of a timeout period associated with the alarm. In a step 1140, the alarm is canceled in response to manipulation of the virtual switch. The cancellation restores operation of the device 410 that is the source of the alarm. The cancelling may be caused by, e.g., the aSC 230*a* or by the local controller 290 responding to a message sent by the UI 240 in response to the screen manipulation. The method 1100 ends with a state 1195 from which operation of a calling routine may resume.

The UI 240 may display data from device status messages, e.g., on a display screen. In general, a Device_status message may indicate the operational and/or alarm state of a device 410 on the data bus 180. For convenience herein, Device_status messages are referred to without limitation as Class 3 system broadcast messages. Class 3 system broadcast messages may be broadcast from one subnet, but all devices from all subnets can listen and respond to them. System broadcast messages include without limitation alarms messages and Device_status.

Any device 410 may be configured to generate a message when an alarm is set or cleared. A message may be displayed on the UI 240 to indicate that an alarm is set or cleared for data logging and/or human debugging of the system 100. In one embodiment, a Device_status message indicates the instantaneous state of that device. If the status message indicates that the device 410 is ready to operate, such as after the device 410 times out an active event-type alarm, the aSC 230*a* treats it as operational and proceeds with the appropriate demand messages, e.g., messages configured to command the device to perform an HVAC function. The device 410 receives this demand message and attempts to comply therewith. If the device 410 does not detect any conditions inconsistent with normal operation, the device 410 issues an alarm clearing message to indicate that the alarm has cleared. If the alarm condition persists, the device 410 resends a Device_status message with the bits indicating that the alarm is set. Such a Device_status message is referred to herein as an alarm message. In various embodiments the device 410 may optionally send a second Device_status message that includes bits indicating that one or more services provided by the device 410 are unavailable. In the current example of an event-type alarm, an alarm log reflects a sequence of event-type alarms as a single event comprised of a sequence of multiple consecutive events. If the alarm clears and then appears again it may be counted in the alarm log as a separate alarm.

An active alarm count may be incremented, and its multiple instances treated as one until the alarm clears. An active alarm, e.g., is an alarm that has not been cleared, and for which no alarm clearing message has been generated. Under normal working conditions, it is expected that active alarms include only event-type alarms. After the alarm is cleared, a new alarm instance may be logged.

In an example embodiment, an event-type alarm A is generated by a device 410 for a first time. The device 410 generates an active alarm log entry for A. The log may be stored in the RAM 330. Then, when consecutive instances of the same alarm A are repeated without an intervening the alarm-clearing event, an instance count in an active log is incremented accordingly. If another type of alarm, e.g., B is then generated, alarm B is added to the active alarm log as a more recent entry than A. If alarm A is then generated again, the previous log entry for alarm A entry is updated with the latest occurrence time and the occurrence count associated with alarm A is incremented. This update may be repeated any number of times as long as alarm A is not cleared. If alarm A is cleared, the previous entry for alarm A in the log is updated with a time stamp and alarm A is now considered inactive. If alarm A it is a minor alarm, it is removed from the RAM 330. If alarm A is either a moderate or a critical alarm, the log entry is copied to an event log accessible by an installer or OEM. If another instance of alarm A is subsequently generated, the subsequent alarm A is treated as a new instance of alarm A, and a new entry is generated in the active alarm log.

Continuous-type alarms may be treated analogously to the example of event-type alarms, except that an instance count need not be computed. This reflects the nature of the continuous-type alarms, e.g., they are not repeated.

Alarm Transmission

In general, a particular device 410 is configured to only send an alarm after receiving a configuration message from the aSC 230*a* granting access by that device 410 to the subnet controlled by that aSC 230*a*. The configuration message is designated without limitation as aSC_Device_Assignment. In various embodiments, a particular alarm message is sent at most twice. In a first instance, a device 410 sends the alarm message when the alarm condition first occurs. In an optional second instance, the device 410 sends the alarm message again when the alarm state is escalated. Herein and in the claims, escalation of an alarm means that an alarm is resent in order to alert the user, installer or OEM/dealer to the presence of the alarm. In general, it is expected that a particular alarm will be sent only once per single alarm event, and in such cases sent as soon as practicable after the occurrence of the associated alarm condition. In some embodiments, the alarm is repeated only for event-type alarms, in which the same event recurs, if the first alarm did not clear. In some embodiments, an alarm is also repeated when the alarm is escalated. In such a case all active alarm logs may increment the occurrence count for the particular alarm, but may not clear the alarm until an alarm-clearing message is received by the device 410 associated with the alarm. In some embodiments the alarm is be repeated, for a total of two alarm messages sent per alarm event, for both event-type and continuous-type alarms in order to escalate the alarm. This aspect is described further below.

In normal operation, alarms are not generally recurring. This means that if the alarm is caused by a persistent condition (e.g. an open sensor circuit), the alarm is not communicated over the data bus 180 continuously or repeatedly. In some embodiments each alarm is time stamped, with timing adjusted from the current time messages from the aSC 230*a*. Furthermore, in some embodiments no particular alarm is broadcast onto the data bus 180 more often than once every 5 seconds.

In some embodiments, the alarm is sent within 1 second of the first occurrence of the alarm condition, and at most 500 ms after the alarm condition is detected by the associated device 410. Thus, in such embodiments each device 410 is configured to diagnose all alarm conditions within 500 ms of their occurrence. The alarm condition may be communicated, e.g., via the alarm message and the alarm status bits in the Device_status message. Each device 410 may be further configured to internally set the alarm bits in its Device_status message and send this message out within 100 ms of sending the alarm message. Thus, in some embodiments the two alarm messages may appear on the data bus 180 within 100 ms of each other in favorable bus traffic conditions.

Figure 7:
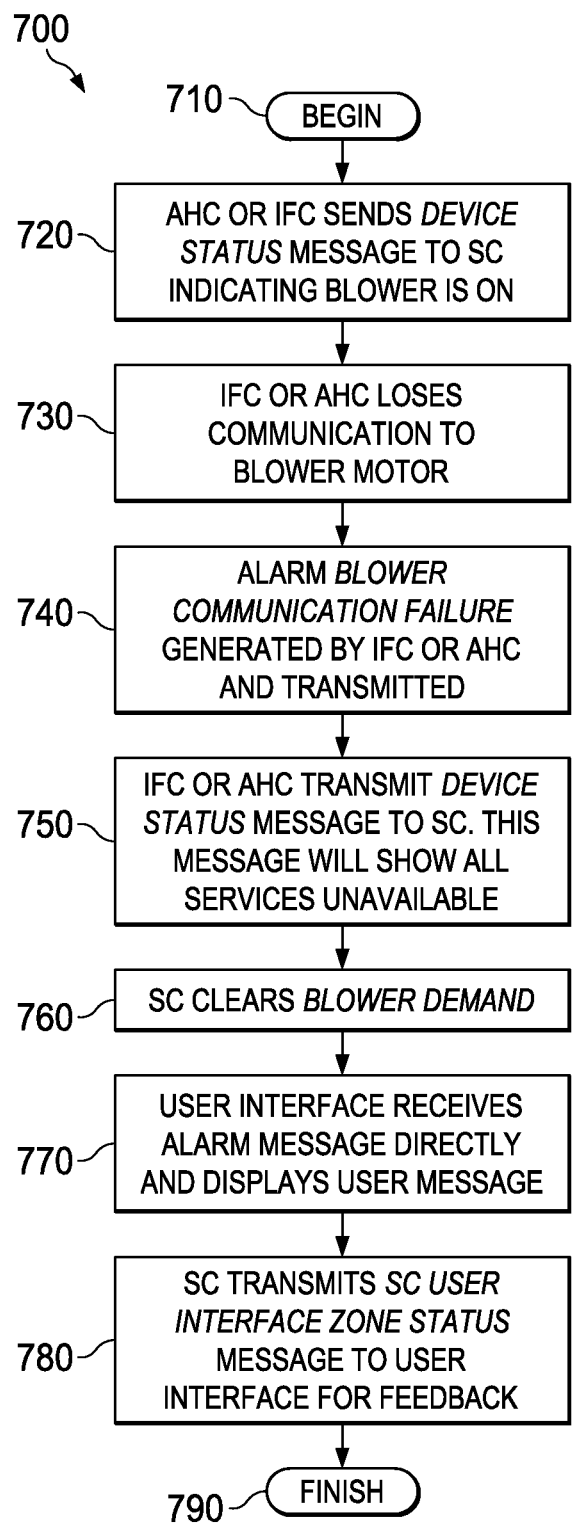
FIG. 7 is a flow diagram of a series of steps in an event sequence that depicts operation of a networked HVAC system in response to blower alarm condition.

Turning to FIG. 7, illustrated is a diagram of a series of states of the system 100, generally denoted 700, that represents the normal operation of the system 100 in response to an alarm condition. This example is representative of various embodiments, and presented without limitation. In the illustrated embodiment, a blower motor is associated with the AHC 210 and the IFC 220.

The state diagram 700 begins with an entry state 710 that may be entered from, e.g., a normal operating condition of the system 100. During a state 720, the AHC 210 or the IFC 220, sends a Device_status status message to the aSC 230*a* indicating that the blower motor is operating. In a state 730, the AHC 210 or the IFC 220 loses communication with the blower motor. This event is the beginning of an alarm condition.

In an event 740, the AHC 210 and/or the IFC 220 broadcast on the data bus 180 an alarm signifying a failure of communication with the blower motor, in this case, e.g., Blower_Communcation_Failure. In an event 750, the AHC 210 or IFC 220 transmits a Device_status message to the aSC 230*a*. The message may include an indication that a service, e.g., heating via the furnace 120, is unavailable.

In a step 760, the aSC 230*a* instructs the blower to cease operation via a message configured to instruct the blower to operate at a selected level, e.g. a Blower_Demand command message. In a step 770 the UI 240 receives an alarm message from the IFC 220 or AHC 210 and displays a message via a display screen appropriate to the failure. In a step 780, the aSC 230a transmits a command message to the UI 240, from which the UI 240 may present appropriate choices to the user for response. In the illustrated embodiment, the message is an SC_UI_Zone_Status message, e.g. The sequence 700 ends with an exit state 790, from which the system 100 may resume operation consistent with its operational status.

In an embodiment, the UI 240 includes a display, such as a touch-screen LCD. The UI 240 may be collocated with the aSC 230a and/or the comfort sensor 260, but need not be. The UI 240 may provide a main point of contact by the operator with the system 100. When the UI 240 receives an alarm from a device 410, the UI 240 may display the alarm information in any form that is interpretable by the user.

In another embodiment, the UI 240 includes a display configured to flash a backlight when presenting an alarm message. The flashing backlight may alert the operator the presence of the alarm display, making prompt attention to the alarm condition more likely. In an embodiment, the backlight is displayed at a greater frequency for a critical alarm than for a moderate alarm. In an embodiment, the backlight is displayed at a greater frequency for a moderate alarm than for a minor alarm. In an embodiment, the backlight is displayed with greater brightness for a critical alarm than for a non-critical alarm. In an embodiment, an audible signal is emitted for one or more of the critical, moderate and minor alarms. In an embodiment, the audible signal is modulated, e.g., the pitch or intensity is temporally varied, with the modulation characteristics depending on the alarm level. For example, the audible signal may be pulsed at a greater frequency for a critical alarm than for a non-critical alarm.

Figure 8:
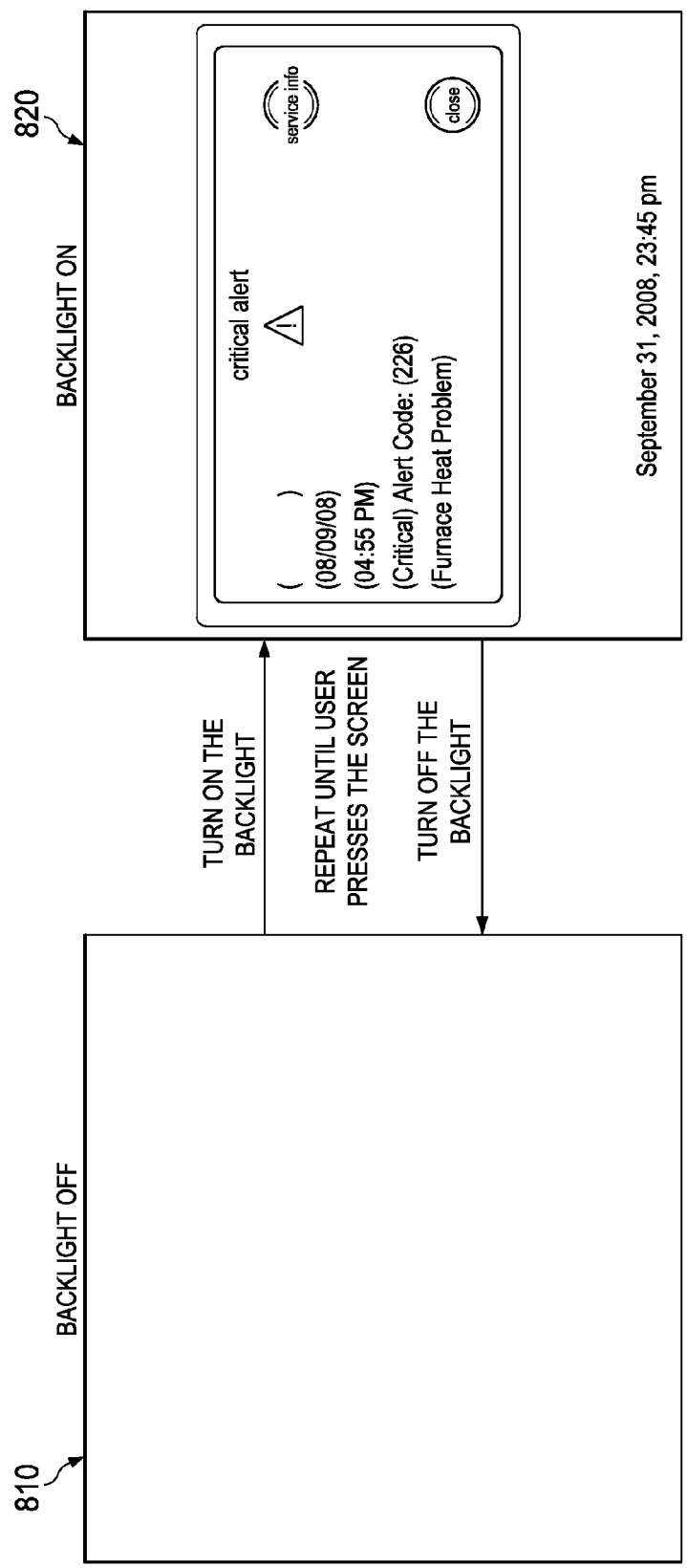
FIG. 8 illustrates an embodiment of an alarm display with flashing backlight.

FIG. 8 illustrates an embodiment of an alarm display with flashing backlight. For an unlit screen 810, the display may appear dark or may be lighted only by ambient light. For a screen 820, for which the backlight is on, the alarm display is visible to the user. The UI 240 may alternate between the unlit screen 810 and lit screen 820 until the user touches the screen. In various embodiments, the screen text may change at any time to display a new alarm message received by the UI 240.

Alarm Storage

In various embodiments, each device 410 stores alarms locally in memory, which may be located on the local controller 290. In one embodiment, the device 410 is configured to store a predetermined number, e.g. 10, of most recently cleared alarms in the NVM 320. In an embodiment, the device 410 is configured to store some or all of its active minor alarms in the RAM 330 and all of its active moderate and critical alarms in the NVM 320.

Figure 9A:
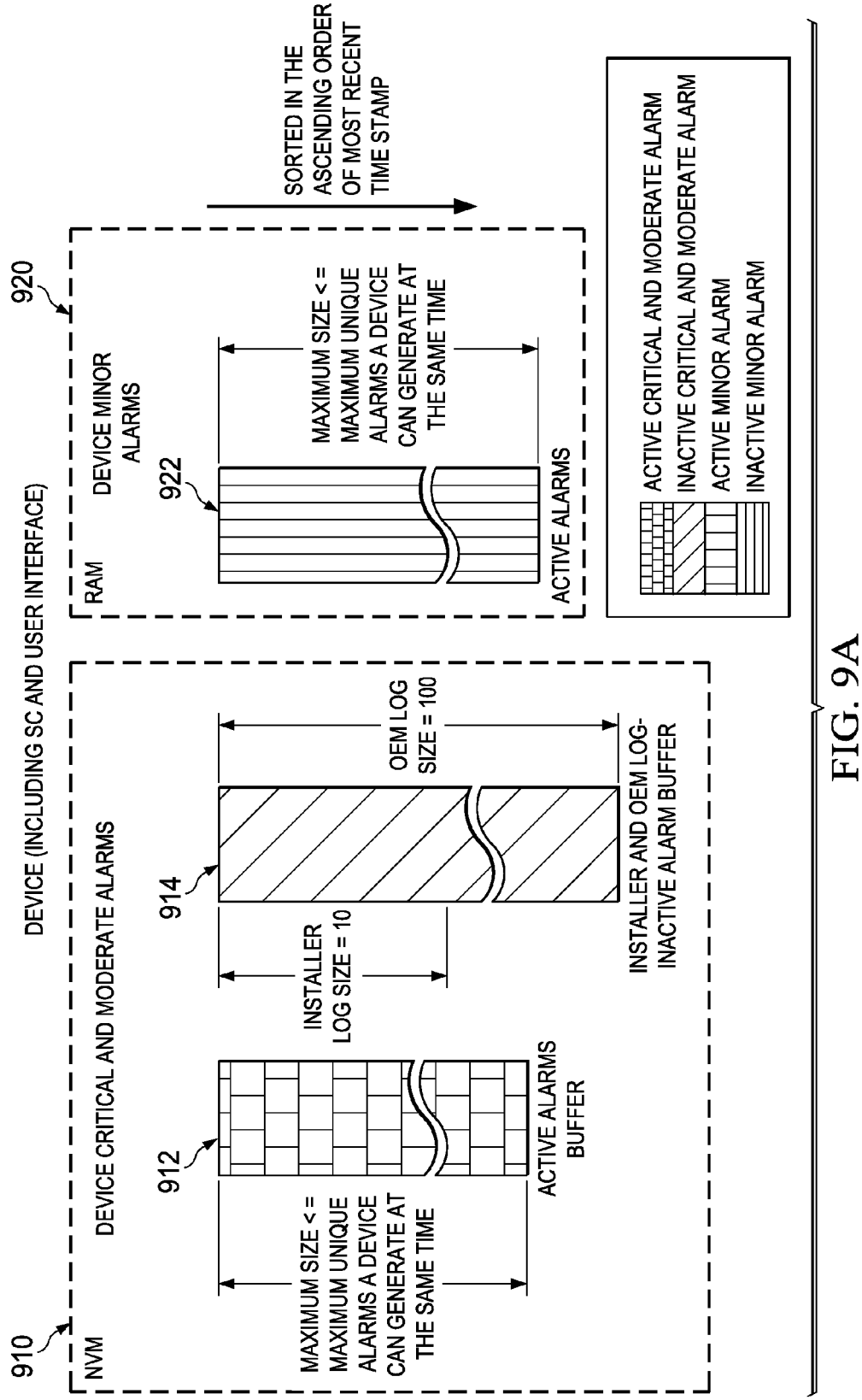
FIGS. 9, 10A and 10B illustrate a physical nonvolatile memory block configured to store alarm data.
Figure 9B:
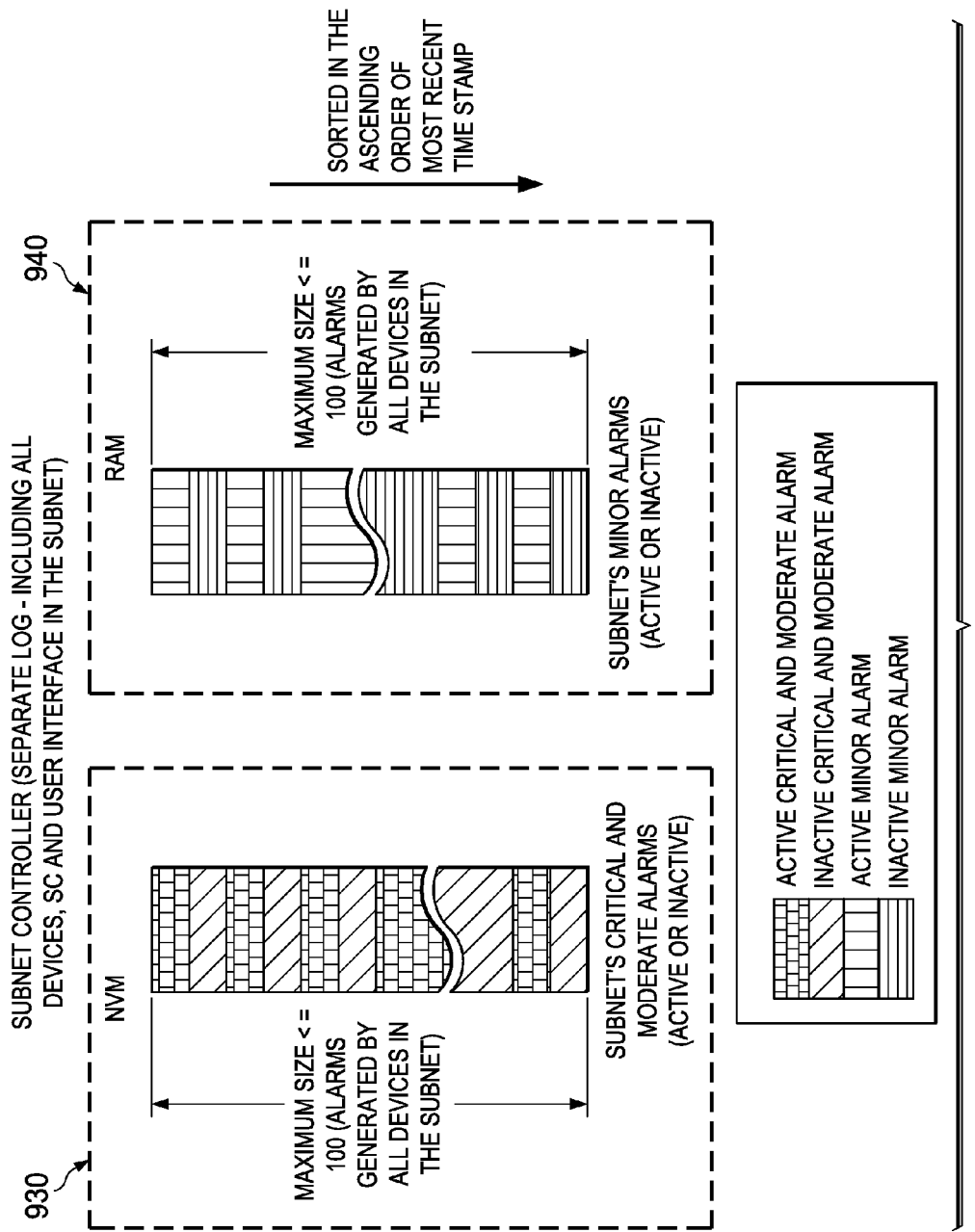
Figure 9C:
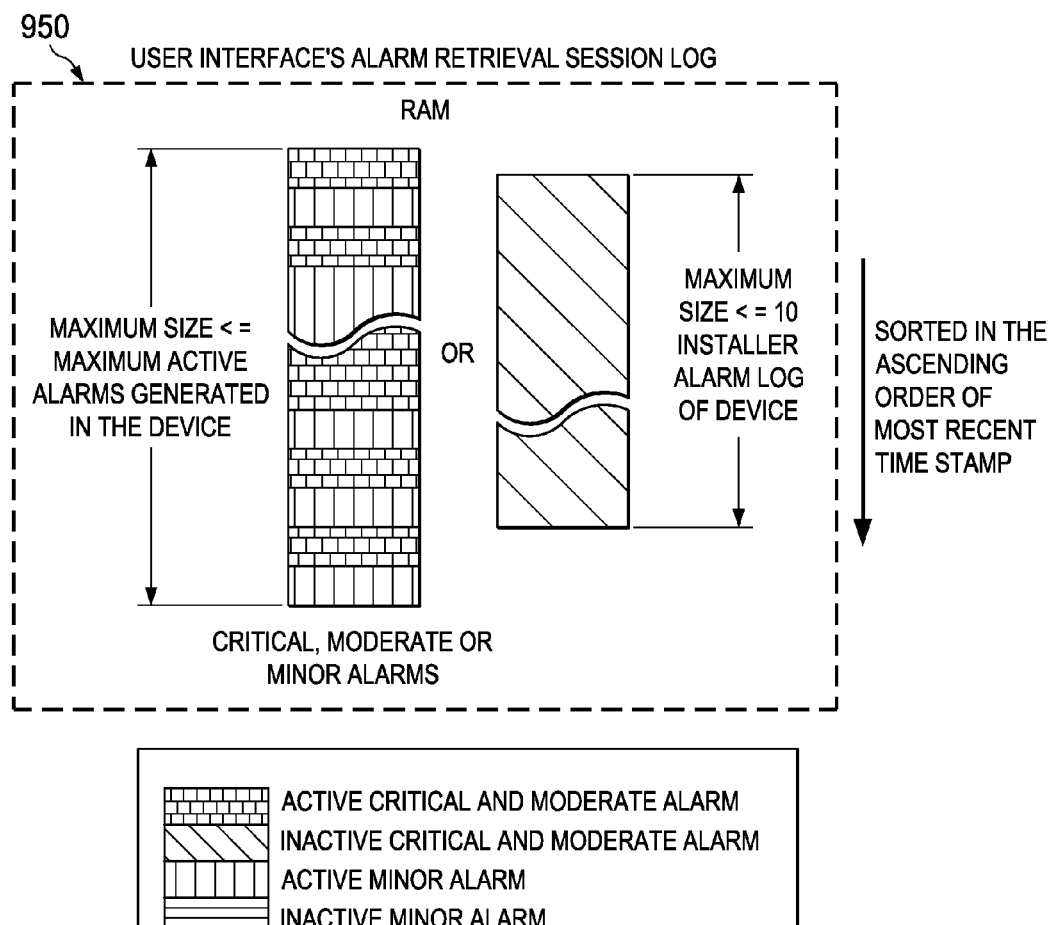

FIG. 9 illustrates a scheme of alarm storage on the local controller 290 according to one embodiment of the disclosure. An NVM block 910 pertains to device-level critical and moderate alarms. A RAM block 920 pertains to device-level minor alarms, and includes a RAM 922. The NVM block 910 includes an active alarms buffer 912 and an inactive alarms buffer 914. The maximum size of the buffer 912 need be no greater than the maximum number of unique alarms the device associated with the buffer 912 can generate simultaneously. The buffer 914 may serve as an alarm log for reference by an installer or OEM. The buffer 914 may be as deep as deemed practical to provide a historical record, e.g., 100 events.

An NVM block 930 pertains to subnet controller (SC)-level active and inactive critical and moderate alarms. The NVM block 930 may store alarms for all devices in the subnet associated with a particular SC 230. In the example illustrated, active alarms are interleaved with inactive alarms, but of course other arrangements are possible depending on the order in which the alarms are generated. A RAM block 940 pertains to SC-stored active or inactive minor alarms. The NVM block 930 and the RAM block 940 may be as deep as desired, illustrated for example as 100 entries.

In the embodiment of FIG. 9, a RAM block 950 pertains to the alarm storage by the UI 240 or the UI/G 250. The RAM block 950 may store critical, moderate and/or minor active and/or inactive alarms. The RAM block 950 may be as deep, e.g., as maximum number of active alarms expected to be generated in all the devices 410 on the data bus 180, or as small as a number of events to be stored as an installer alarm log, here illustrated as 10, e.g. For all the NVM/RAM blocks 910, 920, 930, 940, 950 the alarm events may in various embodiments be stored in order of a time stamp assigned to each alarm event. In an embodiment, the time stamp is the time stamp of the initial occurrence of the alarm.

In some cases a device 410 may generate an alarm prior to reaching a startup state, such as after power-up. In such cases, an associated alarm message may be broadcast on the data bus 180 as soon as the device 410 is correctly assigned to a subnet. In an embodiment, a moderate or a critical alarm may be copied into the NVM 320 of the associated device 410 only after the device 410 determines that the subnet of which the device 410 is a part has completed startup.

In some cases a previously existing alarm, e.g. an alarm stored in the NVM 320 before device reset, is cleared prior to receipt of a first message, designated without limitation as aSC_Current_Time, received by the associated device 410 setting a current time. In such a case, a message clearing the alarm, designated without limitation as aSC_Alarm_Clear, may be sent by the aSC 230a as soon as practicable, or as soon as the device 410 is admitted to its subnet. The device 410 may be admitted to the subnet via receipt of an aSC_Device_Assignment message from the aSC 230a, e.g. The alarm clearing event may be stored in the NVM 320 with the associated clearing time stamp left blank until the first aSC_Current_Time message is received by the device 410, at which time the blank time stamp may be updated with the correct time, and the NVM 320 record updated. When the device 410 comes out of reset, it may be configured to detect that the clearing time stamp of one or more alarms in the alarm log is blank. In such a case, the device 410 may updates each empty time stamp with the first value of current time received via aSC_Current_Time. In some cases an alarm may be generated and cleared before receipt of the first aSC_Current_Time message by the device 410. In such a case, the alarm may be stored in the RAM 330 and then copied into the NVM 320 when the aSC_Current_Time message is received and its time stamps are properly adjusted.

It is generally preferable to store all critical and moderate alarms in the NVM 320 of each device. In some embodiments, the device 410 may be configured to check the state of its alarms upon power-up. In some embodiments, if there are any active alarms still present in the NVM 320, their presence may be indicated in Device_status messages starting with the first status message issued by the device after reset. In other embodiments, the device 410 issues upon power-up a Device_status message without any alarms indicated, even when active alarms are present in the NVM 320. In such cases, the device 410 may be configured to send a Device_status message with alarms indicated after the device 410 verifies that the alarm condition still exists.

Clearing Alarms

In various embodiments, the device 410 is configured to "own" the alarms it generates. In some embodiments only the device 410 that generates a particular alarm may clear that alarm. The device 410 may clear the alarm, e.g., upon receipt of a clearing message, designated without limitation as UI/G_Device_Clear_Alarms, or upon determination by an internal diagnostic routine. In some embodiments, a device 410 is configured to clear an alarm upon command by a service technician, e.g., by depressing a switch. While the aSC 230*a* may store all alarms, it may not have permission to clear an alarm. However, the aSC 230*a* may be configured to monitor alarms and log an event when it determines the occurrence of an alarm clearing message from the device 410 confirming that an error has been cleared.

If an alarm is cleared by device reset, the device 410 may send a clearing message after reset upon entering a COMMISSIONING state immediately after the device 410 broadcasts its first Device_status message. In such a case the clearing time stamp is derived from the first properly received aSC_Current_Time message.

Retrieving Alarms

In one embodiment, each device 410 is required to keep an alarm log in its NVM 320. This alarm log may be organized into three sections: Active Alarm log, Installer Alarm log and OEM Alarm log. The Active Alarm log contains all types of alarms that are currently active. The Installer Alarm log may be smaller than the Installer Alarm log and in various embodiments contains a device-specific number, e.g. 10, of only the most recently cleared alarms. The OEM Alarm log may contain a larger number of the most recently cleared alarms, e.g., 50. Both Installer and OEM logs may be configured as FIFO buffers. In some cases, only Active Alarm and Installer Alarm logs can be cleared. The alarm logs may be used to diagnose each device and are advantageously accessible via messages broadcast via the data bus 180.

An alarm may be retrieved by, e.g., point-to-point communication of the UI 240 with a specific device 410. This process may be an alarm retrieval session initiated by a message, designated without limitation as UI/G_Device_Alarm_Session, from the UI 240 or the UI/G 250 to the device 410. The device 410 may acknowledge the message with a message, designated without limitation as Device_Alarm_Session_Ack. Advantageously, the device 410 may be configured to operate normally during the interrogation by the UI 240 or UI/G 250. In some embodiments, if a new alarm condition is detected by the device 410 during interrogation then the alarm message is broadcast immediately. In some embodiments, the alarm message is buffered and only added to the device alarms log after the currently ongoing interrogation is complete.

Alarms may be retrieved by UI 240 or the UI/G 250 one-by-one by sending an alarm request message designated without limitation as UI/G_Ask_For_Device_Alarm and receiving from the device 410 an alarm reporting message designated without limitation as Device_Alarm_Report. The alarms may be numbered by their order in each respective log, with the most recent alarm being the number one alarm.

The UI 240 or the UI/G 250 may signal the end of an alarm retrieval session with a particular device 410 under interrogation by sending a message, designated without limitation as UI/G_Device_Alarm_Session, to that device 410. The device 410 may acknowledge the UI/G_Device_Alarm_Session message with a message, designated without limitation as Device_Alarm_Session_Ack. In other cases, the device 410 may terminate the session when the device 410 fails to receive an alarm retrieval message, e.g., UI/G_Ask_For_Device_Alarm, within a predetermined period, such as about 5 seconds.

In a situation in which a technician is servicing the system 100, the technician may elect to clear some specific alarms or to reset the entire Active Alarm log or Installer Alarm log on a device 410. In an embodiment, the technician initiates broadcasting a message, designated without limitation as UI/G_Device_Clear_Alarms, over the data bus 180. In some cases, the local controller 290 may be configured to disregard the message if the device 410 is not in an alarm session.

One objective of the alarm interrogation session is to quickly retrieve alarms from the devices 410 and expeditiously close the session. If a new device alarm condition is encountered during the session, the UI 240 or the UI/G 250 may be configured to reload the alarms by means of a new alarm session with the device 410 experiencing the alarm. It may be advantageous to limit operation of the device 410 to conducting an active alarm session with only one UI 240 or UI/G 250 at a time.

Unresponsive Device Alarms

On occasion, a device 410 may be become unresponsive. In some cases, a device 410 may be missing, as when it is removed for service. In such a situation, other devices 410 that communicate with the unresponsive device 410 may respond by generating an appropriate alarm. In some embodiments, the aSC 230*a* is configured to distinguish between an alarm generated to signal an unresponsive device 410 and an alarm signaling a missing device 410.

In the case of an alarm signifying an unresponsive first device 410, an alarm, designated without limitation as Unresponsive_Device2, can be sent by any second device 410 whether the second device 410 is configuring an aspect of the system 100 or verifying a configuration thereof. The Unresponsive_Device2 alarm may be generated when no valid response is received from a device 410, such as when a response is completely lacking, or when an invalid response is received. Examples of invalid responses include receipt of corrupt data, or failure of the device 410 to properly acknowledge the message transaction. A modest number of attempts, e.g. 3-5, may be made to communicate with the unresponsive device 410 before issuing the Unresponsive_Device2 alarm.

The Unresponsive_Device2 alarm may be implemented differently for different devices 410 attached to the data bus 180. In one example embodiment, a first class of devices includes all devices except the UI 240, the UI/G 250 and the SC 230. For devices 410 in this first class, the Notify_User and Notify_Dealer flags of the Unresponsive_Device2 alarm message are always reset. These devices 410 may increment the alarm count as with any event-type alarm. A particular device 410 may clear the alarm when a successful communication with the same device is reestablished twice in a row.

A second class of devices includes the UI 240, UI/G 250 and the SC 230. Each of these devices keeps in its RAM 330 an Unresponsive_Device_Error_Count for each device 410 it communicates with in Subnet Startup, Commissioning, Installer Test, Link Mode and Normal Operation states. The Unresponsive_Device_Error_Count may be an integer number from 0 to 255. This value may be incremented when a new Unresponsive_Device2 alarm is raised, and decremented whenever a successful transmission is completed. In an embodiment, when the Unresponsive_Device_Error_Count exceeds a specific number, e.g. 10, the Unresponsive_Device2 alarm is escalated and is sent out with Notify_User and Notify_Dealer flags set. If the Unresponsive_Device_Error_Count subsequently decreases below 10, these two flags may be cleared. If the Unresponsive_Device_Error_Count subsequently decreases to zero, then the alarm is cleared. The Unresponsive_Device_Error_Count may also be reset by a system reset event.

Next considering the case of a missing device 410, an alarm, designated without limitation as Missing_Device2, may be sent by the aSC 230*a* when a previously configured device 410 is not seen on the subnet. The Missing_Device2 alarm may be a continuous alarm, and may further include setting of the Notify_User and Notify_Dealer flags. In some embodiments, the aSC 230*a* only generates the Missing_Device2 alarm in a Verification mode upon completion of the Subnet Startup state. In some embodiments, the Missing_Device2 includes the Equipment Type of the missing device 410 thereby notifying the operator which device 410 is actually missing. In general, all XXX_Device2 alarms are sent out by one device 410 (device1) to notify the operator that another specific device 410 (device2) is malfunctioning. This is generally in contrast to other type of alarm messages that are owned directly by the device 410 that is the subject of the alarm message, and indicate a problem with the owning device only. The alarm may be cleared after the next successful communication with the Device.

The aSC 230*a* may generate an alarm, designated without limitation as Incomplete_System, when one or more critical devices 410 are missing on the subnet. In one example, the Incomplete_System alarm is triggered when any one of the indoor unit 148, the UI 240 or comfort sensor 260 fails to respond. The aSC 230*a* may be configured to send the Incomplete_System alarm in the Configuration mode, e.g. The alarm may be cleared on reset.

The aSC 230*a* may also be configured to generate an alarm, designated without limitation as Lost_Communication_with_ Device2, when the device 410 in question fails to send a Device_status message within a predetermined period, e.g., three minutes. This alarm represents the state that the device 410 was previously present in the system 100 but is no longer responding. The alarm may be continuous, with Notify_User and Notify_Dealer flags set. The alarm may be cleared after the next successful communication with the previously unresponsive device 410, e.g., receipt of a correct Device_status message from that device 410.

Alarm Escalation

In some embodiments one or more devices 410 may be configured to escalate an alarm under certain conditions.

In some embodiments, only moderate alarms are escalated. Escalation may consist of asserting the moderate alarm again. In some embodiments, the Notify_User and Notify_Dealer flags are set when the moderate alarm is escalated. In some embodiments, the priority level of the alarm is increased from moderate to critical when escalated.

When escalating a continuous-type alarm, the alarm message may be sent out twice for the same alarm type. In one embodiment, in a first instance the alarm is sent with the Notify_User and Notify_Dealer flags reset. In a second instance, after a predetermined period the alarm is sent again with the Notify_User and/or Notify_Dealer flags set. As a result, the second message causes a notification on the user screen (of the UI 240, e.g.) or through the UI/G 250, or both. The predetermined period may depend on the particular device 410 and/or the alarm condition. In some cases, the second alarm message is not considered as another instance of the alarm and is therefore not logged in the alarm log of the sending device 410. However, the system log in the aSC 230*a* may record the second alarm instance when the aSC 230*a* is configured to make no distinction between continuous and event-type alarms.

Similarly, in another embodiment, when an event-type alarm is escalated, in a first instance the first alarm message may have the Notify_User flag reset. In a second instance the alarm is sent again with the Notify_User flag set. The second instance may follow the first instance after a number of retries that may be, e.g., specific to a particular device 410 and/or alarm condition. The second alarm may include an alarm message that is the same or a different message as a message sent by the first alarm.

Summarizing various aspects of the preceding description, from the viewpoint of user notification there are four broad categories of alarms. The alarm types include continuous-type alarms and event-type alarms, both of which can be of escalation-type or are never escalated. In some embodiments, escalation alarms may be escalated. Any of these alarms may optionally be a hidden alarm, e.g., not displayed to a user, e.g., a homeowner. The hidden alarm may be reported to an installer, manufacturer or dealer, however. A Continuous-type escalation alarm is an alarm that is reported to the user after a device and case-specific time has elapsed from the start of the alarm condition. An event-type escalation alarm is an alarm that is reported to the user after a device- and/or case-specific number of alarm events of the same type has occurred. An immediate alarm is an alarm that is reported to the user upon the first occurrence of the alarm event. Note that alarm escalation need not impact the alarm clearing mechanism, as it is expected to be used for user/dealer notification only.

Alarm Behavior on Device Reset

Each device 410 may be independently configured to determine the alarm behavior when the device 410 is reset. The following description refers without limitation to elements of FIG. 9 for reference.

In some embodiments, a device 410 may be configured to reset without automatically sending any alarm clearing message. Devices 410 may further be configured to clear the RAM 922 upon reset, and to initially disregard any alarm entries in the NVM block 910.

Upon power-up, the behavior of the device 410 depends on whether any alarm is present at that time. If no alarm is detected after power-up, the device 410 may be configured to operate normally and periodically send Device_status messages with no alarm and with default status bits, regardless of the presence of any previous alarms stored in the NVM block 910.

In some embodiments when the device 410 detects an alarm condition for the first time since the device 410 was last reset, the device 410 sends an alarm message as previously described. After sending the alarm message the device 410 may check NVM block 910 for the presence of a previously stored alarm. In the event that the NVM block 910 includes an open instance of an alarm of the same type as the current alarm condition, the behavior of the device 410 may then depend on the alarm type. For the case of a continuous-type alarm, the device 410 may take no additional action. For the case of an event-type alarm, the device 410 may increment the alarm count and record the time stamp of the last occurrence of the alarm.

If there is no open instance for the same alarm, the device 410 may open a new alarm log with a count=1 and set a first occurrence timestamp to the current time. The device 410 may then enter an alarm state, including sending of status messages with appropriate alarm and status bits.

In the event that the device 410 detects an alarm clearing condition for any alarm present in the RAM block 920 OR the NVM block 910, the device 410 may than send a message consistent with clearing the alarm, and may then close the instance in the NVM block 910.

Alarm Display

Figure 27:
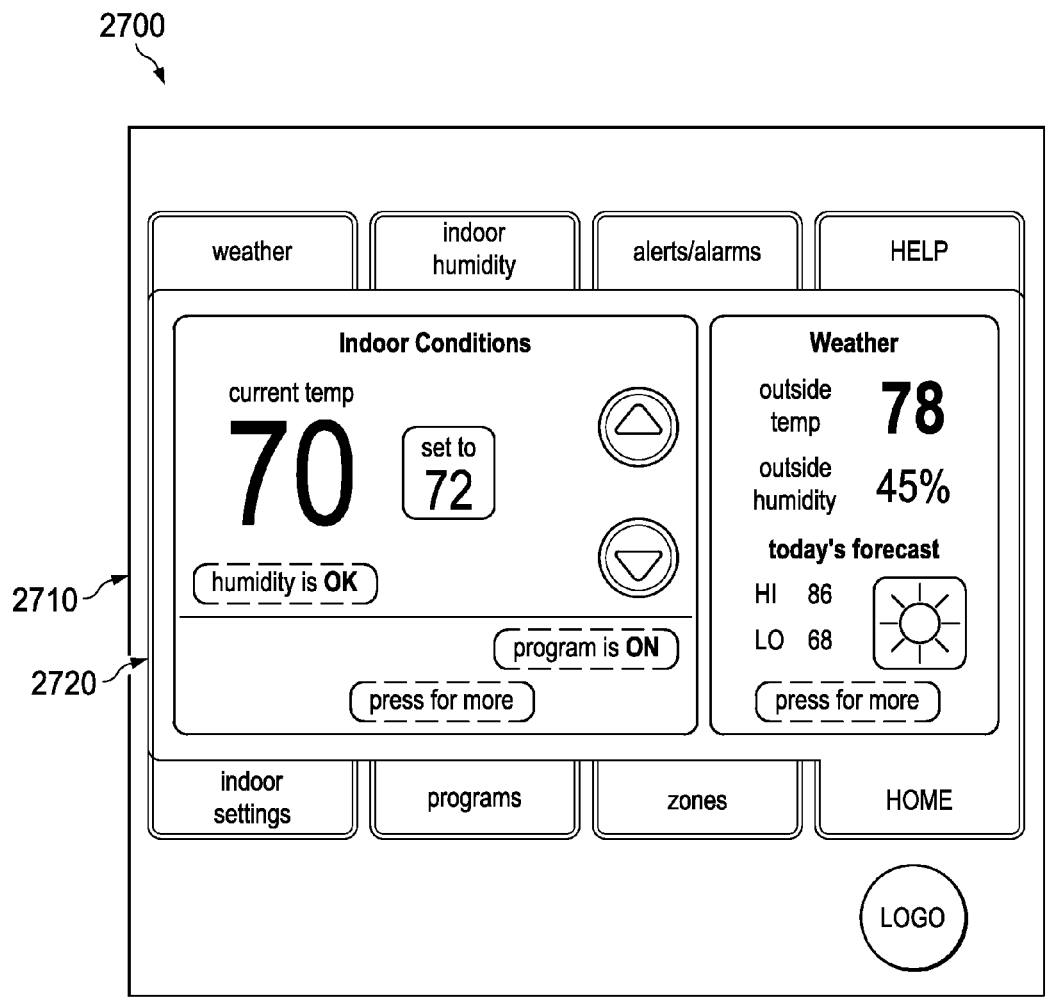
FIGS. 27-30 illustrate aspects of alarm display on a user interface.
Figure 28:
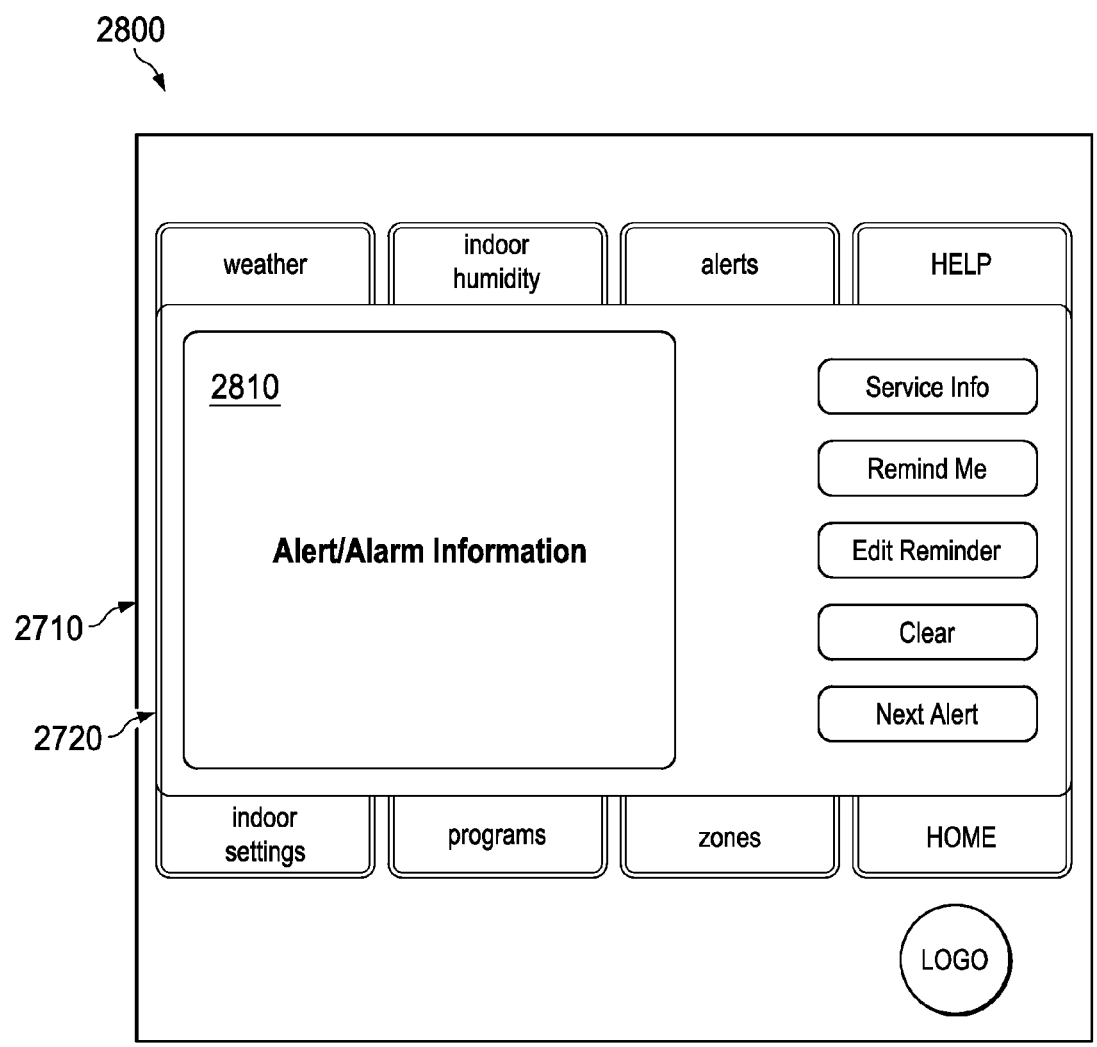

FIG. 27 illustrates an embodiment generally designated 2700 of a display of the disclosure presented on a screen 2710. As illustrated the display 2700 is configured to present current conditions associated with the system 100. The screen 2710 may be, e.g., a touch-sensitive screen of the UI 240. The display 2700 includes an alerts/alarms tab 2720, which, when selected, causes the display 2700 to present to the operator an alert/alarm screen. FIG. 28 illustrates an example embodiment 2800 of a display in which alarm information is presented in an alert/alarm field 2810. In the field 2810 an alarm name and relevant alarm parameters may be displayed.

Figure 29:
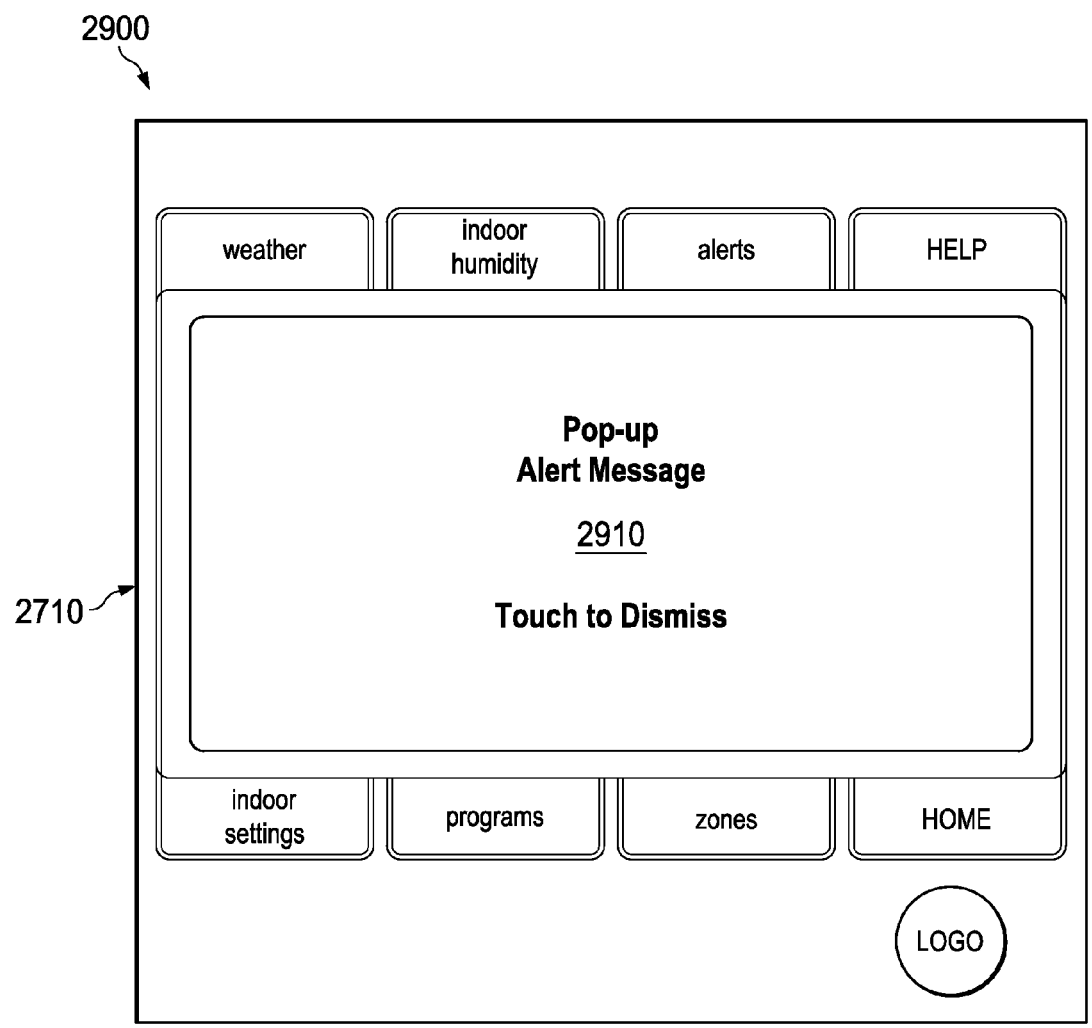

FIG. 29 illustrates an embodiment of a display 2900 in which the screen 2710 includes a "pop-up" message 2910. As used herein, a pop-up message is a transient display of information by the UI 240 that overlays previously displayed information. A pop-up message may be superimposed over a default display format such as the display 2700, and may partially or completely obscure the default format. In some embodiments, the user is forced to respond to the pop-up message 2910, e.g. by touching the screen 2710, to return the screen 2710 to its default display. In some cases, such as for a minor alarm or a service reminder, the pop-up message 2910 may include a selection allowing the user to postpone action. For example, in a pop-up message regarding a scheduled filter change, the UI 240 may display to the user a virtual button labeled "remind me later" or "already performed service." Selection of the former may cause the UI 240 to display the service reminder again at a later time, while selecting the latter may cancel the reminder.

Figure 30:
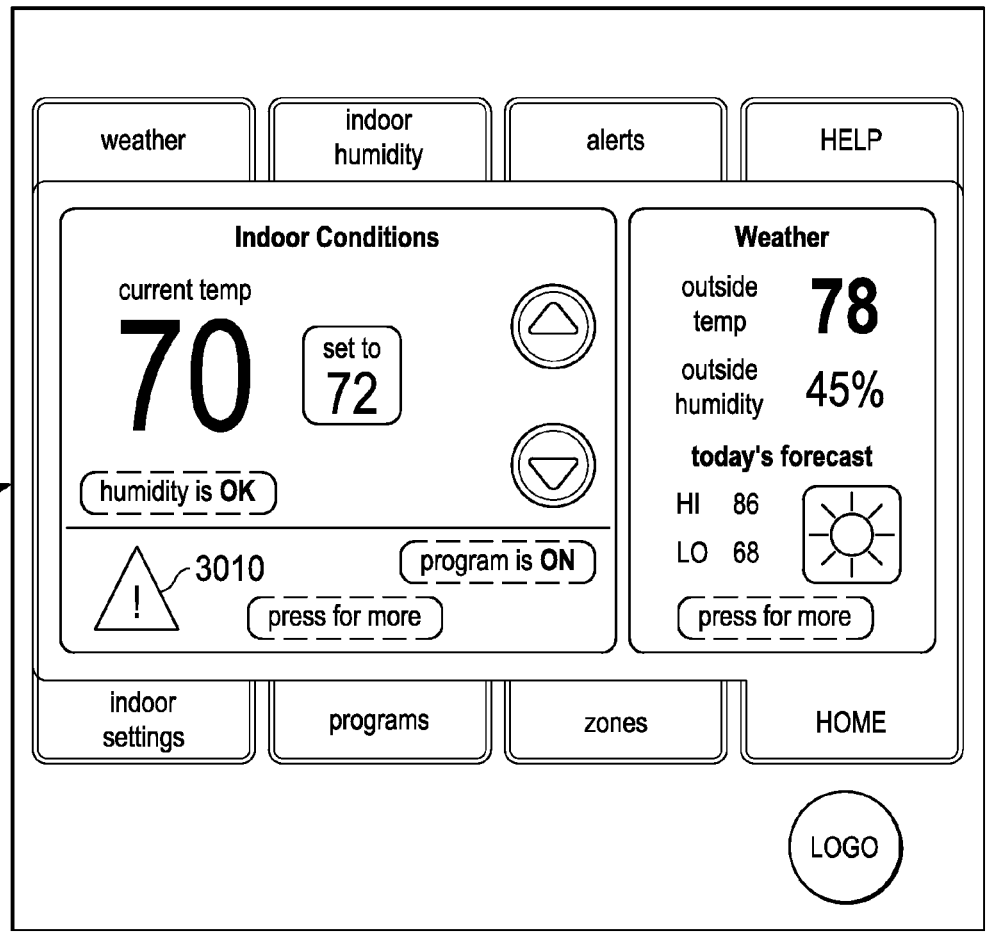

FIG. 30 illustrates an embodiment in which the presence of an alarm is indicated by a linking icon 3010. The linking icon is advantageously designed to visually alert the operator to the existence of a state or event that potentially has a significant effect on the operation of the system 100. The linking icon 3010 is active in the sense that touching the linking icon 3010 on a touch-screen display causes the screen to transition to another display. In one embodiment, the screen transitions to the display 2800 to conveniently display the alarm information associated with the state or event to the operator.

In an embodiment, the linking icon 3010 is color-coded according to the level of the alarm associated with the alarm state or event. Thus, for example, a yellow linking icon 3010 may be associated with a minor alarm, an orange linking icon 3010 may be associated with a moderate alarm, and a red linking icon 3010 may be associated with a critical alarm. In an embodiment, when multiple alarm states simultaneously exist, the color of the linking icon 3010 reflects the level of the most sever alarm.

The linking icon 3010 may be displayed when an alarm status field of a Device_status message sent by one or more of the devices 410 indicates the presence of an alarm state. In some embodiments, the alarm status field is a two-bit field encoded for no alarm, minor alarm, moderate alarm and critical alarm. The aSC 230a, upon receiving a Device_status message from a device 410 that indicates an alarm state may send a message to the UI 240 instructing the UI 240 to display the linking icon 3010. The message may include a color corresponding to the message severity, e.g., minor, moderate or critical.

The device 410 indicating an error state may also provide a service bit indicating a service associated with the error. The service may be, e.g., dehumidification, humidification, cooling, heat pump heat, electric heat, gas heat, and air movement (blower). In an embodiment, each device 410 provides service status bits via a message to the aSC 230a. The status bits may be, e.g., set (1) when the service is available, and reset (0) if the service is unavailable. In an embodiment, each device provides a status bit corresponding to each service available in the system 100. Thus, for example, each device 410 may report a status bit indicating the availability of a heating service, whether or not that device actually is configured to provide a heating service. If the device 410 is not so configured, the device 410 may report a set status bit for that service.

The aSC 230a may perform a logical AND of the status bits corresponding to a particular service, e.g., heating. If any of the devices 410 report a reset status bit for a particular service, the result of the logical AND will be FALSE, and the aSC 230a will determine that the service is not available. In some embodiments, the aSC 230a includes its own service status bits when performing the logical AND.

The aSC 230a, in addition to communicating the alarm severity to the UI 240, may also communicate the service that is unavailable. The UI 240 may use this information when it responds to selection of the linking icon 3010 by the operator.

Thus, in an embodiment, when the operator selects the linking icon 3010, the UI 240 may present the display 2800. In some embodiments, the UI 240 presents the most severe active alarm to the operator. In the event that the operator dismisses the alarm currently displayed, the UI 240 may present to the operator information related to the next most severe alarm. The UI 240 may continue to present successively less severe alarms until all active alarms have been displayed.

In various embodiments, the aSC 230a takes no action in response to determining that an alarm is active other than instructing the UI 240 to provide information to the operator, e.g., via the linking icon 3010. In such embodiments, the control of the system 100 by the aSC 230a is regarded as decoupled from the alarm functions of the system 100. Any change to the control of the system 100 happens, if at all, in response to the indication that a service is unavailable, e.g., from a service bit.

Example Embodiment of NVM Alarm Buffer and Log

Due to life-cycle constraints on the NVM 320, it may be undesirable to repeatedly store alarm data in a same location in the NVM block 910, as doing so may significantly reduce the expected life of the NVM cell in which the data are stored. In the following illustrative embodiment two buffers are implemented in a manner that advantageously avoids concentrated use of a particular NVM storage location, and the resulting risk of early failure of the NVM 320.

Figure 10A:
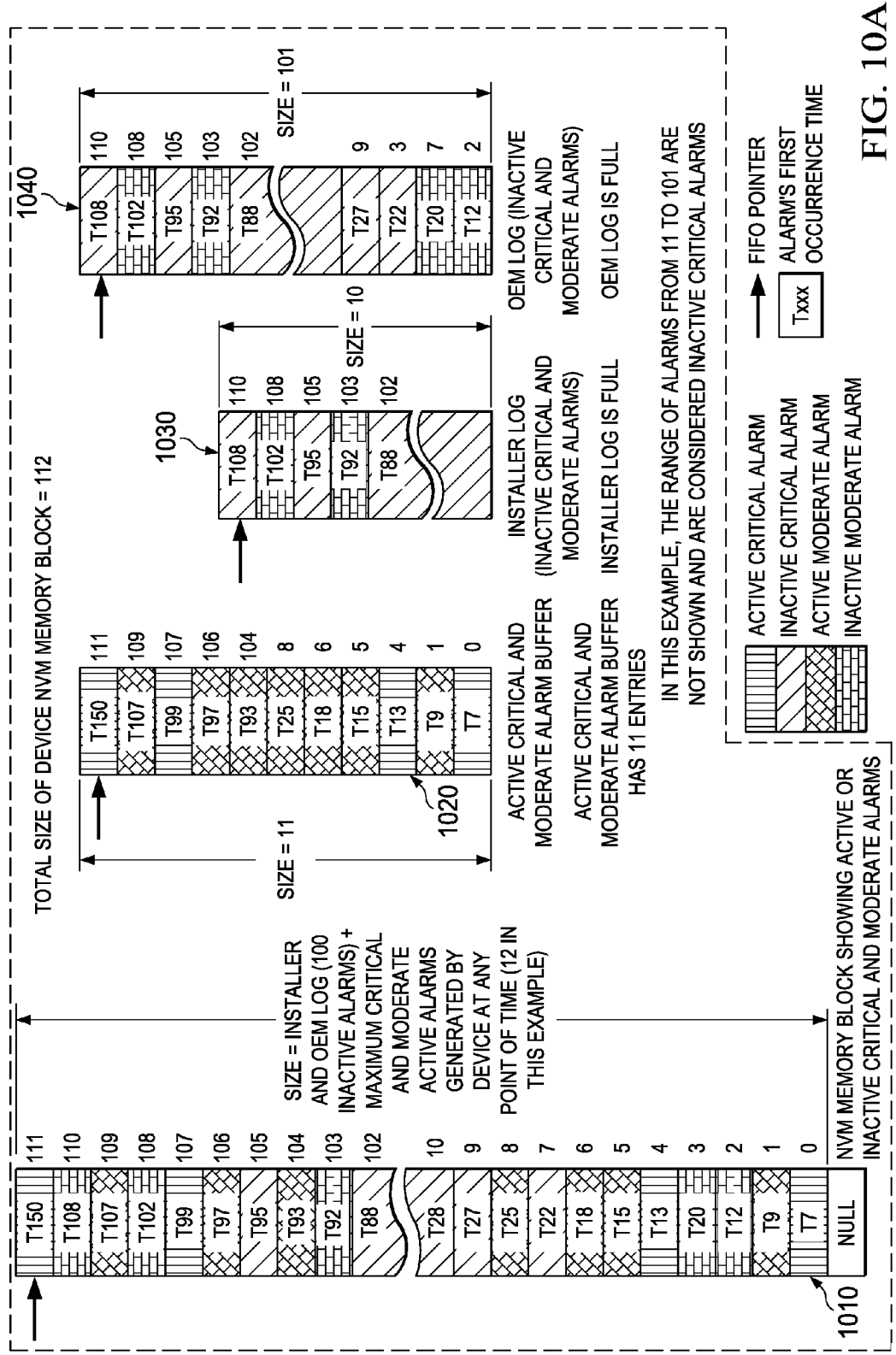

FIG. 10A illustrates an embodiment of alarm storage implemented to advantageously distribute data among the storage locations of the NVM 320. A physical NVM block 1010 is configured to store alarm data. The NVM block 1010 holds all critical and moderate alarms, including active and inactive alarms. Storage locations in the NVM block 1010 are tagged by the time of the first occurrence of the alarm stored therein. Thus, for example, the alarm stored at location 104 occurred at time T93, while the alarm stored at location 103 occurred at time T92 which precedes T93 in time. Data stored in the NVM block 1010 may be logically separated into three logical storage blocks, an Active Critical and Moderate Alarm Buffer 1020, an Installer Log 1030 and an OEM Log 1040. The buffer 1020 and both logs 1030, 1040 use the first occurrence time stamp to order their alarms. The Installer Log 1030 includes the most recent 10 alarms from the OEM Log 1040.

The size of the NVM block 1010 is determined by the maximum number of concurrently possible Moderate and Critical alarms in the device 410, 12 in this example. The length of the OEM Log 1040 is set to 100 as a balance of cost versus storage depth. Thus the total size of the NVM block 1010 is 112 alarm storage locations. At a time T150, a Critical alarm is generated and it becomes active, stored in the block at the address 111. Since there are only 11 active alarms in the NVM block 1010, the length of the buffer 1020 is 11, and the length of the OEM log 1040 is 101.

Figure 10B:
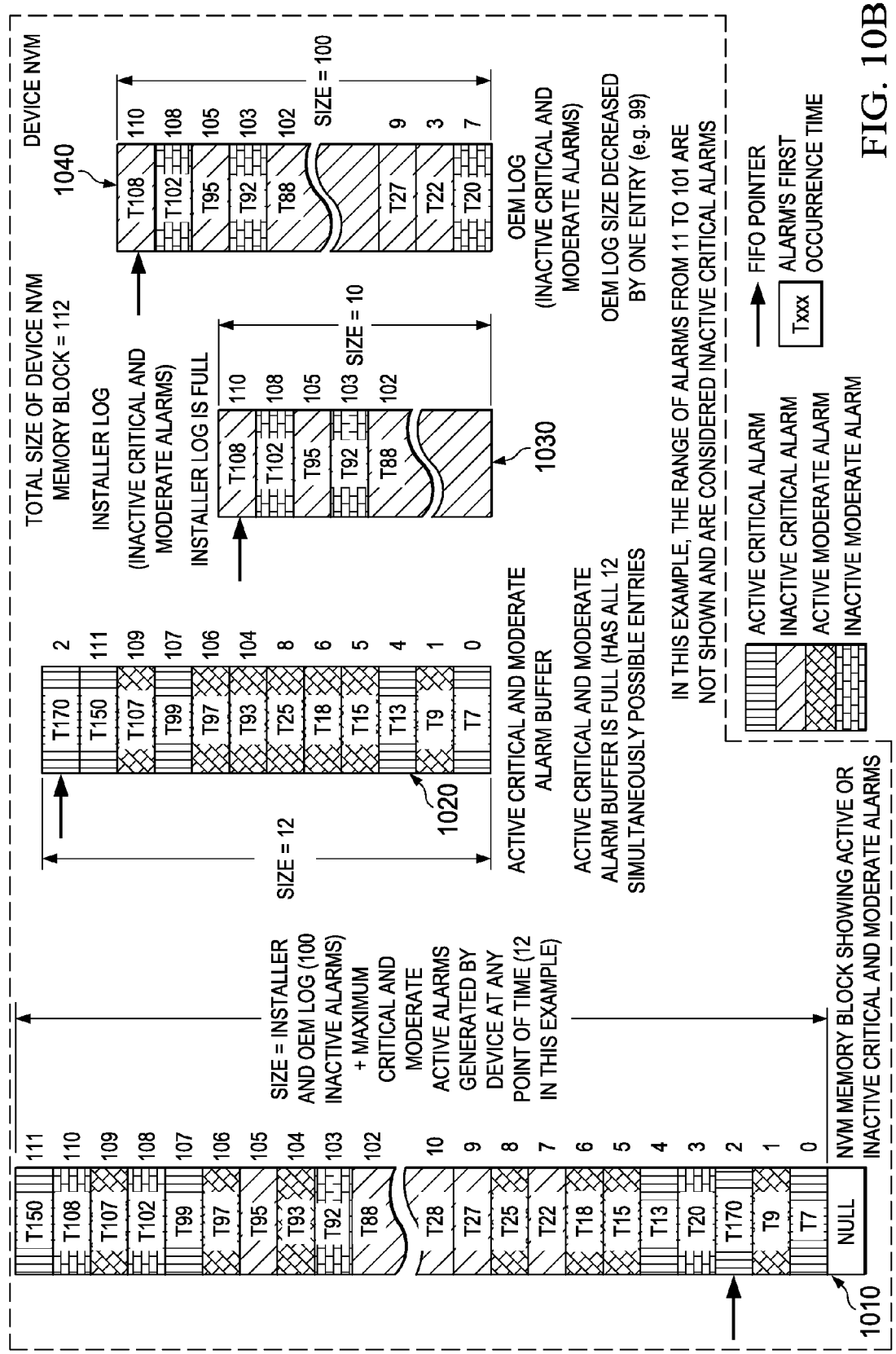

Turning to FIG. 10B, illustrated is the state of the NVM block 1010, the buffer 1020 and the logs 1030, 1040 at a time T170. At T170 another Critical alarm is generated in the illustrated example. The NVM block 1010 is searched for the oldest entry of an inactive alarm. In the illustrated example, the alarm occurring at T12 residing in memory location 2 is oldest. The alarm occurring at T170 is thus placed in that location. The state of the buffer 1020 and the OEM log 1040 reflect the replacement of the alarm at T12 with the alarm at T170. The updated NVM block 1010 now includes 12 active alarms, and the length of the OEM log 1040 is reduced to 100.

By replacing the oldest inactive alarm, write operations to the NVM block 1010 are advantageously balanced over time over all the storage locations therein. Thus, the NVM 320 is less likely to fail due to overuse of any particular storage location, and the operating life of the device with which the NVM block 1010 is associated is extended.

In another illustrative embodiment, the system 100 is configured to allow the operator to establish predetermined selection criteria, e.g. filters, to determine the type of information the operator would like to receive, and how the operator would like to receive that information. For example, the dealer could configure the system 100 to send an alert message if a piece of equipment experiences some intermittent problem that the homeowner would most likely not notice. The system 100 may be configured to refrain from alerting the homeowner. Thus potential nuisance alerts for the homeowner can be avoided, but the dealer may receive information valuable to him or her.

Similarly, the homeowner may configure what types of alerts or alarms are sent to particular locations, and at what times the alerts or alarms are sent. For example, the homeowner could have a "No Heat" alarm sent to a cell phone and/or a dealer so that the problem can be expeditiously addressed. Similarly, a "Change Filter" alarm could be configured to only be sent via an email, since this alarm is less critical than the "No Heat" situation.

The discussion turns now to retention of information in an HVAC data processing and communication network, e.g. the system 100. In some cases, the system 100 configuration may change, intentionally or unintentionally. Examples of changes include failure of a system component, a transient or permanent memory failure, and a commanded or uncommanded change of an operating parameter related to a device 410. The system 100 advantageously provides, in some embodiments, for the storage by at least a first device 410 of historical configuration data pertaining to at least a second different device 410. The stored data from any one of the devices 410 holding a copy of the configuration data may be compared to current configuration data of any other device 410 with suspect configuration data. If a difference is detected between the historical data and the present data, one or more devices 410 may take remedial action appropriate to the difference detected. The data may include, e.g., operating parameters, error codes, alarm codes.

In an embodiment, a first device 410 is configured to persistently store data related to a configuration of a second device 410. The data may be stored in the NVM 320 of the first device 410. The first device 410 may store the data in response to a message sent by the aSC 230*a*. In some embodiments, the first device 410 stores configuration data related to all other devices 410 on the data bus 180. In some embodiments, each device 410 on the data bus 180 stores configuration data related to each other device 410.

In an embodiment, the aSC 230*a* is configured to compare the present configuration data of one or more of the devices 410 to the historical data for the same one or more devices 410. In another embodiment, a local controller 290 of a device 410 other than the aSC 230*a* performs the comparison. The comparison may include sending appropriately configured messages from the aSC 230*a* to one or more devices 410 being interrogated. The one or more interrogated devices may retrieve the requested information from the NVM 320 and return the data to the aSC 230*a* via one or more appropriately configured messages.

The aSC 230*a*, or a requesting local controller 290, may compare the historical data to the present data in any suitable manner, including, e.g., comparing a computed CRC or similar value, by performing a bit-wise comparison, or performing an exclusive OR of the data sets. If a difference between the data sets is determined, then the aSC 230*a* may send one or more messages to one or more other devices 410 in the network 200 to inform the operator, installer, etc. In some embodiments, the aSC 230*a* will initiate a routine to restore corrupt or missing values to the proper state based on the stored historical data.

The one or more messages sent by the aSC 230*a* may include, e.g., a message commanding the UI 240 to display an alert message on a display thereof. In some embodiments, the one or messages includes a message commanding the UI/G 250 transmit alarm information associated with the alarm to an alert device. An alert device may be, without limitations, a cellular phone, a pager, a personal digital assistant (PDA), a television display, a personal computer, a computing platform running an email program. Appropriate interfacing hardware may be located locally, such as an image generating and coupling device for television display, or remotely, such as an internet server that routes an email message from the UI/G 250 to an email server or a mobile device messaging system (e.g., multimedia messaging service, a.k.a. MMS).

The homeowner, dealer or service provider may customize the system 100 to provide a selected subset of available alert or alarm messages. For example, the UI 240 or UI/G 250 may be configured to send a message to the dealer but not the homeowner when the condition resulting in the message would not normally be noticed by the homeowner, but would be relevant to maintenance of the system 100. In an embodiment the UI 240 is configured to report to the homeowner only moderate and critical alarms, while the UI/G 250 is configured to report all alarms to a remote entity (e.g., an installer or manufacturer). In an embodiment, the UI/G 250 is configured to send an appropriately configured alert message, e.g. email, to a server, thereby communicating a critical alarm to a recipient, e.g., the homeowner, installer or manufacturer. The email may be addressed, e.g., to a cellular telephone gateway that converts the alert message to a multimedia messaging service (MMS) message addressed to the homeowner's cellular telephone. Alternatively or in combination, the alert message may be addressed to an email account monitored by the installer.

In an embodiment, the UI 240 or the UI/G 250 is configured to accept input commands from the operator to enter preselected filter criteria for alert messages. Filter criteria may be programmed into the UI 240 via an appropriately configured input screen, e.g. a touch-screen, and to the UI/G 250 via an input screen of the UI 240 or from a remote host such as a desktop computer via the internet, e.g. Some filter criteria may instruct the UI 240 to display only critical alarms or only moderate and critical alarms, thereby reducing nuisance alarms to the user. Other filter criteria may instruct the UI/G 250 to route alarms of moderate severity to the installer but not the manufacturer, but to route alarms of critical severity to the installer and the manufacturer. Similarly, critical alarms may be directed by the UI/G 250 to a cell phone or pager, while moderate or minor alarms may be routed to email. In another embodiment, the UI/G 240 may be configured to send alerts to the installer or the manufacturer based on a characteristic of the device 410 sending the message. Such characteristics may include, e.g., the age of the device 410, the model number, the date or manufacture, or the class of the device (furnace or heat pump, e.g.).

The device 410 may also be configured to store tracking data. Tracking data may include manufacturing data such as an equipment and/or control serial number, equipment and/or control part number, time, date, or location of manufacture, vendor ID, country of origin, and date and location of installation. Some of such data may be installed by a manufacturer at a manufacturing site, while other of the data may be installed at installation site by an installer. The data may be stored, e.g., in the NVM 320.

In some embodiments, the aSC 230a is configured to command, via one or more command messages, the device 410 to provide the tracking data, via one or more reply messages. The aSC 230a may provide the tracking data to an interface device for distribution to interested parties, or may command another device 410 to read the reply messages and distribute the data. The data may be displayed locally by the UI 240, e.g., or transmitted via the UI/G 250 to a remote user. For example, a manufacturer may receive the tracking data and store it for future reference for repair or upgrade purposes, for performance analysis of installed systems, or for financial analysis.

In some embodiments, the tracking data are provided by the system 100 to a data collection device coupled to the system 100 for the purpose of retrieving the data. The data collection device may store the data for later downloading, may transmit the data wirelessly, e.g., via a cellular network, or over an optical or wired network such as the internet. The data collection device may be provided, e.g., by an installer and coupled to the system 100 wirelessly or via a suitable port provided, e.g., by the UI/G 250.

In various embodiments the tracking data are provided to a remote server, e.g. not collocated with the system 100. The remote server may include a service provider or manufacturer computer configured to communicate with the system 100 via the UI/G 250, to receive the tracking data, and to store the tracking data in any suitable format, without limitation a database. The database may be associated with the system 100 by any suitable datum, e.g., a street address, a Media Access Control (MAC) address, customer number or telephone number. The service provider or manufacturer may use the tracking data at a later date to provide service to the system 100, such as responding to a warranty claim, providing service updates, remotely reconfiguring parameter values, and the like.

Figure 12:
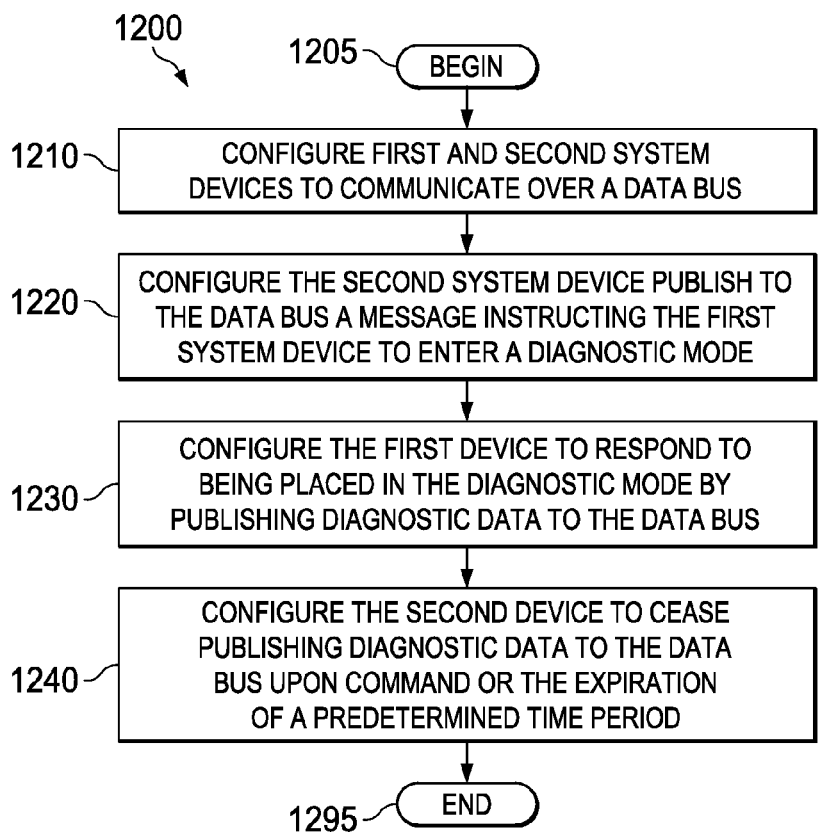

Turning now to FIG. 12, illustrated is a method generally designated 1200 of operating a HVAC data processing and communication network, e.g. the system 100. A method of manufacturing the HVAC data processing and communication network may include configuring various components of the system 100 to implement the method 1200. The method 1200 begins with a state 1205, which may be entered from any suitable operating state of the system 100. In a step 1210, first and second system devices 410 are configured to communicate over a data bus, such as the data bus 180. The first and second system devices may be, e.g., the IFC 220 and the UI 240, respectively. In a step 1220 the second system device 410 is further configured to publish a message to the data bus 180 commanding the first system device 410 to enter a diagnostic mode. In a step 1230 the second device 410 is configured to respond to being placed in the diagnostic mode by publishing diagnostic data to the data bus 180. In an optional step 1240 the second device 410 is configured to cease publishing diagnostic data to the data bus 180. The second device 410 may cease publishing after timeout of a predetermined period, or after receiving a message from the first device 410 instructing it to do so. The method 1200 ends with a state 1295 from which operation of a calling routine may resume.

Figure 13:
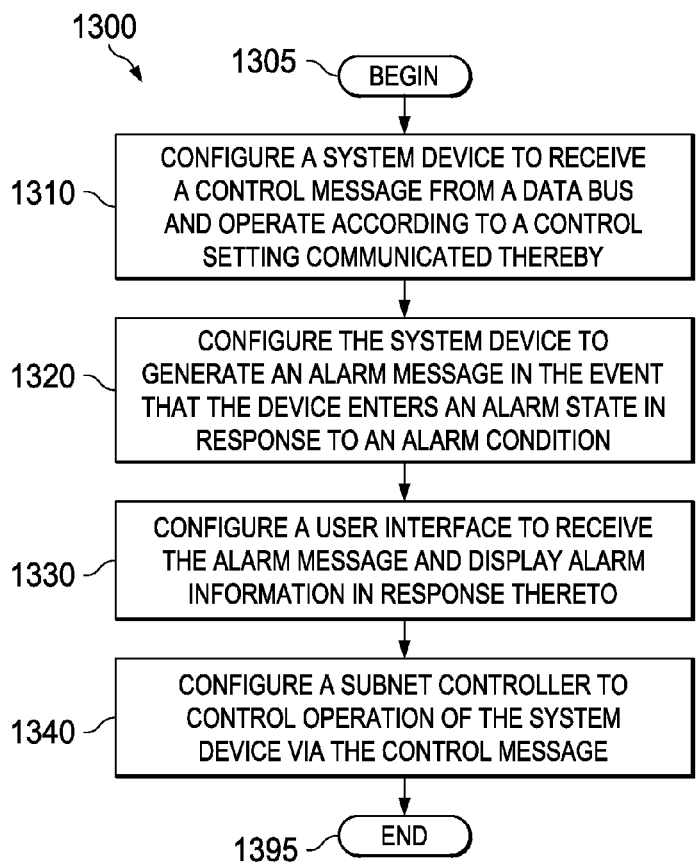

FIG. 13 illustrates a method, generally designated 1300, of operating a HVAC data processing and communication network, e.g. the system 100. A method of manufacturing the HVAC data processing and communication network may include configuring various components of the system 100 to implement the method 1300. The method 1300 begins with a state 1305, which may be entered from any suitable operating state of the system 100. In a step 1310, a system device 410 is configured to receive a control message from the data bus 180 and operate according to a control setting communicated by the control message. The system device 410 may be, e.g., the IFC 220. In a step 1320, the system device 410 is configured to generate an alarm message in the event that the system device 410 enters an alarm state in response to an alarm condition. In a step 1330, the UI 240 or UI/G 250 is configured to receive the alarm message and display alarm information in response to receiving the alarm message. In step 1340, the aSC 230a is configured to control operation of the system device 410 via the control message. The control is decoupled from the alarm message, as previously described. The method 1300 ends with a state 1395 from which operation of a calling routine may resume.

Figure 14:
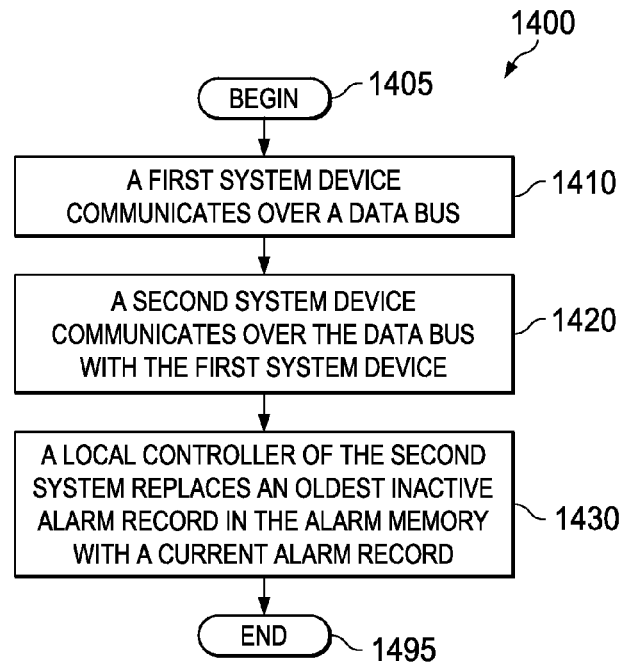

FIG. 14 illustrates a method, generally designated 1400, of operating a HVAC data processing and communication network, e.g. the system 100. A method of manufacturing the HVAC data processing and communication network may include configuring various components of the system 100 to implement the method 1400. The method 1400 begins with a state 1405, which may be entered from any suitable operating state of the system 100. In step 1410, a first system device communicates over a data bus. In a nonlimiting example, the first system device is the aSC 230a, the UI 240, or the UI/G 250, and the data bus is the data bus 180. In a step 1420, a second system device communicates over the data bus with the first system device. The second system device may be, e.g., the outdoor unit 144. The second device includes a local controller, which in turn includes an alarm memory, e.g., the NVM 320. In a step 1430, the local controller replaces an oldest inactive alarm record in the alarm memory with a current alarm record. The method 1400 ends with a state 1495 from which operation of a calling routine may resume.

Figure 15:
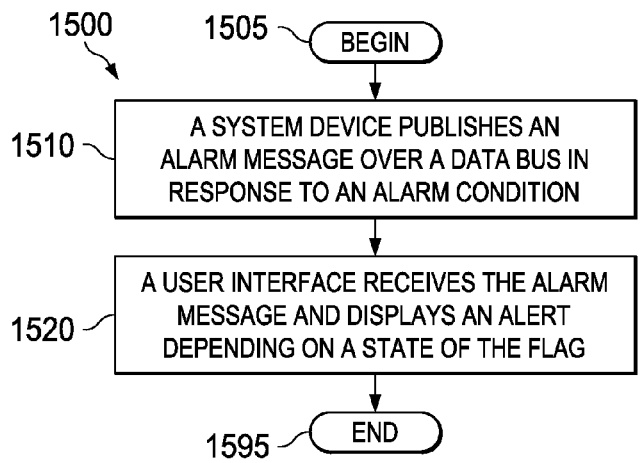

FIG. 15 illustrates a method, generally designated 1500, of operating a HVAC data processing and communication network, e.g. the system 100. A method of manufacturing the HVAC data processing and communication network may include configuring various components of the system 100 to implement the method 1500. The method 1500 begins with a state 1505, which may be entered from any suitable operating state of the system 100. In a step 1510, the system device 410 publishes an alarm message over the data bus 180 in response to an alarm condition. The device 410 may be, e.g., the outdoor unit 144. The alarm message includes a flag indicating a level of the alarm. The level may be, e.g., critical, moderate or minor. In a step 1520, a user interface, e.g. the UI 240, receives the alarm message and displays an alert, e.g., the linking icon 3010, depending on a state of the flag. For example, the user interface may display a critical alarm, but not a minor alarm, or may display the alert using colors coded by alarm severity. The method 1500 ends with a state 1595 from which operation of a calling routine may resume.

Figure 16:
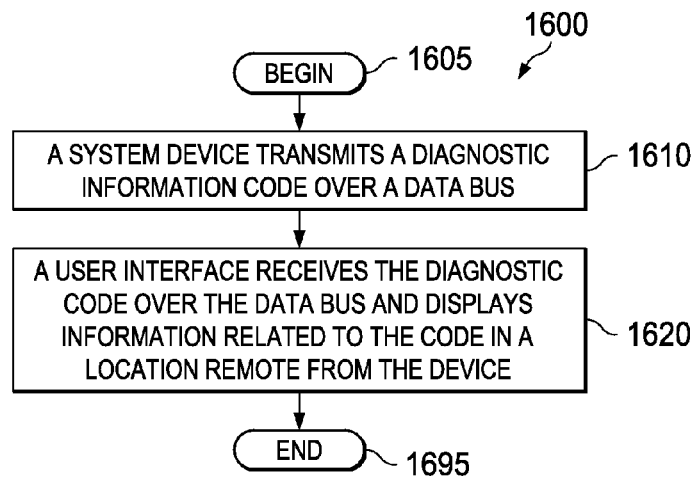

FIG. 16 illustrates a method, generally designated 1600, of operating a HVAC data processing and communication network, e.g. the system 100. A method of manufacturing the HVAC data processing and communication network may include configuring various components of the system 100 to implement the method 1600. The method 1600 begins with a state 1605, which may be entered from any suitable operating state of the system 100. In a step 1610, a system device transmits a diagnostic information code over a data bus. The device may be, e.g., the outdoor unit 144. In a step 1620, a user interface, e.g. the UI 240, receives the diagnostic code over the data bus and displays information related to the code. The information is displayed in a located remote from the system device, such as a wall-mounted enclosure. The method 1600 ends with a state 1695 from which operation of a calling routine may resume.

Figure 17:
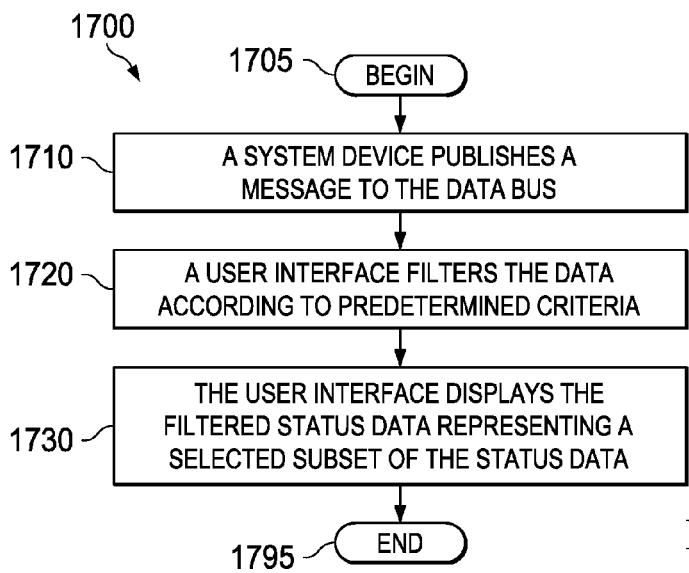

FIG. 17 illustrates a method, generally designated 1700, of operating a HVAC data processing and communication network, e.g. the system 100. A method of manufacturing the HVAC data processing and communication network may include configuring various components of the system 100 to implement the method 1700. The method 1700 begins with a state 1705, which may be entered from any suitable operating state of the system 100. In a state 1710, a system device publishes a message to a data bus. The message includes data describing an operational status of the device. In a step 1720 a user interface, e.g., the UI 240, filters the data according to predetermined criteria. In a step 1730, the user interface displays the filtered status data representing a selected subset of the status data. The interface is configurable to filter the data according to predetermined criteria and to display only a selected subset of the data meeting the criteria. The method 1700 ends with a state 1795 from which operation of a calling routine may resume.

Figure 18:
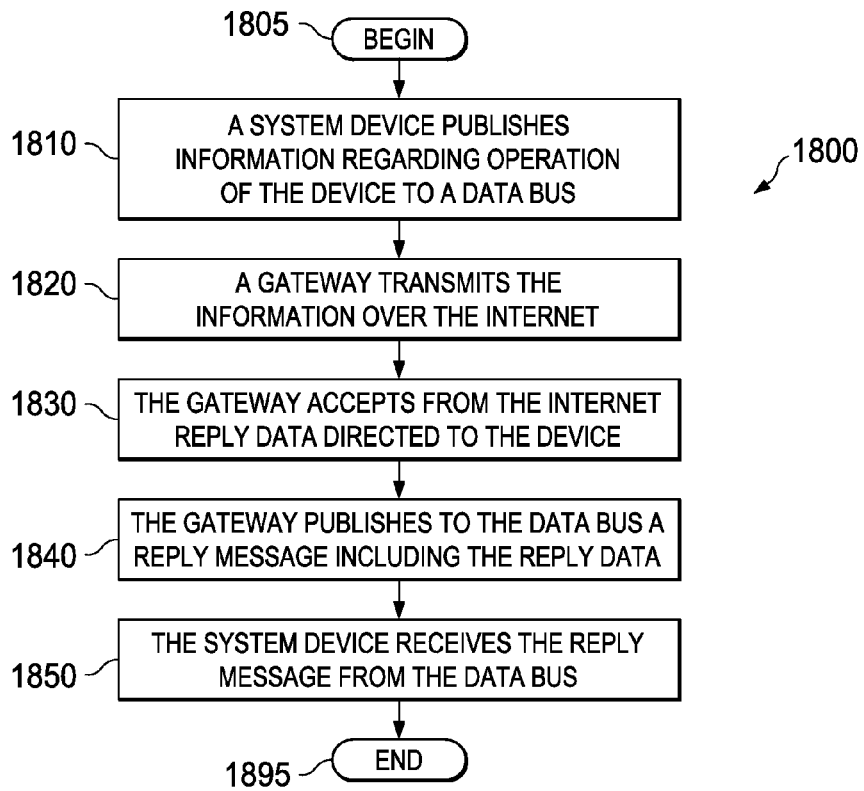

FIG. 18 illustrates a method, generally designated 1800, of operating a HVAC data processing and communication network, e.g. the system 100. A method of manufacturing the HVAC data processing and communication network may include configuring various components of the system 100 to implement the method 1800. The method 1800 begins with a state 1805, which may be entered from any suitable operating state of the system 100. In a step 1810 a system device, e.g., the device 410, publishes information regarding operation of the device to a data bus, e.g., the data bus 180. In a step 1820 a gateway transmits the information over the internet. In some embodiments, the information is transmitted to an installer or dealer site. In a step 1830, the gateway accepts from the internet a reply data directed to the device. The replay data may include, e.g., parameter data related to a configuration of the system 100. In a step 1840, the gateway publishes to the data bus a reply message that includes the reply data. In a step 1850 the system device receives the reply message from the data bus. The method 1800 ends with a state 1895 from which operation of a calling routine may resume.

Figure 19:
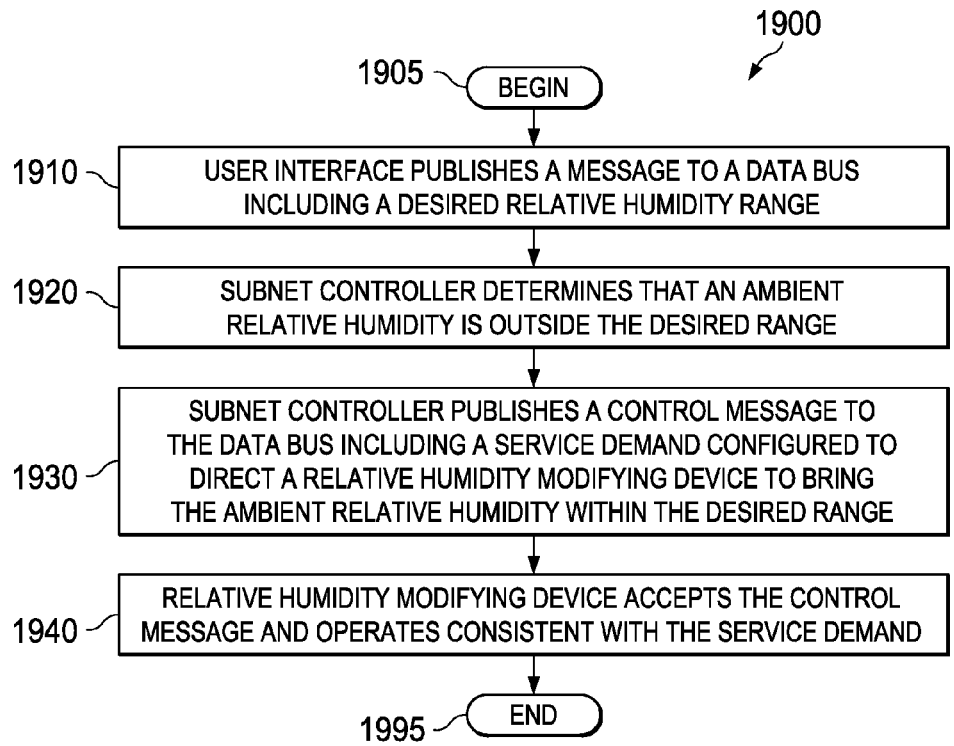

FIG. 19 illustrates a method, generally designated 1900, of operating an HVAC data processing and communication network, e.g. the system 100. A method of manufacturing the HVAC data processing and communication network may include configuring various components of the system 100 to implement the method 1900. The method 1900 begins with a state 1905, which may be entered from any suitable operating state of the system 100. In a step 1910, a user interface, e.g., the UI 240, publishes a message to a data bus including a desired relative humidity range. In a step 1920, a subnet controller, e.g., the aSC 230a, determines that an ambient relative humidity is outside the desired range. In a step 1930, the subnet controller publishes a control message to the data bus including a service demand configured to direct a relative humidity modifying device to bring the ambient relative humidity within the desired range. In a step 1940, the relative humidity modifying device accepts the control message and operates consistent with the service demand. In contrast to conventional HVAC systems, it is unnecessary to operate a blower to implement humidification or dehumidification. This aspect provides various advantages, including, e.g., localized humidity control and increase efficiency relative to conventional systems. The method 1900 ends with a state 1995 from which operation of a calling routine may resume.

Figure 20:
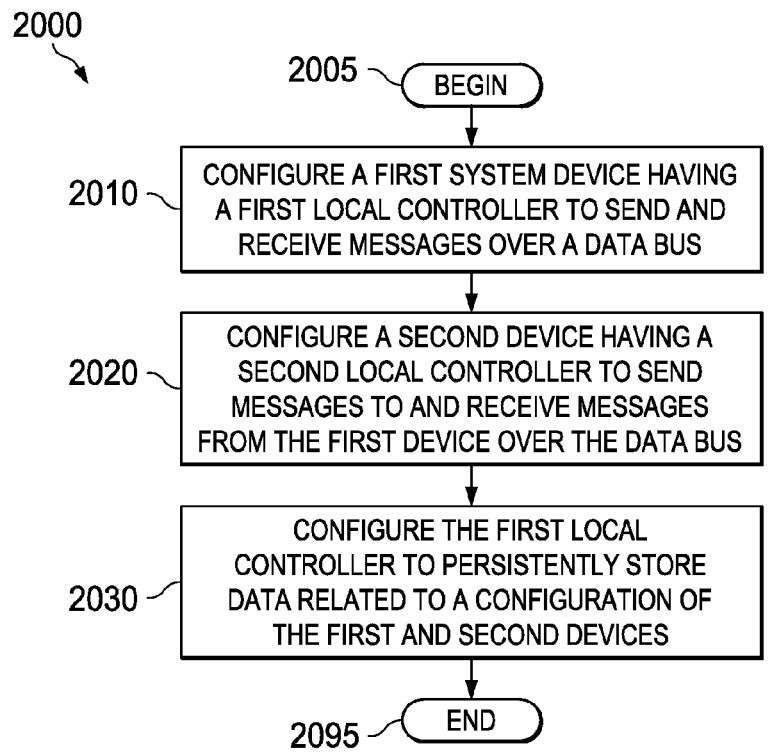

FIG. 20 illustrates a method, generally designated 2000, of operating a HVAC data processing and communication network, e.g. the system 100. A method of manufacturing the HVAC data processing and communication network may include configuring various components of the system 100 to implement the method 2000. The method 2000 begins with a state 2005, which may be entered from any suitable operating state of the system 100. In a step 2010, a first system device having a first local controller is configured to send and receive messages over a data bus. In a step 2020, a second device having a second local controller is configured to send messages to and receive messages from the first device over the data bus. In a step 2030 the first local controller is configured to persistently store data related to a configuration of the first and second devices. The method 2000 ends with a state 2095 from which operation of a calling routine may resume.

Figure 21:
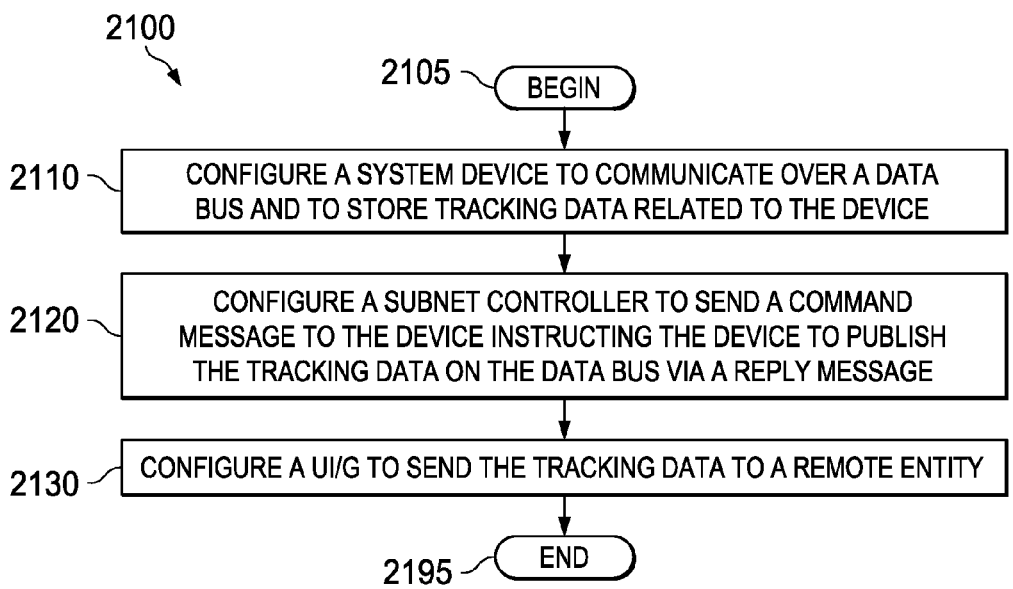

FIG. 21 illustrates a method, generally designated 2100, of operating a HVAC data processing and communication network, e.g. the system 100. A method of manufacturing the HVAC data processing and communication network may include configuring various components of the system 100 to implement the method 2100. The method 2100 begins with a state 2105, which may be entered from any suitable operating state of the system 100. In a step 2110, a system device is configured to communicate over a data bus, e.g., the data bus 180, and further is configured to store tracking data. In a step 2120, a subnet controller is configured to send a command message to the device via the data bus. The message is configured to instruct the device to publish the tracking data on the data bus via a reply message. In an optional step 2130, the system 100 conveys, via the UI/G 250, e.g., the tracking data to a remote entity, such as a manufacturer. The remote entity may use the tracking data for various purposes related to the operation or maintenance of the system 100, or other business purposes. For example, an installer may store the tracking data for future reference for repair or upgrade purposes, warranty administration or recall administration, performance analysis of installed systems, or for financial analysis. The method 2100 ends with a state 2195 from which operation of a calling routine may resume.

Figure 22:
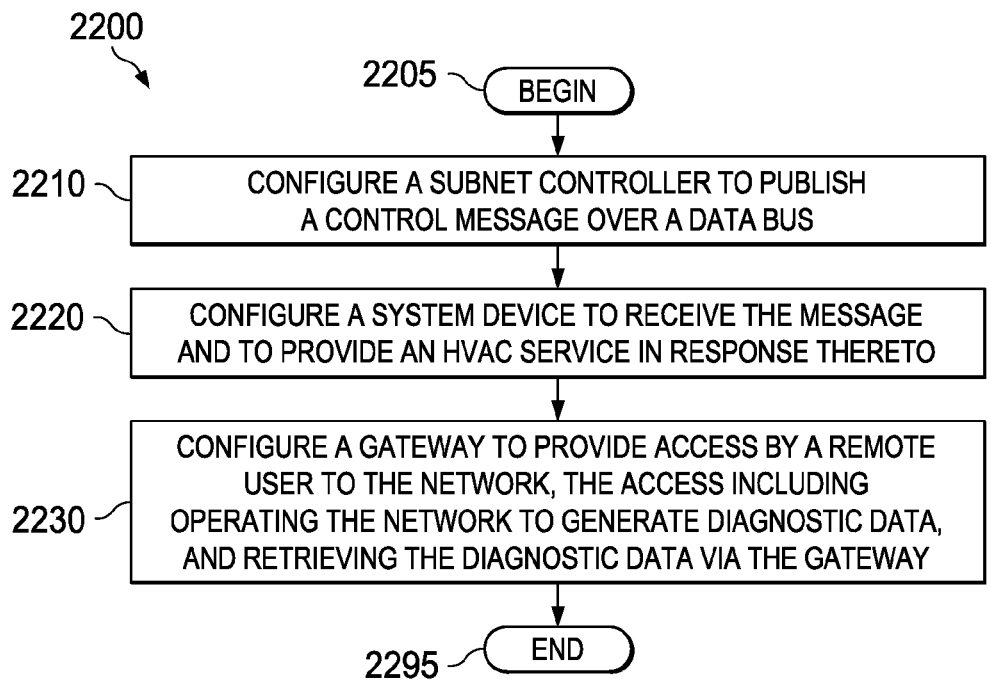

FIG. 22 illustrates a method, generally designated 2200, of operating a HVAC data processing and communication network, e.g. the system 100. A method of manufacturing the HVAC data processing and communication network may include configuring various components of the system 100 to implement the method 2200. The method 2200 begins with a state 2205, which may be entered from any suitable operating state of the system 100. In a step 2210 a subnet controller is configured to publish control messages over a data bus. In a step 2220 a system device is configured to receive the messages and to provide an HVAC service in response thereto. In a step 2230 a gateway is configured to provide access by a remote user to the network, the access including operating the network to generate diagnostic data and retrieving the diagnostic data via the gateway. The method 2200 ends with a state 2295 from which operation of a calling routine may resume.

Figure 23:
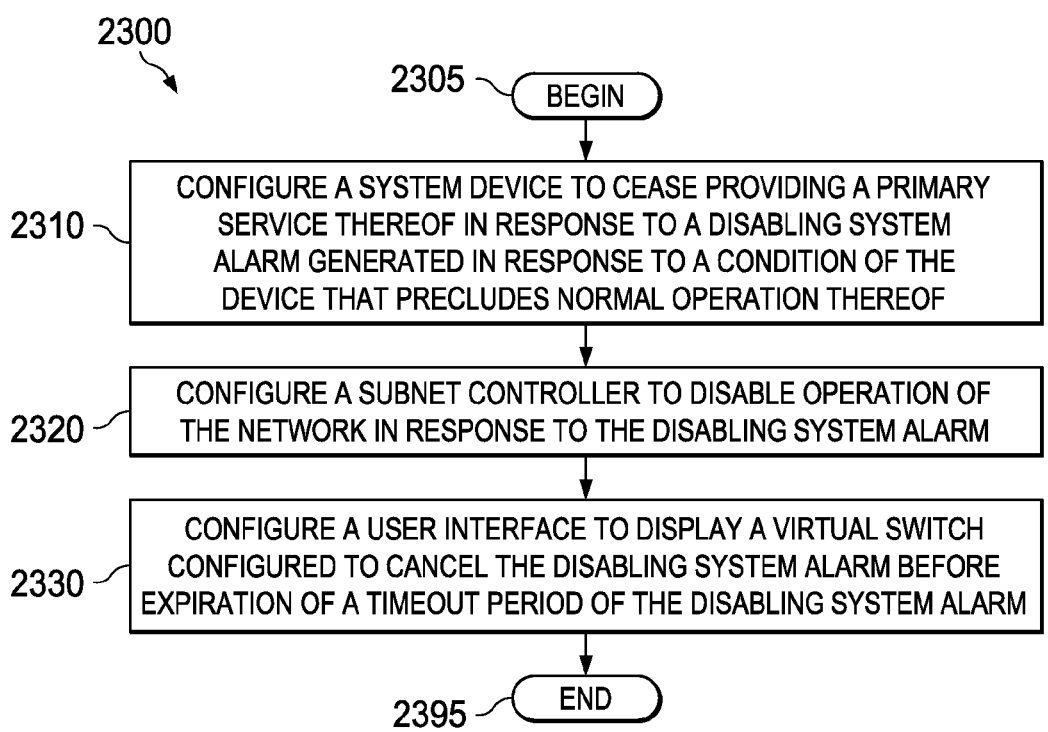

FIG. 23 illustrates a method, generally designated 2300, of operating a HVAC data processing and communication network, e.g. the system 100. A method of manufacturing the HVAC data processing and communication network may include configuring various components of the system 100 to implement the method 2300. The method 2300 begins with a state 2305, which may be entered from any suitable operating state of the system 100. In a step 2310 a system device is configured to cease providing a primary service thereof in response to a disabling system alarm generated in response to a condition of the device that precludes normal operation thereof. In a step 2320 a subnet controller is configured to disable operation of the network in response to the disabling system alarm, as a result of device having the alarm dropping its relevant service bits in its Device_status message. In a step 2330 a user interface is configured to display a virtual switch configured to cancel the disabling system alarm before expiration of a timeout period of the disabling system alarm. The method 2300 ends with a state 2395 from which operation of a calling routine may resume.

Figure 24:
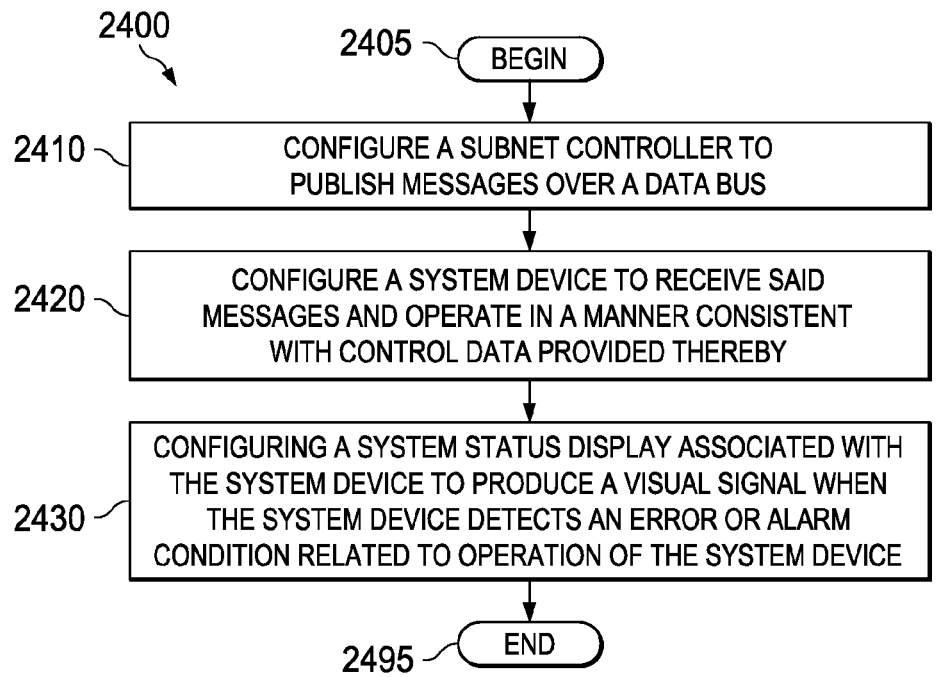

FIG. 24 illustrates a method, generally designated 2400, of operating a HVAC data processing and communication network, e.g. the system 100. A method of manufacturing the HVAC data processing and communication network may include configuring various components of the system 100 to implement the method 2400. The method 2400 begins with a state 2405, which may be entered from any suitable operating state of the system 100. In a step 2410, a subnet controller is configured to publish messages over a data bus. In a step 2420, a system device configured to receive the messages and operate in a manner consistent with control data provided thereby. In a step 2430 configuring a system status display associated with the system device to produce a visual signal when the system device detects an error or alarm condition related to operation of the system device. Specifically, the system device could be the comfort sensor 160, display 170, etc. The method 2400 ends with a state 2495 from which operation of a calling routine may resume.

Those skilled in the art to which this application relates will appreciate that other and further additions, deletions, substitutions and modifications may be made to the described embodiments.

The invention claimed is:

1. An HVAC data processing and communication network, comprising:
a first system device configured to communicate via a data bus and having a first device ID assigned thereto;
a second system device configured to communicate via said data bus and having a second device ID assigned thereto; and
a subnet controller coupled to said data bus and configured to address said first and second system devices over said data bus using said first and second device IDs,
wherein said first system device is configured to determine that a first alarm condition exists when said first and second device IDs are a same device ID.

2. The network as recited in claim 1, wherein said first and second system devices are comfort sensors.

3. The network as recited in claim 1, wherein said first and second system devices are wall-mounted displays.

4. The network as recited in claim 1, further comprising a system status display configured to provide a visual signal when said first system device determines said first alarm condition exists.

5. The network as recited in claim 4, wherein said first system device is further configured to provide said visual signal when said subnet controller directs an alarm message to said first system device indicating the existence of a second alarm condition, and said visual signal includes a flash rate that distinguishes said first and second alarm conditions.

6. The network as recited in claim 4, wherein when system status display is configured to transition to a display presentation that provides information on said error condition when said active visual signal is touched.

7. A method of manufacturing an HVAC data processing and communication network, comprising:
configuring a first system device to communicate via a data bus using a first device ID; and
configuring a second system device to communicate via said data bus using a second device ID; and
configuring a subnet controller to address said first and second system devices over said data bus using said first and second device IDs; and
configuring said first system device to determine that a first alarm condition exists when said first and second device IDs are a same device ID.

8. The method as recited in claim 7, wherein said first and second system devices are comfort sensors.

9. The method as recited in claim 7, wherein said first and second system devices are wall-mounted displays.

10. The method as recited in claim 7, further comprising configuring a system status display to provide a visual signal when said first system device determines said first alarm condition exists.

11. The method as recited in claim 10, wherein said first system device is further configured to provide said visual signal when said subnet controller directs an alarm message to said first system device indicating the existence of a second alarm condition, and said visual signal includes a flash rate that distinguishes said first and second alarm conditions.

12. The method as recited in claim 10, wherein said first system device is further configured to provide said visual signal when said subnet controller directs an alarm message to said first system device indicating the existence of a second alarm condition, and said visual signal includes a color characteristic of a severity of said second alarm condition.

13. The method as recited in claim 10, further comprising configuring said system status display to transition to a display presentation that provides information on said error condition when said active visual signal is touched.

14. A first HVAC data processing and communication network system device, comprising:
a network interface configured to interface to a data bus;
a memory;
a system status display; and
a local controller configured to:
accept via said data bus messages addressed to a device ID;
determine that a first alarm condition exists when a message is detected on said data bus from a second system device using said device ID.

15. The system device as recited in claim 14, wherein said first and second system devices are comfort sensors.

16. The system device as recited in claim 14, wherein said first and second system devices are user interfaces.

17. The system device as recited in claim 14, further comprising a system status display configured to provide a visual signal when said local controller determines said error condition exists.

18. The system device as recited in claim 17, wherein said first system device is further configured to provide said visual signal when a subnet controller directs an alarm message to said first system device indicating the existence of a second alarm condition, and said visual signal includes a flash rate that distinguishes said first and second alarm conditions.

19. The system device as recited in claim 17, wherein said first system device is further configured to provide said visual signal when a subnet controller directs an error message to said first system device indicating the existence of a second alarm condition, and said visual signal includes a color characteristic of a severity of said second alarm condition.

20. The system device as recited in claim 17, wherein when system status display is configured to transition to a display presentation that provides information on said error condition when said active visual signal is touched.

* * * * *

UNITED STATES PATENT AND TRADEMARK OFFICE
CERTIFICATE OF CORRECTION

| | | |
|---|---|---|
| PATENT NO. | : 8,463,442 B2 | Page 1 of 1 |
| APPLICATION NO. | : 12/603499 | |
| DATED | : June 11, 2013 | |
| INVENTOR(S) | : Jimmie Curry, Jacob Jennings and Wojciech Grohman | |

It is certified that error appears in the above-identified patent and that said Letters Patent is hereby corrected as shown below:

In the Specification

Col. 1, paragraph 1, line 1, after the word "of" please insert --U.S. Provisional Application Ser. No. 61/852,676, filed by Grohman, et al., on April 7, 2009, entitled "Comprehensive HVAC Control System," and--

Signed and Sealed this
Thirtieth Day of July, 2013

Teresa Stanek Rea
*Acting Director of the United States Patent and Trademark Office*